US012425620B2

(12) United States Patent
Piao et al.

(10) Patent No.: US 12,425,620 B2
(45) Date of Patent: Sep. 23, 2025

(54) IMAGE DECODING METHOD AND APPARATUS, AND IMAGE ENCODING METHOD AND APPARATUS

(71) Applicant: SAMSUNG ELECTRONICS CO., LTD., Suwon-si (KR)

(72) Inventors: Yinji Piao, Suwon-si (KR); Kyungah Kim, Suwon-si (KR); Minsoo Park, Suwon-si (KR); Minwoo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 18/238,340

(22) Filed: Aug. 25, 2023

(65) Prior Publication Data
US 2024/0073436 A1    Feb. 29, 2024

Related U.S. Application Data

(63) Continuation of application No. PCT/KR2023/012293, filed on Aug. 18, 2023.

(30) Foreign Application Priority Data

Aug. 23, 2022  (KR) .................. 10-2022-0105807
Jan. 18, 2023  (KR) .................. 10-2023-0007501

(51) Int. Cl.
H04N 19/44    (2014.01)
H04N 19/105   (2014.01)
(Continued)

(52) U.S. Cl.
CPC ........... *H04N 19/44* (2014.11); *H04N 19/105* (2014.11); *H04N 19/137* (2014.11); *H04N 19/176* (2014.11)

(58) Field of Classification Search
CPC .. H04N 19/105; H04N 19/137; H04N 19/176; H04N 19/44
See application file for complete search history.

(56) References Cited

U.S. PATENT DOCUMENTS 9,191,676 B2   11/2015  Shimada et al.
11,425,410 B2   8/2022  Chen et al.
(Continued)

FOREIGN PATENT DOCUMENTS

CN    110572671 B     11/2022
JP    2013-98745 A     5/2013
(Continued)

OTHER PUBLICATIONS

Yan Zhang et al., "EE2-2.1: Regression based affine candidate derivation", Joint Video Experts Team (JVET) of ITU-T SG 16 WP 3 and ISO/IEC JTC 1/SC 29, 27th Meeting, by teleconference, JVET-AA0107- v2, Jul. 13-22, 2022, 4 pages.
(Continued)

*Primary Examiner* — Jeremiah C Hallenbeck-Huber
(74) *Attorney, Agent, or Firm* — Sughrue Mion, PLLC

(57) ABSTRACT

Provided are an image decoding method and apparatus. The image decoding method includes identifying at least two neighboring sub-blocks that have a same motion vector and are adjacent to each other from among a plurality of neighboring sub-blocks adjacent to a current block, determining a representative motion vector and representative location information corresponding to the at least two neighboring sub-blocks, determining a parameter of a model for determining a motion vector based on the representative motion vector and the representative location information, determining a motion vector of a current sub-block included in the current block, based on location information of the current sub-block and the parameter, and predicting the current block based on the motion vector of the current
(Continued)

sub-block wherein the representative motion vector is determined based on the same motion vector, and the representative location information indicates coordinates that are determined based on the at least two neighboring sub-blocks.

7 Claims, 33 Drawing Sheets

(51) Int. Cl.
*H04N 19/137* (2014.01)
*H04N 19/176* (2014.01)

(56) References Cited

U.S. PATENT DOCUMENTS

| | | | |
|---|---|---|---|
| 11,611,742 B2 | 3/2023 | Lee | |
| 11,653,004 B2 | 5/2023 | Jang | |
| 2008/0291997 A1* | 11/2008 | Yoon | H04N 19/33 |
| | | | 375/E7.185 |
| 2013/0230108 A1* | 9/2013 | Leannec | H04N 19/895 |
| | | | 375/240.12 |
| 2017/0214932 A1* | 7/2017 | Huang | H04N 19/70 |
| 2019/0379888 A1* | 12/2019 | Xu | H04N 19/503 |
| 2021/0306649 A1 | 9/2021 | Chen et al. | |
| 2021/0385483 A1* | 12/2021 | Liu | H04N 19/513 |
| 2021/0409720 A1 | 12/2021 | Meng et al. | |
| 2022/0150506 A1* | 5/2022 | Luo | H04N 19/105 |
| 2022/0191502 A1* | 6/2022 | Chen | H04N 19/105 |
| 2022/0210462 A1* | 6/2022 | Luo | H04N 19/521 |
| 2023/0037273 A2 | 2/2023 | He et al. | |
| 2023/0199214 A1 | 6/2023 | Lee et al. | |
| 2024/0121410 A1 | 4/2024 | Zhang et al. | |

FOREIGN PATENT DOCUMENTS

| | | |
|---|---|---|
| JP | 2020-74624 A | 5/2020 |
| KR | 10-2020-0093469 A | 8/2020 |
| KR | 10-2021-0074280 A | 6/2021 |
| KR | 10-2022-0025164 A | 3/2022 |
| KR | 10-2022-0104065 A | 7/2022 |
| WO | 2017/197126 A1 | 11/2017 |

OTHER PUBLICATIONS

Yan Zhang et al., "EE2-related: Regression based affine candidate derivation", Joint Video Experts Team (JVET) of ITU-T SG 16 WP 3 and ISO/IEC JTC 1/SC 29, JVET-Z0125-v2, 26th Meeting, by teleconference, Apr. 20-29, 2022, 5 pages.

Yan Zhang et al., "Regression based affine candidate derivation", Qualcomm, JVET-Z0125: EE2-Related, 8 pages.

Ramin Ghaznavi-Youvalari et al., "CE4-related: Merge mode with Regression based Motion Vector Field (RMVF)", JVET-L0171-r1, Joint Video Experts Team (JVET) of ITU-T SG 16 WP 3 and ISO/IEC JTC 1/SC 29/WG 11, 12th Meeting: Macao, CN, pp. 1-4, Oct. 6, 2018.

Wei Chen et al., "EE2-related: on regression based affine candidate derivation", JVET-AA0128-v1, Joint Video Experts Team (JVET) of ITU-T SG 16 WP 3 and ISO/IEC JTC 1/SC 29, 27th Meeting, pp. 1-4, Jul. 20, 2022.

International Search Report (PCT/ISA/210) and Written Opinion (PCT/ISA/237) issued by the International Searching Authority on Nov. 28, 2023 in International Application No. PCT/KR2023/012293.

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

IMAGE DECODING METHOD AND APPARATUS, AND IMAGE ENCODING METHOD AND APPARATUS

CROSS-REFERENCE TO RELATED APPLICATION

This application is a continuation application of International Application No. PCT/KR2023/012293, filed on Aug. 18, 2023, which is based on and claims priority to Korean Patent Application No. 10-2022-0105807, filed on Aug. 23, 2022, and Korean Patent Application No. 10-2023-0007501, filed on Jan. 18, 2023, in the Korean Intellectual Property Office, the disclosures of which are incorporated by reference herein in their entireties.

BACKGROUND

1. Field

The disclosure relates to methods and apparatuses for image encoding and decoding, and more particularly, to methods and apparatuses in which, in a prediction mode in which prediction is performed in units of sub-blocks, a parameter of a model for performing prediction is determined by using information of neighboring blocks of a current block, and prediction is performed for each sub-block included in the current block based on the determined parameter.

2. Description of Related Art

Image data may be encoded by a codec according to a certain data compression standard, for example, the Moving Picture Expert Group (MPEG) standard, and may then be stored as a bitstream in a recording medium, or transmitted through a communication channel.

With the development and distribution of hardware that may reproduce and store high-resolution or high-quality image content, there is an increasing need for a codec that effectively encodes or decodes high-resolution or high-quality image content. For example, such high-resolution or high-quality image content may be compressed using image compression technology which may include splitting an image to be encoded in an arbitrary way or manipulating data.

As an example of a method for manipulating data, neighboring information of a current block may be used to perform prediction of the current block.

SUMMARY

An image decoding method according to an embodiment of the disclosure includes identifying at least two neighboring sub-blocks that have the same motion vector and are adjacent to each other from among a plurality of neighboring sub-blocks that are adjacent to a current block, determining a representative motion vector and representative location information corresponding to the at least two neighboring sub-blocks, determining a parameter of a model for determining a motion vector based on the representative motion vector and the representative location information, determining a motion vector of a current sub-block included in the current block, based on location information of the current sub-block and the parameter, and predicting the current block based on the motion vector of the current sub-block, wherein the representative motion vector is determined based on the same motion vector, and the representative location information indicates coordinates that are determined based on the at least two neighboring sub-blocks.

An image decoding apparatus according to an embodiment of the disclosure includes a memory in which one or more instructions are stored, and at least one processor configured to operate according to the one or more instructions. The at least one processor may be configured to identify at least two neighboring sub-blocks that have the same motion vector and are adjacent to each other from among a plurality of neighboring sub-blocks that are adjacent to a current block. The at least one processor may be configured to determine a representative motion vector and representative location information corresponding to the at least two neighboring sub-blocks. The at least one processor may be configured to determine a parameter of a model for determining a motion vector based on the representative motion vector and the representative location information. The at least one processor may be configured to determine a motion vector of a current sub-block in the current block based on location information of the current sub-block and the parameter. The at least one processor may be configured to predict the current block based on the motion vector of the current sub-block. The representative motion vector may be determined based on the same motion vector, and the representative location information may indicate coordinates that are determined based on the at least two neighboring sub-blocks.

An image decoding method according to an embodiment of the disclosure includes identifying a first neighboring block that is not coded in units of sub-blocks and a second neighboring block that is coded in units of sub-blocks from among neighboring blocks that are adjacent to a current block, determining a first motion vector and first location information corresponding to the first neighboring block, determining a parameter of a model for determining a motion vector based on the first motion vector and the first location information, determining a motion vector of a current sub-block included in the current block based on location information of the current sub-block and the determined parameter, and predicting the current block using the motion vector of the current sub-block, wherein the first location information indicates coordinates that are determined based on the first neighboring block.

An image decoding apparatus according to an embodiment of the disclosure includes a memory in which one or more instructions are stored, and at least one processor configured to operate according to the one or more instructions. The at least one processor may be configured to identify a first neighboring block that is not coded in units of sub-blocks and a second neighboring block that is coded in units of sub-blocks from among neighboring blocks that are adjacent to a current block. The at least one processor may be configured to determine a first motion vector and first location information corresponding to the first neighboring block. The at least one processor may be configured to determine a parameter of a model for determining a motion vector based on the first motion vector and the first location information. The at least one processor may be configured to determine a motion vector of a current sub-block included in the current block based on location information of the current sub-block and the determined parameter. The at least one processor may be configured to predict the current block using the motion vector of the current sub-block. The first location information may indicate coordinates that are determined based on the first neighboring block.

An image decoding method according to an embodiment of the disclosure includes comparing motion vectors of a first neighboring block and a second neighboring block that are adjacent to each other from among neighboring blocks that are adjacent to a current block, based on a result of the comparing indicating that a first motion vector of the first neighboring block and a second motion vector of the second neighboring block are a same motion vector, determining representative location information corresponding to the first neighboring block and the second neighboring block, and determining a parameter of a model for determining a motion vector based on the representative location information and one of the first motion vector and the second motion vector, based on the result of the comparing indicating that the first motion vector and the second motion vector are different from each other, determining the parameter based on the first motion vector, the second motion vector, first location information about the first neighboring block, and second location information about the second neighboring block, determining a motion vector about a current sub-block included in the current block, based on location information of the current sub-block and the determined parameter, and predicting the current block based on the motion vector of the current sub-block.

An image decoding apparatus according to an embodiment of the disclosure includes a memory in which one or more instructions are stored, and at least one processor configured to operate according to the one or more instructions. The at least one processor may be configured to compare motion vectors of a first neighboring block and a second neighboring block that are adjacent to each other from among neighboring blocks that are adjacent to a current block. The at least one processor may be configured to determine representative location information corresponding to the first neighboring block and the second neighboring block, and determine a parameter of a model for determining a motion vector based on the representative location information and one of the first motion vector and the second motion vector based on a result of the comparing indicating that a first motion vector of the first neighboring block and a second motion vector of the second neighboring block are a same motion vector. The at least one processor may be configured to determine the parameter based on the first motion vector, the second motion vector, first location information about the first neighboring block and second location information about the second neighboring block based on the result of the comparing indicating that the first motion vector and the second motion vector are different from each other. The at least one processor may be configured to determine a motion vector of a current sub-block included in the current block based on location information about the current sub-block and the determined parameter. The at least one processor may be configured to predict the current block based on the motion vector of the current sub-block.

An image encoding method according to an embodiment of the disclosure includes identifying at least two neighboring sub-blocks that have the same motion vector and are adjacent to each other from among a plurality of neighboring sub-blocks that are adjacent to a current block, determining a representative motion vector and representative location information corresponding to the at least two neighboring sub-blocks, determining a parameter of a model for determining a motion vector based on the representative motion vector and the representative location information, determining a motion vector of a current sub-block included in the current block based on location information of the current sub-block and the parameter, and predicting the current block based on the motion vector of the current sub-block, wherein the representative motion vector is determined based on the same motion vector, and the representative location information indicates coordinates that are determined based on the at least two neighboring sub-blocks.

An image encoding apparatus according to an embodiment of the disclosure includes a memory in which one or more instructions are stored, and at least one processor configured to operate according to the one or more instructions. The at least one processor may be configured to identify at least two neighboring sub-blocks that are the same motion vector and are adjacent to each other from among a plurality of neighboring sub-blocks that are adjacent to a current block. The at least one processor may be configured to determine a representative motion vector and representative location information corresponding to the at least two neighboring sub-blocks. The at least one processor may be configured to determine a parameter of a model for determining a motion vector based on the representative motion vector and the representative location information. The at least one processor may be configured to determine a motion vector of a current sub-block included in the current block based on location information of the current sub-block and the parameter. The at least one processor may be configured to predict the current block based on the motion vector of the current sub-block. The presentative motion vector may be determined based on the same motion vector, and the representative location information may indicate coordinates that are determined based on the at least two neighboring sub-blocks.

An image encoding method according to an embodiment of the disclosure includes identifying a first neighboring block that is not coded in units of sub-blocks and a second neighboring block that is coded in units of sub-blocks from among neighboring blocks that are adjacent to a current block, determining a first motion vector and first location information corresponding to the first neighboring block, determining a parameter of a model for determining a motion vector based on the first motion vector and the first location information, determining a motion vector of a current sub-block included in the current block based on location information of the current sub-block and the determined parameter, and predicting the current block using the motion vector of the current sub-block, wherein the first location information indicates coordinates that are determined based on the first neighboring block.

An image encoding apparatus according to an embodiment of the disclosure includes a memory in which one or more instructions are stored, and at least one processor configured to operate according to the one or more instructions. The at least one processor may be configured to identify a first neighboring block that is not coded in units of sub-blocks and a second neighboring block that is coded in units of sub-blocks from among neighboring blocks adjacent to a current block. The at least one processor may be configured to determine a first motion vector and first location information corresponding to the first neighboring block. The at least one processor may be configured to determine a parameter of a model for determining a motion vector based on the first motion vector and the first location information. The at least one processor may be configured to determine a motion vector of a current sub-block included in the current block based on location information of the current sub-block and the determined parameter. The at least one processor may be configured to predict the current block by using the motion vector of the current sub-block. The first location information may indicate coordinates that are determined based on the first neighboring block.

An image encoding method according to an embodiment of the disclosure includes comparing motion vectors of a first neighboring block and a second neighboring block that are adjacent to each other from among neighboring blocks that are adjacent to a current block, determining representative location information corresponding to the first neighboring block and the second neighboring block and determining a parameter of a model for determining a motion vector based on the representative location information and one of the first motion vector and the second motion vector based on a result of the comparing indicating that a first motion vector of the first neighboring block and a second motion vector of the second neighboring block are a same motion vector, determining the parameter based on the first motion vector, the second motion vector, first location information about the first neighboring block, and second location information about the second neighboring block based on the result of the comparing indicating that the first motion vector and the second motion vector are different from each other, determining a motion vector of a current sub-block included in the current block, based on location information about the current sub-block and the determined parameter, and predicting the current block based on the motion vector of the current sub-block.

An image encoding apparatus according to an embodiment of the disclosure includes a memory in which one or more instructions are stored, and at least one processor configured to operate according to the one or more instructions. The at least one processor may be configured to compare motion vectors of a first neighboring block and a second neighboring block that are adjacent to each other from among neighboring blocks that are adjacent to a current block. The at least one processor may be configured to determining representative location information corresponding to the first neighboring block and the second neighboring block, and determine a parameter of a model for determining a motion vector based on the representative location information and one of the first motion vector and the second motion vector based on a result of the comparing indicating that a first motion vector of the first neighboring block and a second motion vector of the second neighboring block are a same motion vector. The at least one processor may be configured to determine the parameter based on the first motion vector, the second motion vector, first location information about the first neighboring block, and second location information about the second neighboring block based on the result of the comparing indicating that the first motion vector and the second motion vector are different from each other. The at least one processor may be configured to determine a motion vector of a current sub-block included in the current block based on location information about the current sub-block and the determined parameter. The at least one processor may be configured to predict the current block based on the motion vector of the current sub-block.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 illustrates a process of determining a depth of a coding unit as a shape and a size of the coding unit change, when the coding unit is recursively split to determine a plurality of coding units, according to an embodiment of the disclosure;

DETAILED DESCRIPTION

Figure 1:
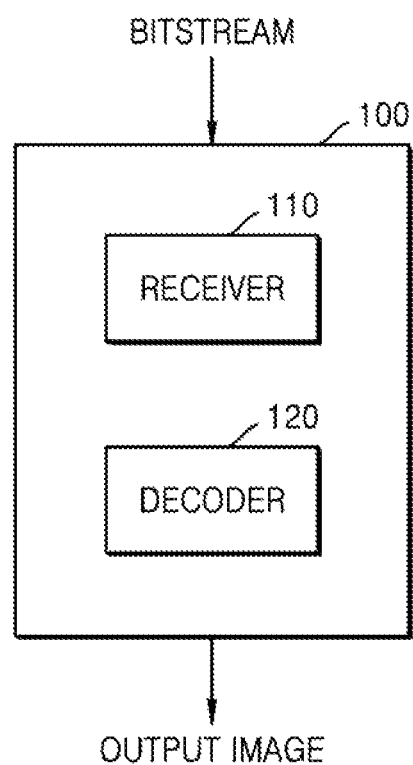
FIG. 1 is a schematic block diagram illustrating an image decoding apparatus, according to an embodiment of the disclosure.

Throughout the disclosure, the expression "at least one of a, b or c" indicates only a, only b, only c, both a and b, both a and c, both b and c, or all of a, b, and c, or variations thereof.

Example advantages and features of the disclosure and methods of achieving the advantages and features are described more fully with reference to the accompanying drawings, in which embodiments of the disclosure are shown. The disclosure may, however, be embodied in many different forms and should not be construed as being limited to the embodiments set forth herein; rather these embodiments are provided so that this disclosure may be thorough and complete, and will fully convey the concept of the disclosure to one of ordinary skill in the art.

The terms used herein are briefly described, and disclosed embodiments of the disclosure are described in detail.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

As used herein, the singular forms "a," "an," and "the" are intended to include the plural forms as well, unless the context clearly indicates otherwise.

It should be understood that when a certain part "includes" a certain component, the part does not exclude another component but may further include another component, unless the context clearly dictates otherwise.

Also, numbers (e.g., first and second) used in the description of the specification are merely identifier codes for distinguishing one element from another.

Also, the term " . . . unit" used herein refers to a software component or a hardware component, which performs certain tasks. However, the term " . . . unit" is not limited to software or hardware. A " . . . unit" may be configured to be in an addressable storage medium or configured to operate one or more processors. Accordingly, a " . . . unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided by the components and " . . . units" may be combined into fewer components and " . . . units" or further separated into additional components and " . . . units".

According to an embodiment of the disclosure, a " . . . unit" may include a processor and a memory. The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, etc. A memory is said to be in electronic communication with a processor when the processor may read information from and/or write information to the memory. A memory integrated in a processor is in electronic communication with the processor.

Hereinafter, the term "image" may refer to a still image of a video, or a moving image, i.e., a video itself.

Also, the term "sample" used herein refers to data that is assigned to a sampling location of an image and is to be processed. For example, pixel values of an image in a spatial domain or transform coefficients in a transform domain may be samples. A unit including one or more samples may be defined as a block.

Also, in the present specification, a "current block" may refer to a block of a largest coding unit, a coding unit, a prediction unit, or a transform unit of a current image to be encoded or decoded.

Hereinafter, embodiments of the disclosure are described in detail with reference to the attached drawings in order to enable one of ordinary skill in the art to embody and practice the disclosure. In addition, some portions which may be less relevant to the descriptions of the disclosure may be omitted in the drawings for clear descriptions of the disclosure.

Hereinafter, an image encoding apparatus and an image decoding apparatus, and an image encoding method and an image decoding method according to an embodiment of the disclosure are described in detail with reference to FIGS. 1 to 16. A method of determining a data unit of an image according to an embodiment of the disclosure is described with reference to FIGS. 3 to 16, and an image encoding/decoding method of determining a parameter of a model for sub-block unit prediction in a sub-block unit prediction mode and performing prediction for each sub-block by using the determined parameter according to an embodiment of the disclosure is described with reference to FIGS. 17A to 32.

A method and apparatus for adaptively selecting a context model based on various types of coding units shapes according to an embodiment of the disclosure are described with reference to FIGS. 1 and 2.

FIG. 1 is a schematic block diagram illustrating an image decoding apparatus, according to an embodiment of the disclosure.

An image decoding apparatus 100 may include a receiver 110 and a decoder 120. The receiver 110 and the decoder 120 may include at least one processor. Also, the receiver 110 and the decoder 120 may include a memory in which instructions to be executed by the at least one processor are stored.

The receiver 110 may receive a bitstream. The bitstream includes information obtained when an image encoding apparatus 2900 described below encodes an image. Also, the bitstream may be received from the image encoding apparatus 2900. The image encoding apparatus 2900 and the image decoding apparatus 100 may be connected to each other by wire or wirelessly, and the receiver 110 may receive the bitstream by wire or wirelessly. The receiver 110 may receive the bitstream from a storage medium such as an optical medium or a hard disk. The decoder 120 may reconstruct an image based on information obtained from the received bitstream. The decoder 120 may obtain a syntax element for reconstructing the image from the bitstream. The decoder 120 may reconstruct the image based on the syntax element.

Figure 2:
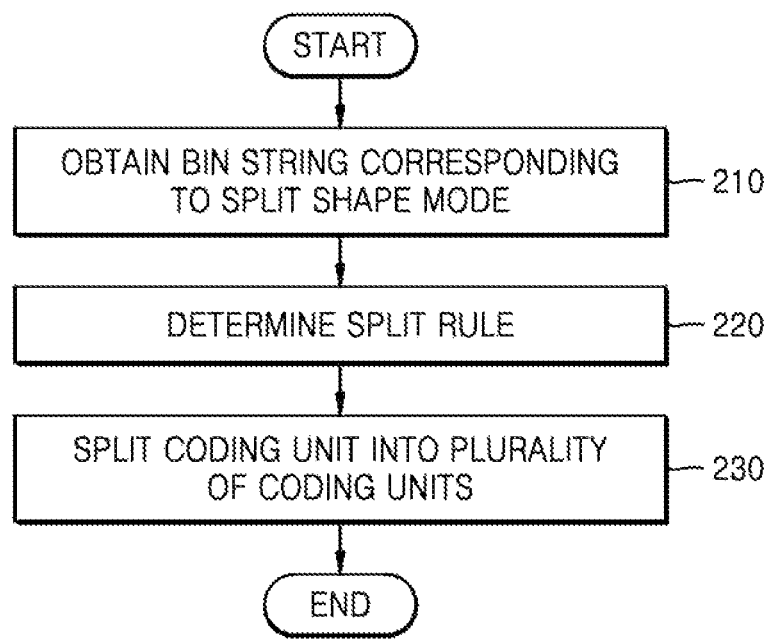
FIG. 2 is a flowchart illustrating an image decoding method, according to an embodiment of the disclosure.

An example of an operation of the image decoding apparatus 100 is described in more detail together with reference to FIG. 2.

FIG. 2 is a flowchart illustrating an image decoding method, according to an embodiment of the disclosure.

According to an embodiment of the disclosure, the receiver 110 receives a bitstream.

The image decoding apparatus 100 performs an operation 210 of obtaining a bin string corresponding to a split shape mode of a coding unit from the bitstream. The image decoding apparatus 100 performs an operation 220 of determining a split rule of a coding unit. Also, the image decoding apparatus 100 performs an operation 230 of splitting a coding unit into a plurality of coding units, based on at least one of the bin string corresponding to the split shape mode or the split rule. The image decoding apparatus 100 may determine a first range which is an allowable size range of the coding unit, according to a ratio of a height to a width of the coding unit, in order to determine the split rule. The image decoding apparatus 100 may determine a second range which is an allowable size range of a coding unit, according to a split shape mode of the coding unit, in order to determine the split rule.

Hereinafter, an example of a splitting of a coding unit according to an embodiment of the disclosure is described in detail.

First, one picture may be split into one or more slices or one or more tiles. One slice or one tile may be a sequence of largest coding units, which may be for example coding tree units (CTUs). As a concept compared to a largest coding unit (or CTU), there may also be a largest coding block, which may be for example a coding tree block (CTB).

A largest coding block (or CTB) denotes an N×N block including N×N samples (where N is an integer). Each color component may be split into one or more largest coding blocks.

When a picture has three sample arrays (sample arrays for Y, Cr, and Cb components), a largest coding unit (or CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (or CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a coding unit, or largest coding unit, refers to a data structure including a coding block, or a largest coding block, including a corresponding sample and a syntax structure corresponding to the coding block, or largest coding block. However, because it is understood by one of ordinary skill in the art that a coding unit, a largest coding unit, a coding block, or a largest coding block refers to a block of a certain size including a certain number of samples, a largest coding block and a largest coding unit, or a coding block and a coding unit are mentioned in the following specification without being distinguished unless otherwise described.

An image may be split into largest coding units (or CTUs). A size of each largest coding unit may be determined based on information obtained from a bitstream. A shape of each largest coding unit may be a square shape of the same size. However, an embodiment of the disclosure is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment of the disclosure, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, or split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of the coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. Examples of the splitting of the coding unit are described in more detail with reference to FIGS. 3 to 16.

Also, one or more prediction blocks for prediction may be determined from a coding unit. The prediction block may be the equal to or smaller than the coding unit. Also, one or more transform blocks for transformation may be determined from a coding unit. The transform block may be equal to or smaller than the coding unit.

The shapes and sizes of the transform block and prediction block may not be related to each other.

In an embodiment of the disclosure, prediction may be performed by using a coding unit as a prediction unit. Also, transformation may be performed by using a coding unit as a transform block.

Examples of the splitting of the coding unit are described in more detail with reference to FIGS. 3 to 16. A current block and a neighboring block of the disclosure may indicate one of the largest coding unit, the coding unit, the prediction block, and the transform block. Also, the current block or the current coding unit is a block that is currently being decoded or encoded or a block that is currently being split. The neighboring block may be a block reconstructed prior to the current block. The neighboring block may be adjacent to the current block spatially or temporally. The neighboring block may be located at one of the lower left, left, upper left, top, upper right, right, and lower right of the current block.

Figure 3:
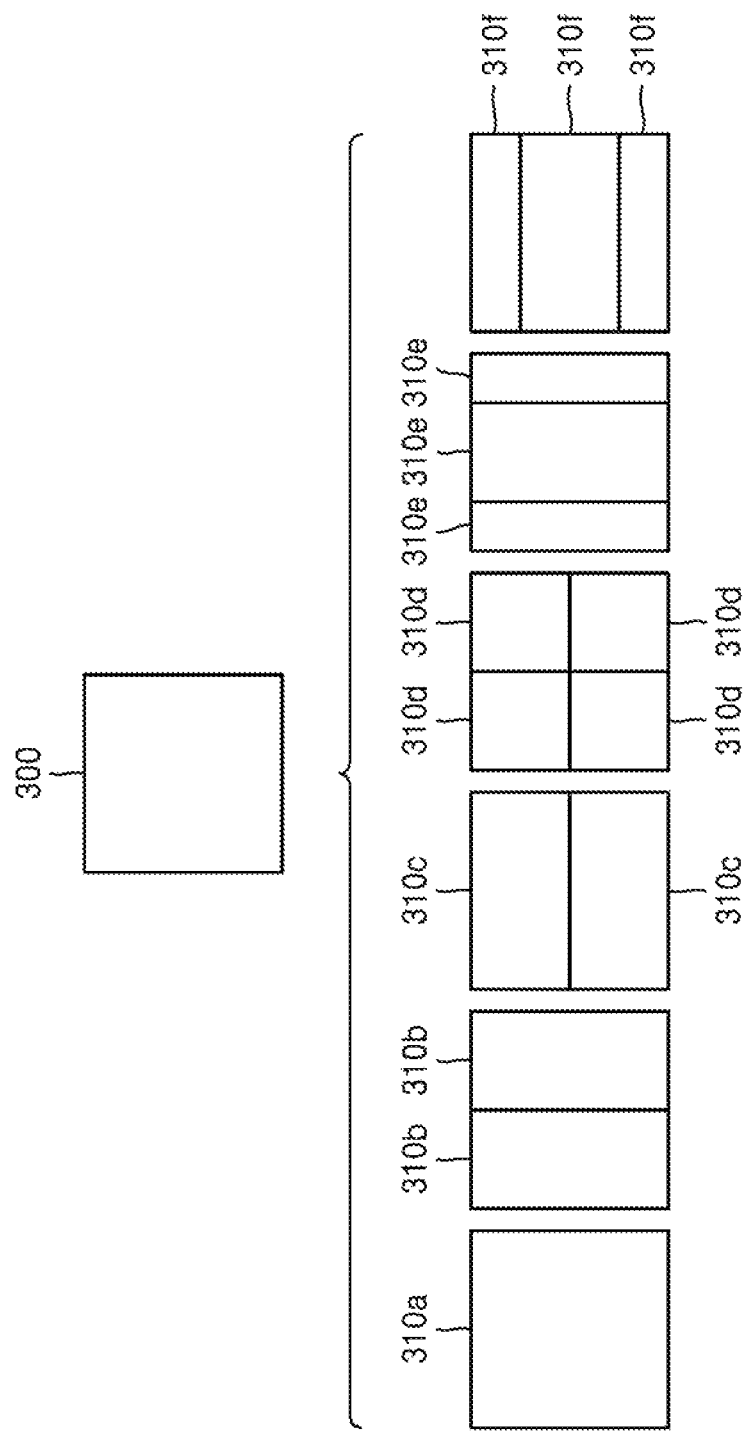
FIG. 3 illustrates a process in which an image decoding apparatus determines at least one coding unit by splitting a current coding unit, according to an embodiment of the disclosure.

FIG. 3 illustrates a process in which an image decoding apparatus determines at least one coding unit by splitting a current coding unit, according to an embodiment of the disclosure.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the width and the height of the coding unit are the same (e.g., when the block shape of the coding unit is 4N×4N), the image decoding apparatus 100 may determine the block shape information of the coding unit to be a square. The image decoding apparatus 100 may determine the shape of the coding unit to be a non-square.

When the width and the height of the coding unit are different from each other (e.g., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit to be a non-square. When the shape of the coding unit is a non-square, the image decoding apparatus 100 may determine the ratio of the width and the height among the block shape information of the coding unit to be at least one of 1:2, 2:1, 1:4, 4:1, 1:8, 8:1, 1:16, 16:1, 1:32, or 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment of the disclosure, the image decoding apparatus 100 may determine the shape of the coding unit by using the block shape information, and may determine a splitting method of the coding unit by using split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment of the disclosure is not limited thereto, and the image decoding apparatus 100 and the image encoding apparatus 2900 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine the split shape mode information with respect to the largest coding unit to be a quad split. Also, the image decoding apparatus 100 may determine the split shape mode information with respect to the smallest coding unit to be "not to perform splitting", or no split. In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment of the disclosure, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a certain splitting method. In an embodiment of the disclosure, coding units 310b, 310c, 310d, 310e, or 310f may be determined or obtained by splitting current coding unit 300 based on the indicated splitting method.

Referring to FIG. 3, according to an embodiment of the disclosure, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment of the disclosure, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Examples of splitting methods of splitting the square coding unit are described in detail below through various embodiments of the disclosure.

Figure 4:
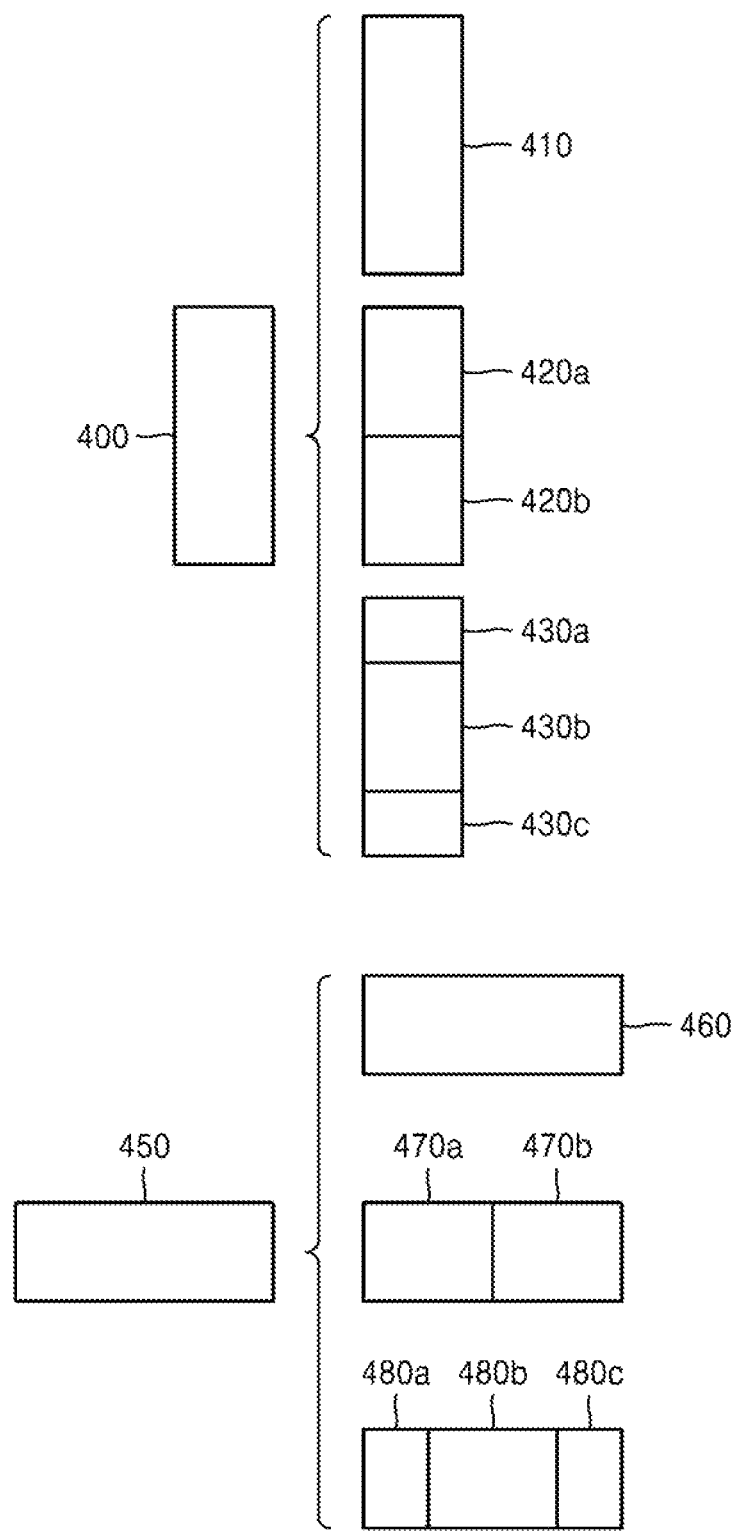
FIG. 4 illustrates a process in which an image decoding apparatus determines at least one coding unit by splitting a non-square coding unit, according to an embodiment of the disclosure.

FIG. 4 illustrates a process in which an image decoding apparatus determines at least one coding unit by splitting a non-square coding unit, according to an embodiment of the disclosure.

According to an embodiment of the disclosure, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 having the same size as the current coding unit 400 or coding unit 460 having the same size as the current coding unit 450, based on the split shape mode information indicating not to perform splitting, or may determine coding units 420a and 420b, 430a to 430c, 470a and 470b, or 480a to 480c split based on the split shape mode information indicating a certain splitting method. In an embodiment of the disclosure, coding units 420a and 420b or 430a to 430c may be determined or obtained by splitting current coding unit 400 based on the indicated splitting method, and coding unit 470a and 470b, or 480a to 480c may be determined or obtained by splitting current coding unit 450 based on the indicated splitting method. Examples of splitting methods of splitting a non-square coding unit are described in detail below through various embodiments of the disclosure.

According to an embodiment of the disclosure, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b included in the current coding unit 400, or 470a and 470b included in the current coding unit 450, by splitting the current coding unit 400 or 450 based on the split shape mode information.

According to an embodiment of the disclosure, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment of the disclosure, when the split shape mode information indicates to split a coding unit into an odd number of blocks, for example in a ternary split, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 into three coding units 430a, 430b, and 430c, or split the current coding unit 450 into three coding units 480a, 480b, and 480c.

According to an embodiment of the disclosure, a ratio of the width and the height of the current coding unit 400 or 450 may be 4:1 or 1:4. When the ratio of the width and the height is 4:1, the block shape information may indicate a horizontal direction because the length of the width is longer than the length of the height. When the ratio of the width and the height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment of the disclosure, the image decoding apparatus 100 may determine an odd number of coding units included in the current coding unit 400 or 450, and not all the determined coding units may have the same size. For example, a certain coding unit 430b from among the determined odd number of coding units 430a, 430b, and 430c may have a size different from the size of the other coding units 430a and 430c, or a certain coding unit 480b from among the determined odd number of coding units 480a, 480b, and 480c may have a size different from the size of the other coding units 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment of the disclosure, when the split shape mode information indicates to split a coding unit into the odd number of blocks, the image decoding apparatus 100 may determine the odd number of coding units included in the current coding unit 400 or 450, and moreover, may put a certain restriction on at least one of the odd number of coding units generated by splitting the current coding unit 400 or 450. Referring to FIG. 4, the image decoding apparatus 100 may set a decoding process regarding the coding unit 430b located at the center among the three coding units 430a, 430b, and 430c generated as the current coding unit 400 is split, to be different from that of the other coding units 430a and 430c, or may set a decoding process regarding the coding unit 480b located at the center among the three coding units 480a, 480b, and 480c generated as the current coding unit 450 is split to be different from that of the other coding units 480a and 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
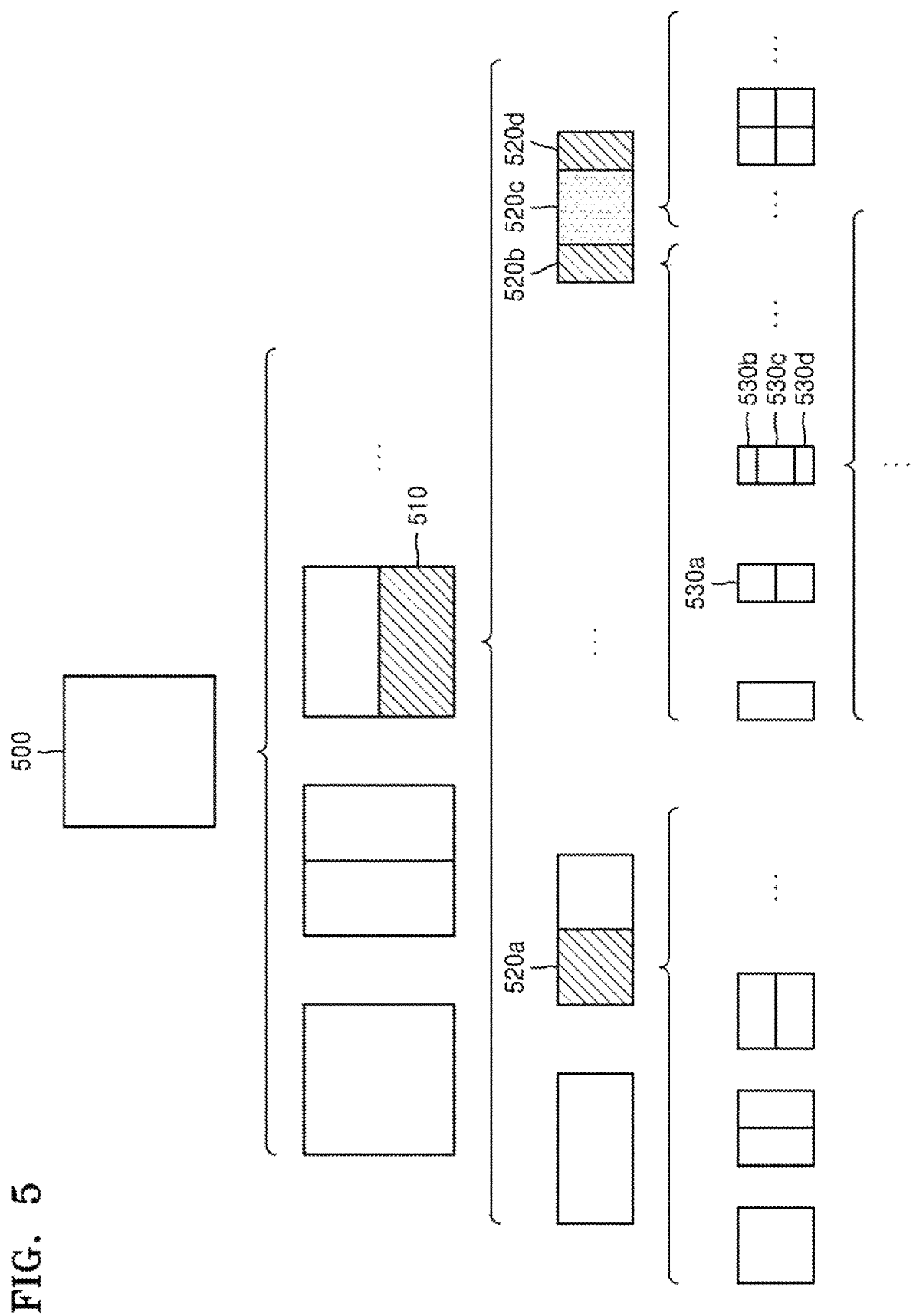
FIG. 5 illustrates a process in which an image decoding apparatus splits a coding unit based on at least one of block shape information or split shape mode information, according to an embodiment of the disclosure.

FIG. 5 illustrates a process in which an image decoding apparatus splits a coding unit based on at least one of block shape information or split shape mode information, according to an embodiment of the disclosure.

According to an embodiment of the disclosure, the image decoding apparatus 100 may determine to split or not to split a square first coding unit 500 into coding units, based on at least one of the block shape information or the split shape mode information. According to an embodiment of the disclosure, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment of the disclosure are terms used to understand a relation before and after splitting a coding unit. For example, a second coding unit may be determined by splitting a first coding unit, and a third coding unit may be determined by splitting the second coding unit. In an embodiment of the disclosure, the relation of the first coding unit, the second coding unit, and the third coding unit may follow the above descriptions.

According to an embodiment of the disclosure, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, 520b, 520c, and 520d based on the split shape mode information. The image decoding apparatus 100 may obtain the split shape mode information, and may obtain a plurality of various-shaped second coding units (e.g., second coding unit 510) by splitting the first coding unit 500, based on the obtained split shape mode information, and the second coding unit 510 may be split by using a splitting method of the first coding unit 500 based on the split shape mode information. According to an embodiment of the disclosure, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Accordingly, a square coding unit may be determined by splitting a non-square coding unit, and a non-square coding unit may be determined by recursively splitting the square coding unit.

Referring to FIG. 5, a certain coding unit (e.g., a coding unit located at a center location, or a square coding unit) from among an odd number of third coding units 520b, 520c, and 520d determined by splitting the non-square second coding unit 510 may be recursively split. According to an embodiment of the disclosure, the square third coding unit 520c from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. An example of a method that may be used to recursively split a coding unit is described below through various embodiments of the disclosure.

According to an embodiment of the disclosure, the image decoding apparatus 100 may split each of the third coding units 520a, 520b, 520c, and 520d into coding units, based on the split shape mode information. Also, the image decoding apparatus 100 may determine not to split the second coding unit 510 based on the split shape mode information. According to an embodiment of the disclosure, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520c at the center location are not limited to the above-described embodiments of the disclosure, and may include various restrictions for decoding the third coding unit 520c at the center location differently from the other third coding units 520b and 520d.

According to an embodiment of the disclosure, the image decoding apparatus 100 may obtain the split shape mode information, which is used to split a current coding unit, from a certain location in the current coding unit.

Figure 6:
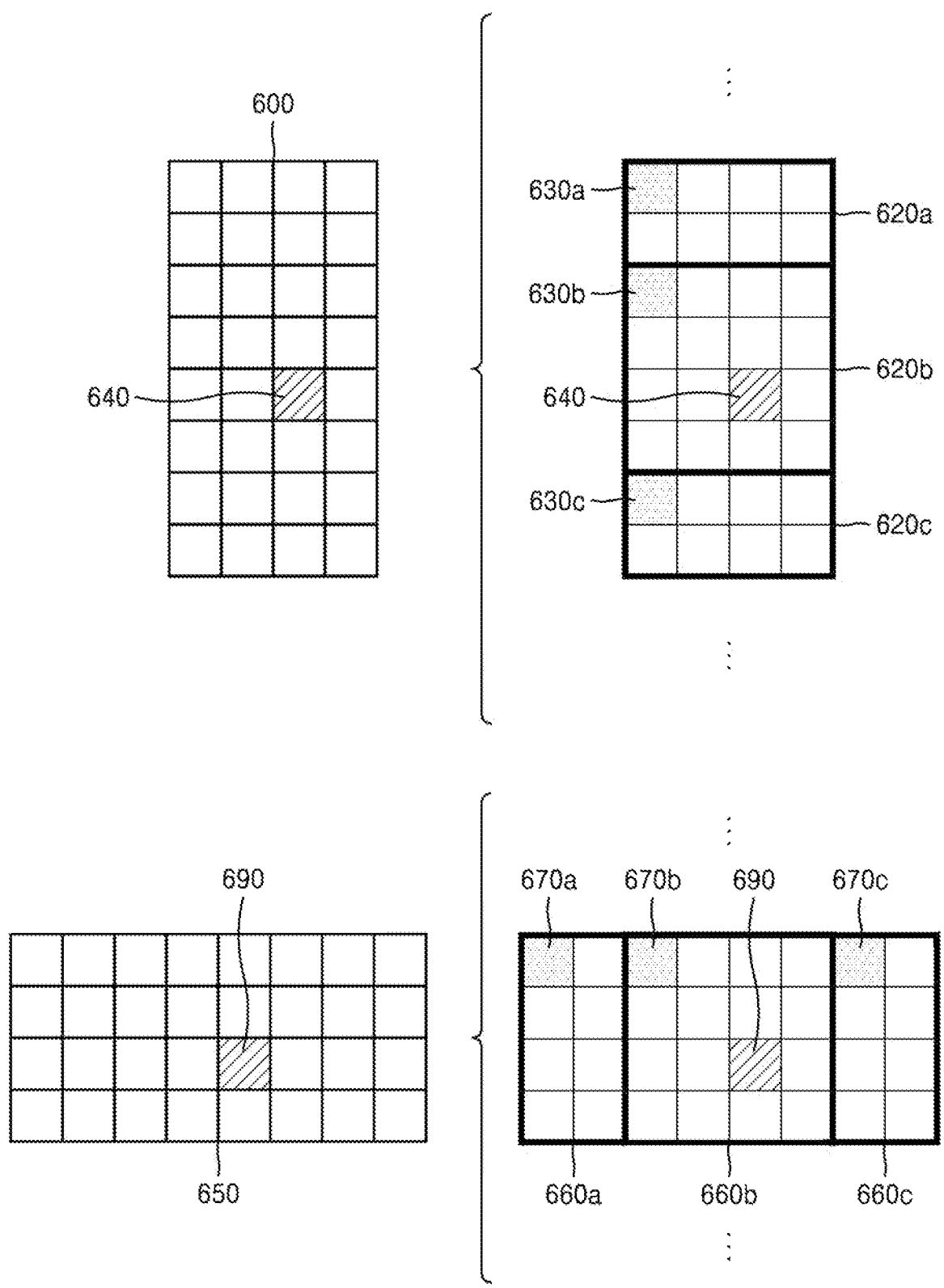
FIG. 6 illustrates a method in which an image decoding apparatus determines a certain coding unit from among an odd number of coding units, according to an embodiment of the disclosure.

FIG. 6 illustrates a method in which an image decoding apparatus determines a certain coding unit from among an odd number of coding units, according to an embodiment of the disclosure.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the certain location and may determine to split or not to split the current coding unit into various-shaped and various-sized coding units.

According to an embodiment of the disclosure, when the current coding unit is split into a certain number of coding units, the image decoding apparatus 100 may select one of the coding units. Various methods may be used to select one of a plurality of coding units, examples of which are described below through various embodiments of the disclosure.

According to an embodiment of the disclosure, the image decoding apparatus 100 may split the current coding unit into a plurality of coding units, and may determine a coding unit at a certain location.

According to an embodiment of the disclosure, the image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of certain samples included in the coding units 620a, 620b, and 620c. For example, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment of the disclosure, the information indicating the locations of the upper left samples 630a, 630b, and 630c, which are respectively included in the coding units 620a, 620b, and 620c, may include information about locations or coordinates of the coding units 620a, 620b, and 620c in a picture. According to an embodiment of the disclosure, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment of the disclosure, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with respect to the location of the upper left sample 630a of the upper coding unit 620a. A method of determining a coding unit at a certain location by using coordinates of a sample included in the coding unit as information indicating a location of the sample is not limited to the above-described method, and may include various arithmetic methods capable of using the coordinates of the sample.

According to an embodiment of the disclosure, the image decoding apparatus 100 may split the current coding unit 600 into a plurality of coding units 620a, 620b, and 620c, and may select one of the coding units 620a, 620b, and 620c based on a certain criterion. For example, the image decoding apparatus 100 may select the coding unit 620b, which has a size different from that of the others, from among the coding units 620a, 620b, and 620c.

According to an embodiment of the disclosure, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that are the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment of the disclosure, the image decoding apparatus 100 may determine the width of the upper coding unit 620a to be the width of the current coding unit 600. The image decoding apparatus 100 may determine the height of the upper coding unit 620a to be yb-ya. According to an embodiment of the disclosure, the image decoding apparatus 100 may determine the width of the middle coding unit 620b to be the width of the current coding unit 600. The image decoding apparatus 100 may determine the height of the middle coding unit 620b to be yc-yb. According to an embodiment of the disclosure, the image decoding apparatus 100 may determine the width or height of the lower coding unit 620c by using the width or height of the current coding unit 600 and the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper coding unit 620a and the lower coding unit 620c, as the coding unit of the certain location. However, the above-described process in which the image decoding apparatus 100 determines a coding unit having a size different from the size of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

The image decoding apparatus 100 may determine the width or height of each of the coding units 660a, 660b, and 660c by using coordinates (xd, yd) that are information indicating a location of an upper left sample 670a of the left coding unit 660a, coordinates (xe, ye) that are information indicating a location of an upper left sample 670b of the middle coding unit 660b, and coordinates (xf, yf) that are information indicating a location of an upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment of the disclosure, the image decoding apparatus 100 may determine the width of the left coding unit 660a to be xe-xd. The image decoding apparatus 100 may determine the height of the left coding unit 660a to be the height of the current coding unit 650. According to an embodiment of the disclosure, the image decoding apparatus 100 may determine the width of the middle coding unit 660b to be xf-xe. The image decoding apparatus 100 may determine the height of the middle coding unit 660b to be the height of the current coding unit 650. According to an embodiment of the disclosure, the image decoding apparatus 100 may determine the width or height of the right coding unit 660c by using the width or height of the current coding unit 650 and the widths or heights of the left coding unit 660a and the middle coding unit 660b. The image decoding apparatus 100 may determine a coding unit, which has a size different from that of the other coding units, based on the determined widths and heights of the coding units 660a, 660b, and 660c. Referring to FIG. 6, the image decoding apparatus 100 may determine the middle coding unit 660b, which has a size different from the size of the left coding unit 660a and the right coding unit 660c, as the coding unit of the certain location. However, the above-described process in which the image decoding apparatus 100 determines a coding unit having a size different from the size of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment of the disclosure, the image decoding apparatus 100 may select a coding unit at a certain location from among an odd number of coding units determined by splitting the current coding unit, by considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment of the disclosure, the image decoding apparatus 100 may use information indicating respective locations of an even number of coding units, to determine the coding unit at the certain location from among the even number of coding units. The image decoding apparatus 100 may determine an even number of coding units by splitting (binary splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above with reference to FIG. 6, and thus redundant or duplicative descriptions thereof may be omitted.

According to an embodiment of the disclosure, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment of the disclosure, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, may determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment of the disclosure, the image decoding apparatus 100 may determine the sample 640 at the center location of the current coding unit 600 as the sample from which the certain information may be obtained, and may put a certain restriction on the coding unit 620b including the sample 640, in a decoding process. However, the location of the sample from which the certain information may be obtained is not limited to the above-described location, and may include arbitrary locations of samples included in the coding unit 620b to be determined for a restriction.

According to an embodiment of the disclosure, the location of the sample from which the certain information may be obtained may be determined based on the shape of the current coding unit 600. According to an embodiment of the disclosure, the block shape information may indicate whether the current coding unit has a square or non-square shape, and the location of the sample from which the certain information may be obtained may be determined based on the shape. For example, the image decoding apparatus 100 may determine a sample located at a boundary for splitting at least one of a width or height of the current coding unit in half, as the sample from which the certain information may be obtained, by using at least one of information about the width of the current coding unit or information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the certain information may be obtained.

According to an embodiment of the disclosure, when the current coding unit is split into a plurality of coding units, the image decoding apparatus 100 may use the split shape mode information to determine a coding unit at a certain location from among the plurality of coding units. According to an embodiment of the disclosure, the image decoding apparatus 100 may obtain the split shape mode information from a sample at a certain location in a coding unit, and may split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. A process of recursively splitting a coding unit has been described above with reference to FIG. 5, and thus redundant or duplicative descriptions thereof may be omitted.

According to an embodiment of the disclosure, the image decoding apparatus 100 may determine one or more coding units by splitting the current coding unit, and may determine an order of decoding the one or more coding units, based on a certain block (e.g., the current coding unit).

Figure 7:
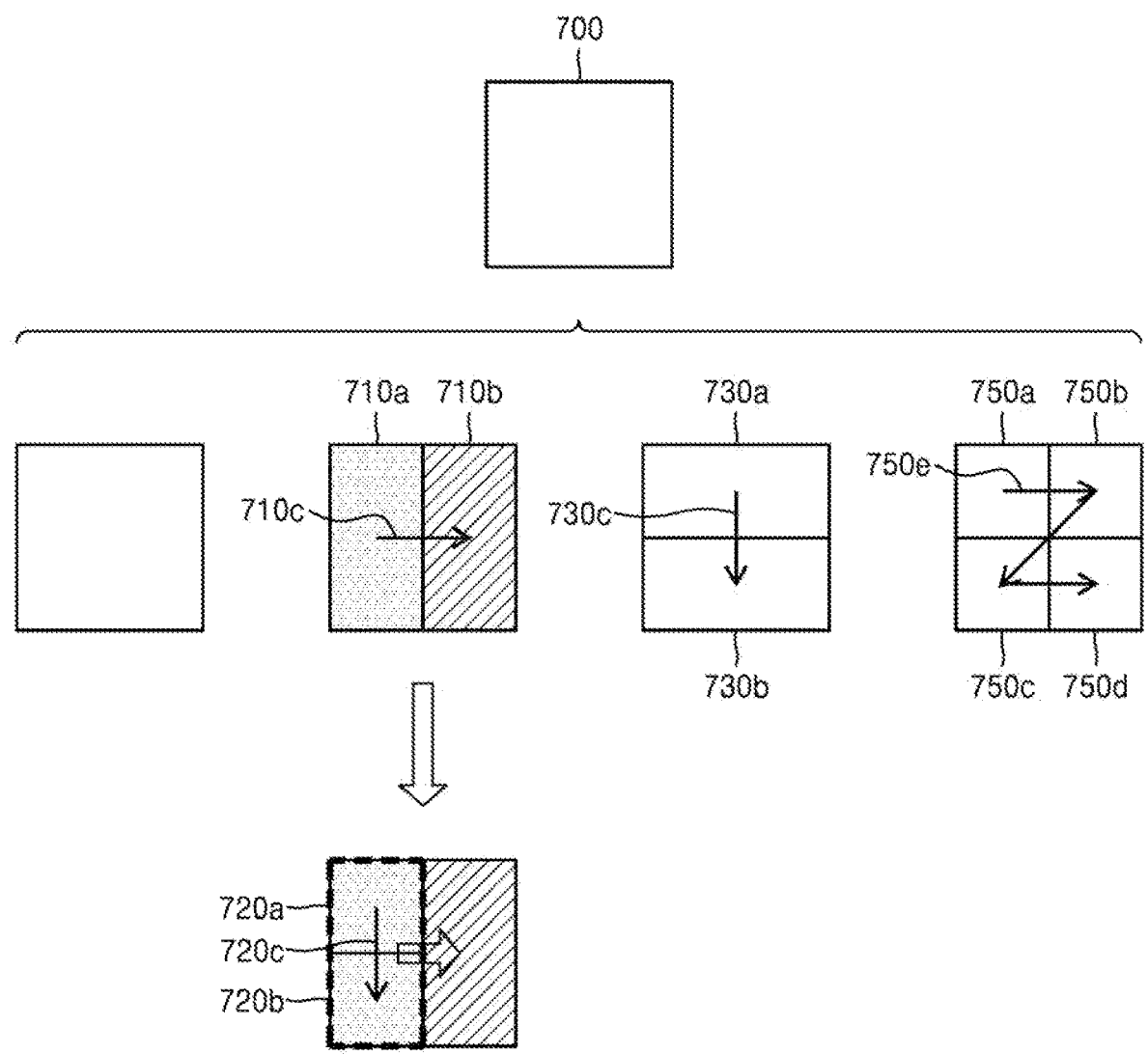
FIG. 7 illustrates an order of processing a plurality of coding units when an image decoding apparatus determines the plurality of coding units by splitting a current coding unit, according to an embodiment of the disclosure.

FIG. 7 illustrates an order of processing a plurality of coding units when an image decoding apparatus determines the plurality of coding units by splitting a current coding unit, according to an embodiment of the disclosure.

According to an embodiment of the disclosure, the image decoding apparatus 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a*, 750*b*, 750*c*, and 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine the second coding units 750*a*, 750*b*, 750*c*, and 750*d*, which are determined by splitting the first coding unit 700 in vertical and horizontal directions, according to a certain order (by which coding units in a row are processed and then coding units in a next row are processed (e.g., a raster scan order or Z-scan order 750*e*).

According to an embodiment of the disclosure, the image decoding apparatus 100 may recursively split coding units. Referring to FIG. 7, the image decoding apparatus 100 may determine the plurality of coding units 710*a* and 710*b*, 730*a* and 730*b*, or 750*a*, 750*b*, 750*c*, and 750*d* by splitting the first coding unit 700, and may recursively split each of the determined plurality of coding units 710*a*, 710*b*, 730*a*, 730*b*, 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. Accordingly, each of the plurality of coding units 710*a* and 710*b*, 730*a* and 730*b*, or 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment of the disclosure, the image decoding apparatus 100 may determine third coding units 720*a* and 720*b* by splitting the left second coding unit 710*a* in a horizontal direction, and may not split the right second coding unit 710*b*.

According to an embodiment of the disclosure, a processing order of coding units may be determined based on a process of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. A process of determining a processing order of coding units based on a coding unit before being split is not limited to the above-described example, and various methods may be used to independently process coding units, which are split and determined to various shapes, in a certain order.

Figure 8:
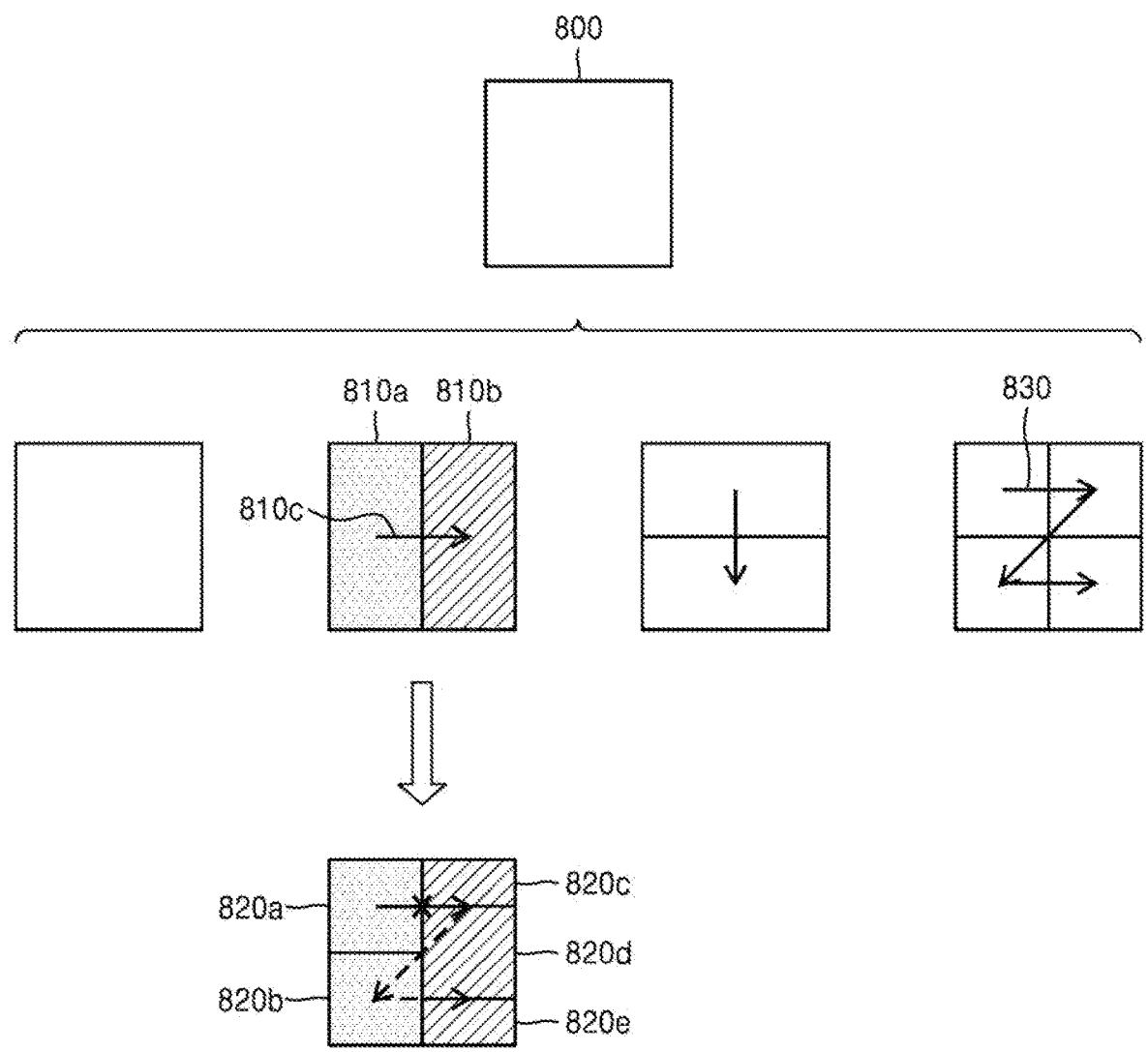
FIG. 8 illustrates a process in which an image decoding apparatus determines that a current coding unit is to be split into an odd number of coding units, when the coding units are not processable in a certain order, according to an embodiment of the disclosure.

FIG. 8 illustrates a process in which an image decoding apparatus determines that a current coding unit is to be split into an odd number of coding units, when the coding units are not processable in a certain order, according to an embodiment of the disclosure.

According to an embodiment of the disclosure, the image decoding apparatus 100 may determine that the current coding unit is to be split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c*, 820*d*, and 820*e*. According to an embodiment of the disclosure, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c*, 820*d*, and 820*e*.

According to an embodiment of the disclosure, the image decoding apparatus 100 may determine whether any coding unit is split into an odd number of coding units, by determining whether the third coding units 820*a* and 820*b*, and 820*c*, 820*d*, and 820*e* are processable in a certain order. Referring to FIG. 8, the image decoding apparatus 100 may determine the third coding units 820*a* and 820*b*, and 820*c*, 820*d*, and 820*e* by recursively splitting the first coding unit 800. The image decoding apparatus 100 may determine whether any of the first coding unit 800, the second coding units 810*a* and 810*b*, or the third coding units 820*a* and 820*b*, and 820*c*, 820*d*, and 820*e* are split into an odd number of coding units, based on at least one of the block shape information or the split shape mode information. For example, a right coding unit from among the second coding units 810*a* and 810*b* may be split into an odd number of third coding units 820*c*, 820*d*, and 820*e*. A processing order of a plurality of coding units included in the first coding unit 800 may be a certain order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the certain order.

According to an embodiment of the disclosure, the image decoding apparatus 100 may determine whether the third coding units 820*a* and 820*b*, and 820*c*, 820*d*, and 820*e* included in the first coding unit 800 satisfy the condition for processing in the certain order, and the condition relates to whether at least one of a width or height of the second coding units 810*a* and 810*b* is to be split in half along a boundary of the third coding units 820*a* and 820*b*, and 820*c*, 820*d*, and 820*e*. For example, the third coding units 820*a* and 820*b* determined when the height of the left second coding unit 810*a* of the non-square shape is split in half may satisfy the condition. It may be determined that the third coding units 820*c*, 820*d*, and 820*e* do not satisfy the condition because the boundaries of the third coding units 820*c*, 820*d*, and 820*e* determined when the right second coding unit 810*b* is split into three coding units are unable to split the width or height of the right second coding unit 810*b* in half. When the condition is not satisfied as described above, the image decoding apparatus 100 may decide disconnection of a scan order, and may determine that the right second coding unit 810*b* is to be split into an odd number of coding units, based on a result of the decision. According to an embodiment of the disclosure, when a coding unit is split into an odd number of coding units, the image decoding apparatus 100 may put a certain restriction on a coding unit at a certain location from among the split coding units. The restriction or the certain location has been described above through various embodiments of the disclosure, and thus redundant or duplicative descriptions thereof may be omitted.

Figure 9:
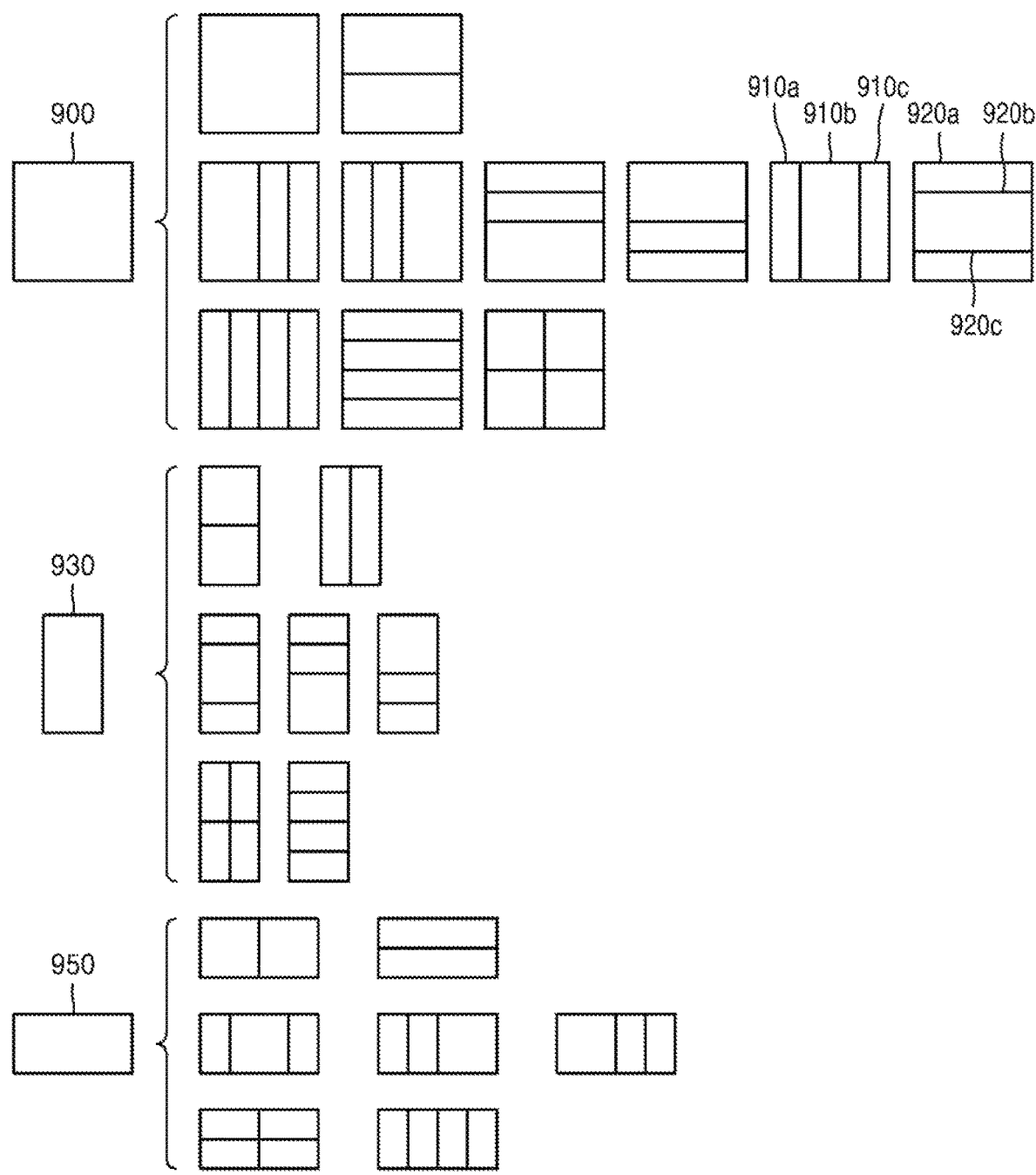
FIG. 9 illustrates a process in which an image decoding apparatus determines at least one coding unit by splitting a first coding unit, according to an embodiment of the disclosure.

FIG. 9 illustrates a process in which an image decoding apparatus determines at least one coding unit by splitting a first coding unit, according to an embodiment of the disclosure.

According to an embodiment of the disclosure, the image decoding apparatus 100 may split a first coding unit 900, based on split shape mode information, which is obtained by the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. For example when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment of the disclosure, the image decoding apparatus 100 may determine whether the second coding units 910*a*, 910*b*, 910*c*, 920*a*, 920*b*, and 920*c* included in the first coding unit 900 satisfy a condition for processing in a certain order, and the condition relates to whether at least one of a width or height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the certain order. Also, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is to be split into an odd number of coding units, based on a result of the decision. According to an embodiment of the disclosure, when a coding unit is split into an odd number of coding units, the image decoding apparatus 100 may put a certain restriction on a coding unit at a certain location from among the split coding units. The restriction or the certain location has been described above through various embodiments of the disclosure, and thus redundant or duplicative descriptions thereof may be omitted.

According to an embodiment of the disclosure, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
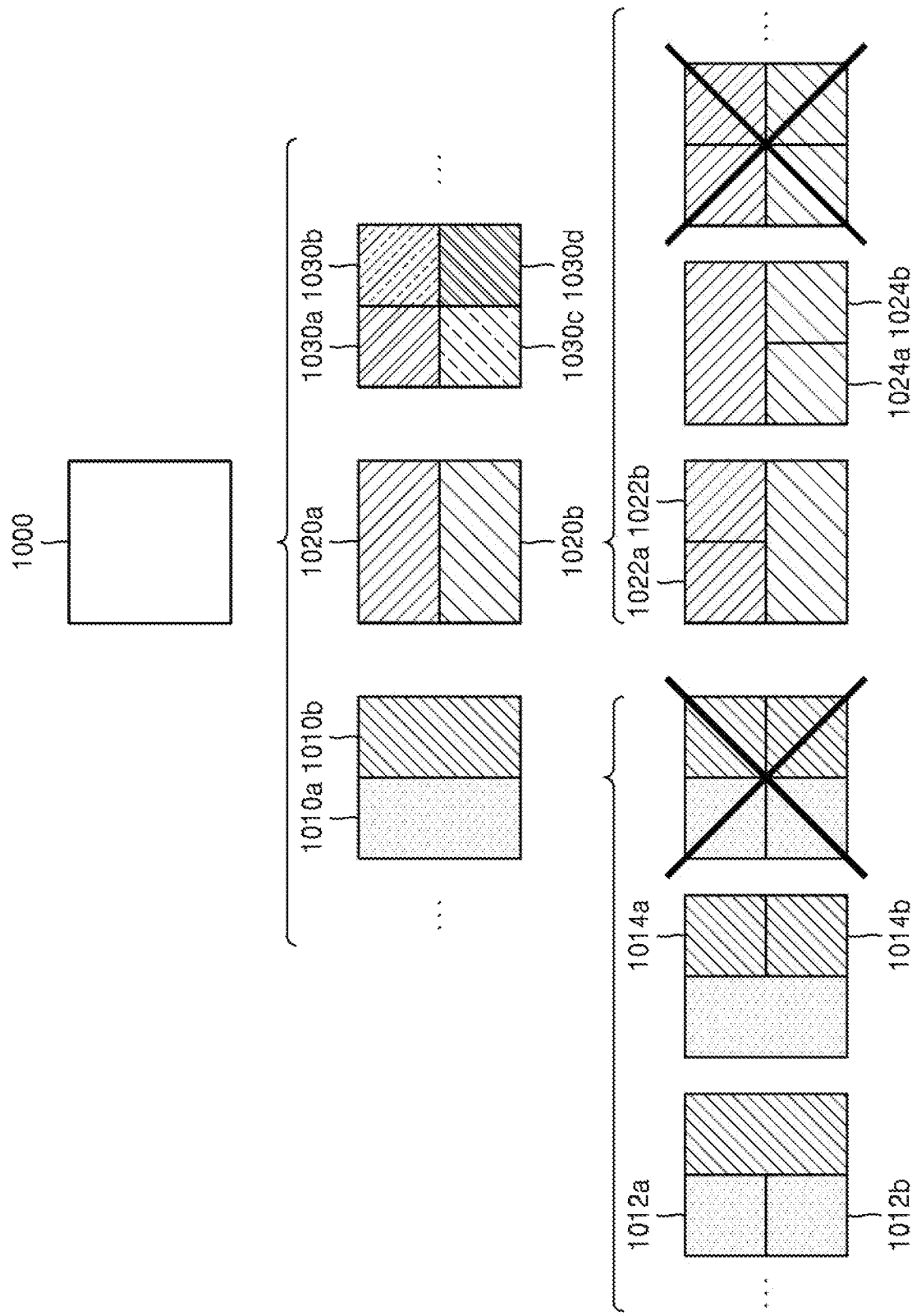
FIG. 10 illustrates an example in which a shape into which a second coding unit is splittable is restricted when the second coding unit having a non-square shape, which is determined when an image decoding apparatus splits a first coding unit, satisfies a certain condition, according to an embodiment of the disclosure.

FIG. 10 illustrates that a shape into which a second coding unit is splittable is restricted when the second coding unit having a non-square shape, which is determined when an image decoding apparatus splits a first coding unit, satisfies a certain condition, according to an embodiment of the disclosure.

According to an embodiment of the disclosure, the image decoding apparatus 100 may determine to split a square first coding unit 1000 into non-square second coding units 1010*a*, and 1010*b* or 1020*a* and 1020*b*, based on split shape mode information, which is obtained by the receiver 110. The second coding units 1010*a* and 1010*b*, or 1020*a* and 1020*b* may be independently split. Accordingly, the image decoding apparatus 100 may determine to split or not to split each of the second coding units 1010*a* and 1010*b*, or 1020*a* and 1020b into a plurality of coding units, based on the split shape mode information of each of the second coding units 1010a and 1010b, or 1020a and 1020b. According to an embodiment of the disclosure, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in the same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment of the disclosure, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
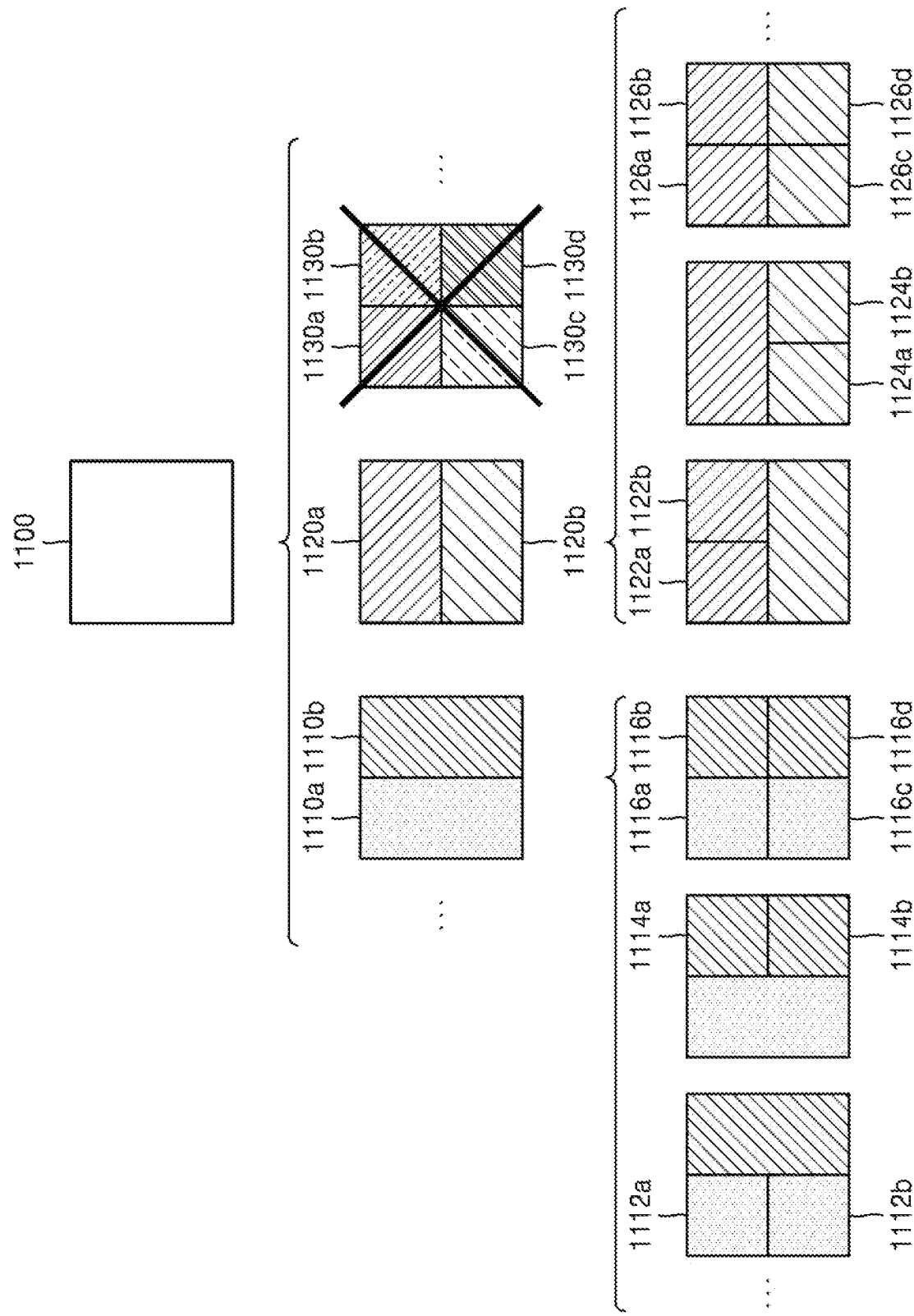
FIG. 11 illustrates a process in which an image decoding apparatus splits a square coding unit when split shape mode information indicates that the square coding unit is not to be split into four square coding units, according to an embodiment of the disclosure.

FIG. 11 illustrates a process in which an image decoding apparatus splits a square coding unit when split shape mode information indicates that the square coding unit is not to be split into four square coding units, according to an embodiment of the disclosure.

According to an embodiment of the disclosure, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit, but the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment of the disclosure, the image decoding apparatus 100 may independently split the non-square second coding units 1110a and 1110b, or 1120a and 1120b, etc. Each of the second coding units 1110a and 1110b, or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
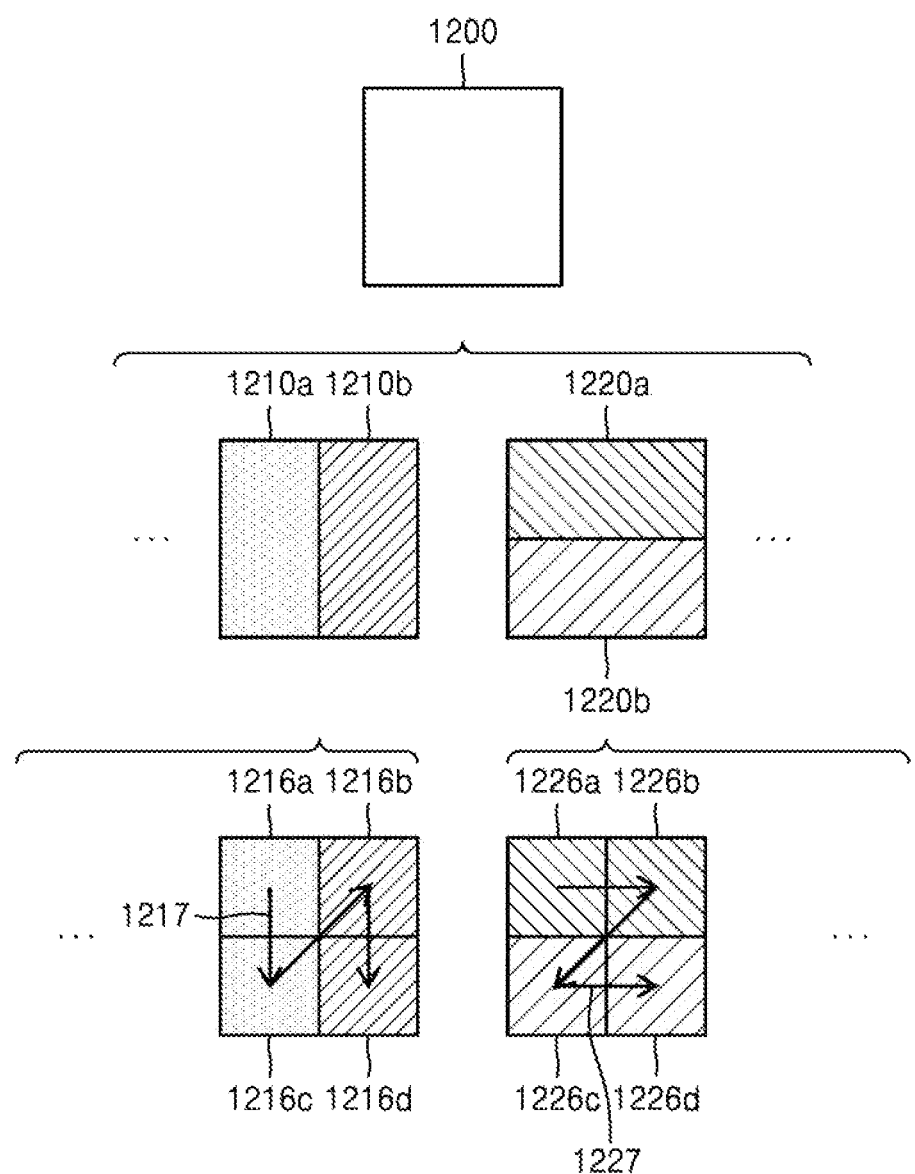
FIG. 12 illustrates an example in which a processing order between a plurality of coding units may vary according to a process of splitting a coding unit, according to an embodiment of the disclosure.

FIG. 12 illustrates that a processing order between a plurality of coding units may vary according to a process of splitting a coding unit, according to an embodiment of the disclosure.

According to an embodiment of the disclosure, the image decoding apparatus 100 may split a first coding unit 1200, based on split shape mode information. When a block shape indicates a square shape and the split shape mode information indicates to split the first coding unit 1200 in at least one of a horizontal or vertical direction, the image decoding apparatus 100 may determine second coding units (e.g., 1210a and 1210b, or 1220a and 1220b, etc.) by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. A process of splitting the second coding units 1210a and 1210b, or 1220a and 1220b has been described above with reference to FIG. 11, and thus detailed descriptions thereof are omitted.

According to an embodiment of the disclosure, the image decoding apparatus 100 may process coding units in a certain order. An operation of processing coding units in a certain order has been described above with reference to FIG. 7, and thus redundant or duplicative descriptions thereof may be omitted. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment of the disclosure, the image decoding apparatus 100 may determine processing orders of the third coding units 1216a, 1216b, 1216c, and 1216d, and 1226a, 1226b, 1226c, and 1226d based on a split shape into which the first coding unit 1200 is split.

According to an embodiment of the disclosure, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment of the disclosure, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to have the same shape.

FIG. 13 illustrates a process of determining a depth of a coding unit as a shape and a size of the coding unit change, when the coding unit is recursively split to determine a plurality of coding units, according to an embodiment of the disclosure.

According to an embodiment of the disclosure, the image decoding apparatus 100 may determine a depth of a coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is represented as a coding unit of a lower depth.

Referring to FIG. 13, according to an embodiment of the disclosure, the image decoding apparatus 100 may determine a second coding unit 1302 and a third coding unit 1304 of lower depths by splitting a square first coding unit 1300 based on block shape information indicating a square shape (e.g., the block shape information may be represented as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and the height of which are ½ times those of the first coding unit 1300, may be D+1, and a depth of the third coding unit 1304, the width and the height of which are ¼ times those of the first coding unit 1300, may be D+2.

According to an embodiment of the disclosure, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be represented as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by splitting at least one of a width or height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment of the disclosure, the image decoding apparatus 100 may determine a second coding unit (e.g., 1302, 1312, or 1322) by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment of the disclosure, the image decoding apparatus 100 may determine a third coding unit (e.g., 1304, 1314, or 1324) by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment of the disclosure, the image decoding apparatus 100 may determine a third coding unit (e.g., 1304, 1314, or 1324) by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment of the disclosure, the image decoding apparatus 100 may determine a third coding unit (e.g., 1304, 1314, or 1324) by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment of the disclosure, the image decoding apparatus 100 may split a square coding unit (e.g., 1300, 1302, or 1304) in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment of the disclosure, when a depth is determined based on the length of a longest side of a coding unit, a depth of a coding unit determined by splitting the first coding unit 1300 having a size of 2N×2N in a horizontal or vertical direction may be the same as the depth of the first coding unit 1300.

According to an embodiment of the disclosure, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and the height of which are ½ times those of the first coding unit 1310 or 1320, may be D+1, and a depth of the third coding unit 1314 or 1324, the width and the height of which are ¼ times those of the first coding unit 1310 or 1320, may be D+2.

Figure 14:
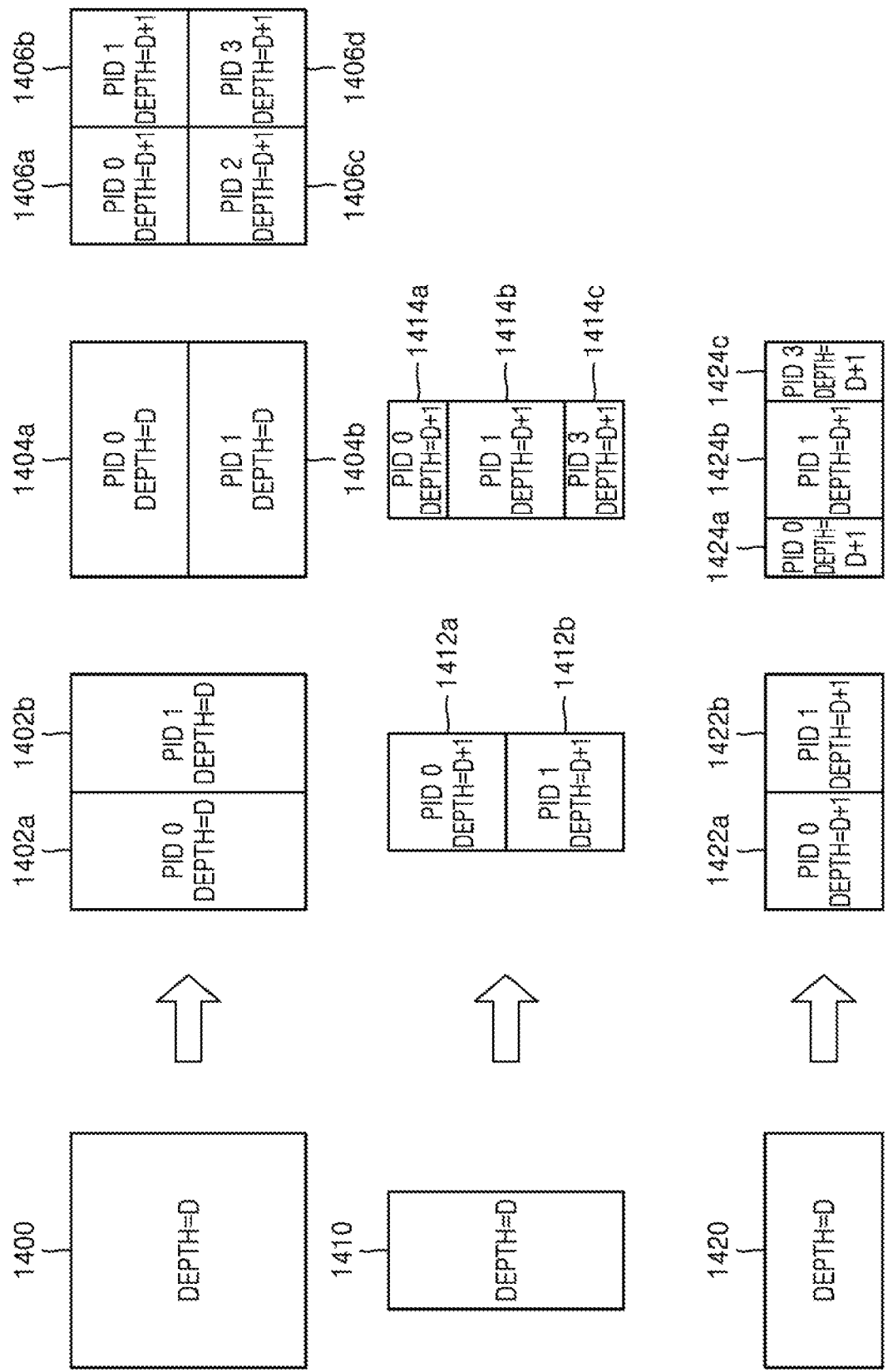
FIG. 14 illustrates depths that are determinable based on shapes and sizes of coding units, and part indexes (PIDs) that are for distinguishing the coding units, according to an embodiment of the disclosure.

FIG. 14 illustrates depths that are determinable based on shapes and sizes of coding units, and part indexes (PIDs) that are for distinguishing the coding units, according to an embodiment of the disclosure.

According to an embodiment of the disclosure, the image decoding apparatus 100 may determine various-shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of a vertical or horizontal direction based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment of the disclosure, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment of the disclosure, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment of the disclosure, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment of the disclosure, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment of the disclosure, the image decoding apparatus 100 may determine PIDs for identifying split coding units, based on a size ratio between the coding units when an odd number of split coding units do not have the same size. Referring to FIG. 14, the coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Accordingly, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment of the disclosure, the image decoding apparatus 100 may determine whether an odd number of split coding units do not have the same size, based on whether discontinuity is present in PIDs for identifying the split coding units.

According to an embodiment of the disclosure, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units in order to identify the respective coding units. According to an embodiment of the disclosure, the PID may be obtained from a sample at a certain location of each coding unit (e.g., an upper left sample).

According to an embodiment of the disclosure, the image decoding apparatus 100 may determine a coding unit at a certain location from among the split coding units, by using the PIDs for distinguishing the coding units. According to an embodiment of the disclosure, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment of the disclosure, the image decoding apparatus 100 may determine PIDs for distinguishing split coding units, based on a size ratio between the coding units when the split coding units do not have the same size. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment of the disclosure, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location to be determined are not limited to the above-described examples, and various PIDs and various locations and sizes of coding units may be used.

According to an embodiment of the disclosure, the image decoding apparatus 100 may use a certain data unit where a coding unit starts to be recursively split.

Figure 15:
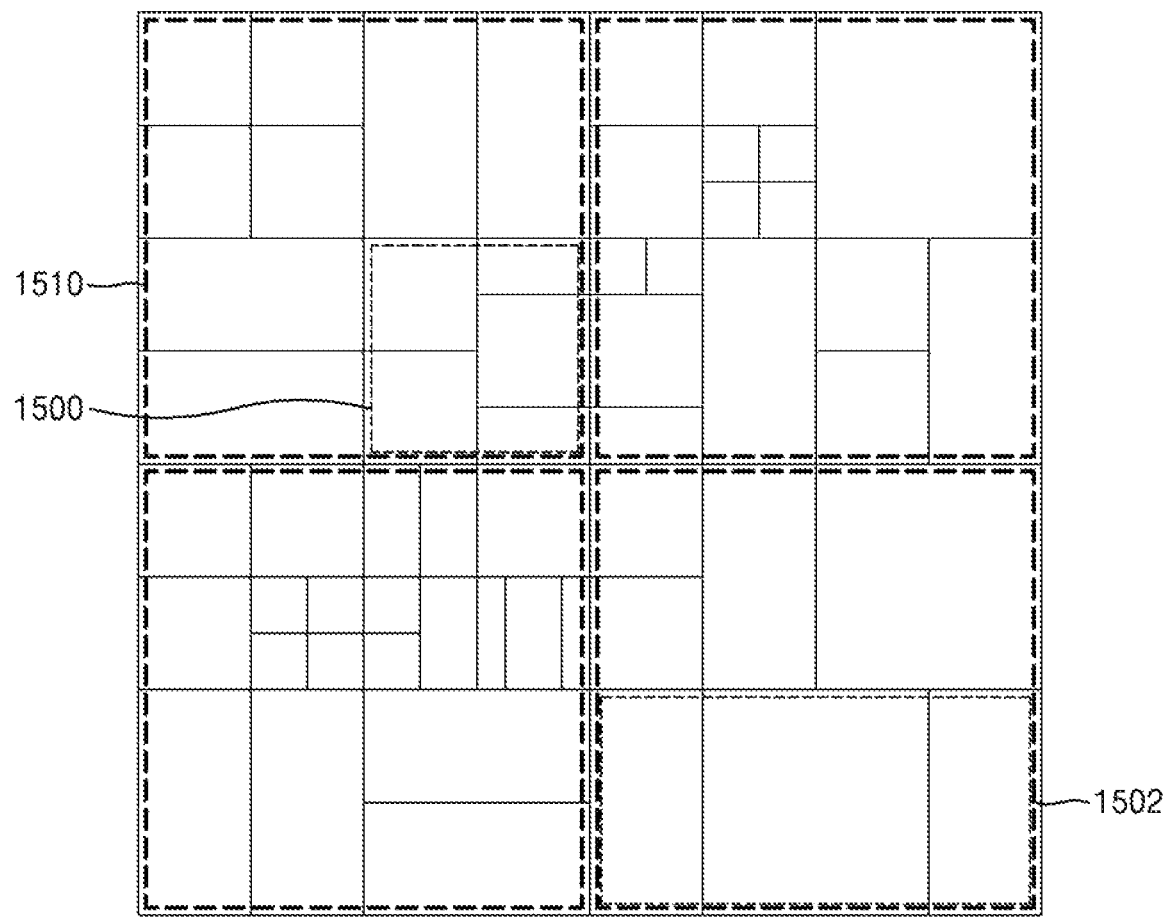
FIG. 15 illustrates an example in which a plurality of coding units are determined according to a plurality of certain data units included in a picture, according to an embodiment of the disclosure.

FIG. 15 illustrates that a plurality of coding units are determined based on a plurality of certain data units included in a picture, according to an embodiment of the disclosure.

According to an embodiment of the disclosure, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment of the disclosure, the reference data unit may have a certain size and a certain shape. According to an embodiment of the disclosure, a reference coding unit may include M×N samples. Herein, M and N may be equal to each other, and may be integers represented as powers of 2. That is, the reference data unit may have a square or non-square shape, and may be split into an integer number of coding units.

According to an embodiment of the disclosure, the image decoding apparatus 100 may split the current picture into a plurality of reference data units. According to an embodiment of the disclosure, the image decoding apparatus 100 may split the plurality of reference data units, which are split from the current picture, by using the split shape mode information of each reference data unit. The process of splitting the reference data unit may correspond to a splitting process using a quadtree structure.

According to an embodiment of the disclosure, the image decoding apparatus 100 may pre-determine a minimum size allowed for the reference data units included in the current picture. Accordingly, the image decoding apparatus 100 may determine reference data units having various sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment of the disclosure, the shape and size of reference coding units may be determined based on various data units capable of including one or more reference coding units (e.g., sequences, pictures, slices, slice segments, tiles, tile groups, largest coding units, or the like).

According to an embodiment of the disclosure, the receiver 110 of the image decoding apparatus 100 may obtain, from a bitstream, at least one of reference coding unit shape information or reference coding unit size information for each of the various data units. A process of splitting the square reference coding unit 1500 into one or more coding units has been described above in relation to the process of splitting the current coding unit 300 of FIG. 3, and a process of splitting the non-square reference coding unit 1502 into one or more coding units has been described above in relation to the process of splitting the current coding unit 400 or 450 of FIG. 4, and thus redundant or duplicative descriptions thereof may be omitted.

According to an embodiment of the disclosure, the image decoding apparatus 100 may use a PID for identifying the size and shape of reference coding units, to determine the size and shape of reference coding units according to some data units pre-determined based on a certain condition. That is, the receiver 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units for each data unit, which satisfies the certain condition, by using the PID. When the reference coding unit shape information and the reference coding unit size information are obtained and used from the bitstream according to each data unit having a relatively small size, the efficiency of using the bitstream may not be high, and therefore, only the PID may be obtained and used instead of directly obtaining the reference coding unit shape information and the reference coding unit size information. In this case, at least one of the size or shape of reference coding units corresponding to the PID for identifying the size and shape of reference coding units may be pre-determined. That is, the image decoding apparatus 100 may determine at least one of the size or shape of reference coding units included in a data unit serving as a unit for obtaining the PID, by selecting the pre-determined at least one of the size or shape of reference coding units based on the PID.

According to an embodiment of the disclosure, the image decoding apparatus 100 may use one or more reference coding units included in a largest coding unit. That is, a largest coding unit split from a picture may include one or more reference coding units, and coding units may be determined by recursively splitting each reference coding unit. According to an embodiment of the disclosure, at least one of a width or height of the largest coding unit may be integer times at least one of the width or height of the reference coding units. According to an embodiment of the disclosure, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information or the split shape mode information according to various embodiments of the disclosure.

Figure 16:
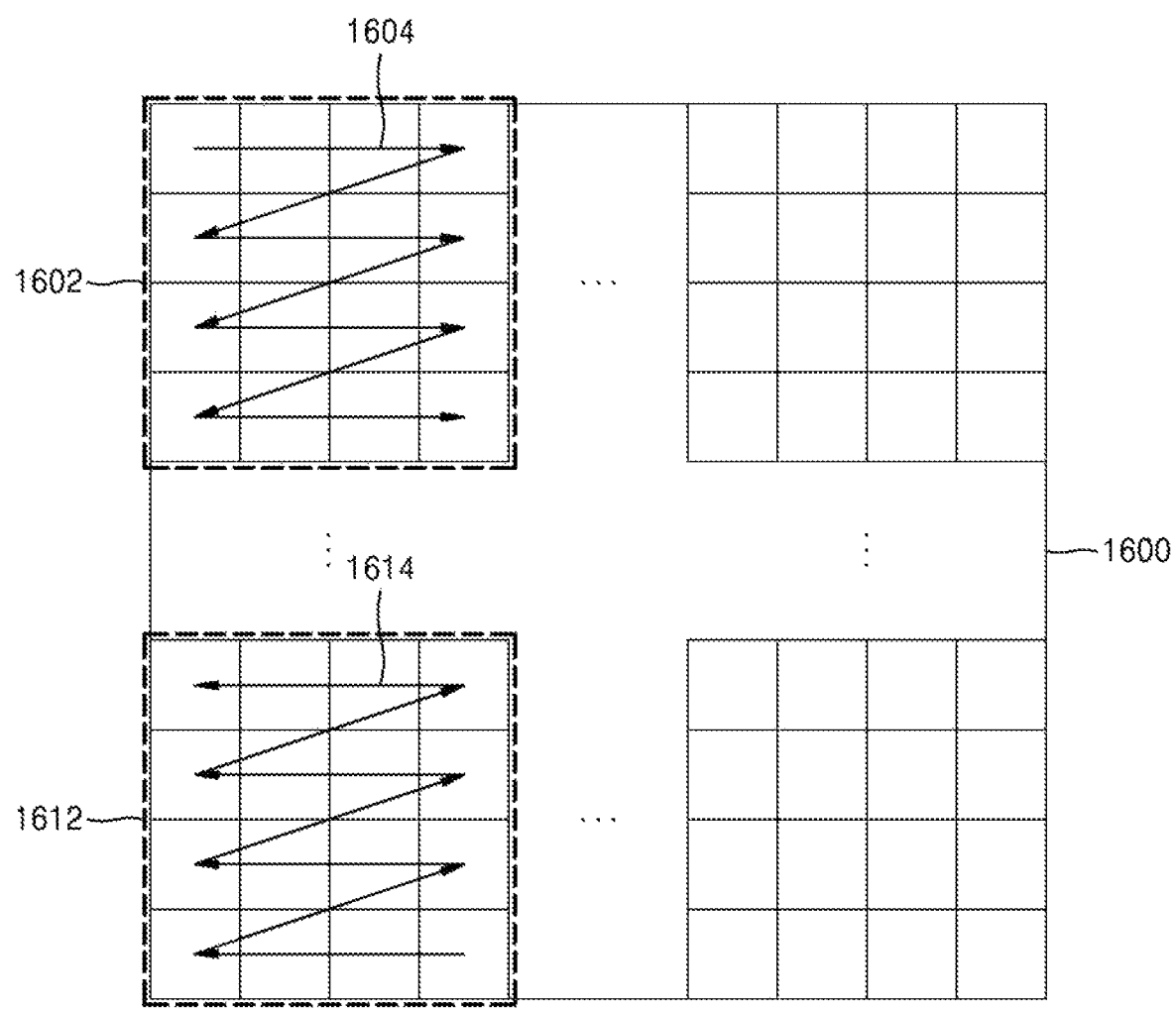
FIG. 16 illustrates a processing block serving as a unit for determining a determination order of reference coding units included in a picture, according to an embodiment of the disclosure.

FIG. 16 illustrates a processing block serving as a unit for determining a determination order of reference coding units included in a picture, according to an embodiment of the disclosure.

According to an embodiment of the disclosure, the image decoding apparatus 100 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of types of various orders of determining reference coding units, and may vary according to the processing block. The determination order of reference coding units determined for each processing block may be one of various orders, such as raster scan, Z-scan, N-scan, up-right diagonal scan, horizontal scan, or vertical scan, but is not limited to the scan orders.

According to an embodiment of the disclosure, the image decoding apparatus 100 may obtain processing block size information and may determine the size of one or more processing blocks included in the image. The image decoding apparatus 100 may obtain the processing block size information from a bitstream and may determine the size of one or more processing blocks included in the image. The size of processing blocks may be a certain size of data units indicated by the processing block size information.

According to an embodiment of the disclosure, the receiver 110 of the image decoding apparatus 100 may obtain the processing block size information from the bitstream for each specific data unit. For example, the processing block size information may be obtained from the bitstream in a data unit such as an image, a sequence, a picture, a slice, a slice segment, a tile, or a tile group. That is, the receiver 110 may obtain the processing block size information from the bitstream for each of the various data units, the image decoding apparatus 100 may determine the size of one or more processing blocks split from the picture by using the obtained processing block size information, and the size of the processing blocks may be integer times that of the reference coding units.

According to an embodiment of the disclosure, the image decoding apparatus 100 may determine the size of processing blocks 16021 and 1612 included in a picture 1600. For example, the image decoding apparatus 100 may determine the size of processing blocks based on the processing block size information obtained from the bitstream. Referring to FIG. 16, according to an embodiment of the disclosure, the image decoding apparatus 100 may determine a width of the processing blocks 1602 and 1612 to be 4 times the width of the reference coding units and a height of the processing blocks 1602 and 1612 to be 4 times the height of the reference coding units. The image decoding apparatus 100 may determine a determination order of one or more reference coding units in one or more processing blocks.

According to an embodiment of the disclosure, the image decoding apparatus 100 may determine the processing blocks 1602 and 1612 included in the picture 1600 based on the size of processing blocks, and may determine a determination order of one or more reference coding units included in the processing blocks 1602 and 1612. According to an embodiment of the disclosure, determining of reference coding units may include determination of the size of the reference coding units.

According to an embodiment of the disclosure, the image decoding apparatus 100 may obtain, from the bitstream, determination order information of one or more reference coding units included in one or more processing blocks, and may determine a determination order of one or more reference coding units based on the obtained determination order information. The determination order information may be defined as an order or direction of determining the reference coding units in the processing block. That is, the determination order of reference coding units may be independently determined for each processing block.

According to an embodiment of the disclosure, the image decoding apparatus 100 may obtain, from the bitstream, the determination order information of reference coding units for each specific data unit. For example, the receiver 110 may obtain the determination order information of reference coding units from the bitstream for each data unit, such as an image, a sequence, a picture, a slice, a slice segment, a tile, a tile group, or a processing block. Because the determination order information of reference coding units indicates an order of determining reference coding units in a processing block, the determination order information may be obtained for each specific data unit including an integer number of processing blocks.

According to an embodiment of the disclosure, the image decoding apparatus 100 may determine one or more reference coding units based on the determined determination order.

According to an embodiment of the disclosure, the receiver 110 may obtain the determination order information of reference coding unit from the bitstream as information related to the processing blocks 1602 and 1612, and the image decoding apparatus 100 may determine a determination order of one or more reference coding units included in the processing blocks 1602 and 1612 and may determine one or more reference coding units included in the picture 1600 based on the determination order. Referring to FIG. 16, the image decoding apparatus 100 may determine orders 1604 and 1614 of one or more reference coding units respectively related to the processing blocks 1602 and 1612. For example, when the determination order information of reference coding units is obtained for each processing block, different kinds of determination order information of reference coding units may be obtained for the processing blocks 1602 and 1612. When the determination order 1604 of reference coding units related to the processing block 1602 is a raster scan order, reference coding units included in the processing block 1602 may be determined according to the raster scan order. In contrast, when the determination order 1614 of reference coding units related to the processing block 1612 is a backward raster scan order, reference coding units included in the processing block 1612 may be determined according to the backward raster scan order.

According to an embodiment of the disclosure, the image decoding apparatus 100 may decode the determined one or more reference coding units. The image decoding apparatus 100 may decode an image based on the reference coding units determined through the above embodiment of the disclosure. A method of decoding the reference coding units may include various image decoding methods.

According to an embodiment of the disclosure, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block and may use the obtained syntax element.

Hereinafter, an example of a method of determining a split rule according to an embodiment of the disclosure is described in detail.

The image decoding apparatus 100 may determine a split rule of an image. The split rule may be pre-determined between the image decoding apparatus 100 and the image encoding apparatus 2900. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, a shape, a ratio of width and height, and a direction of the coding unit. The image encoding apparatus 2900 and the image decoding apparatus 100 may pre-determine to determine the split rule based on the block shape of the coding unit. However, an embodiment of the disclosure is not limited thereto. The image decoding apparatus 100 may determine the split rule based on the information obtained from the bitstream received from the image encoding apparatus 2900.

The shape of the coding unit may include a square and a non-square. When the lengths of the width and the height of the coding unit are the same, the image decoding apparatus 100 may determine the shape of the coding unit to be a square. Also, when the lengths of the width and the height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, . . . and 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of long sides as having the same size. Also, the image decoding apparatus 100 may apply the same split rule to coding units having the same lengths of long sides.

The ratio of the width and the height of the coding unit may include 1:2, 2:1, 1:4, 4:1, 1:8, 8:1, 1:16, 16:1, 32:1, 1:32, or the like. Also, the direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 2900 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule so that coding units generated via different splitting paths do not have the same block shape. However, an embodiment of the disclosure is not limited thereto, and the coding units generated via different splitting paths have the same block shape. The coding units generated via the different splitting paths may have different decoding processing orders. Because the decoding processing orders have been described above with reference to FIG. 12, redundant or duplicative descriptions thereof may be omitted.

Figure 17A:
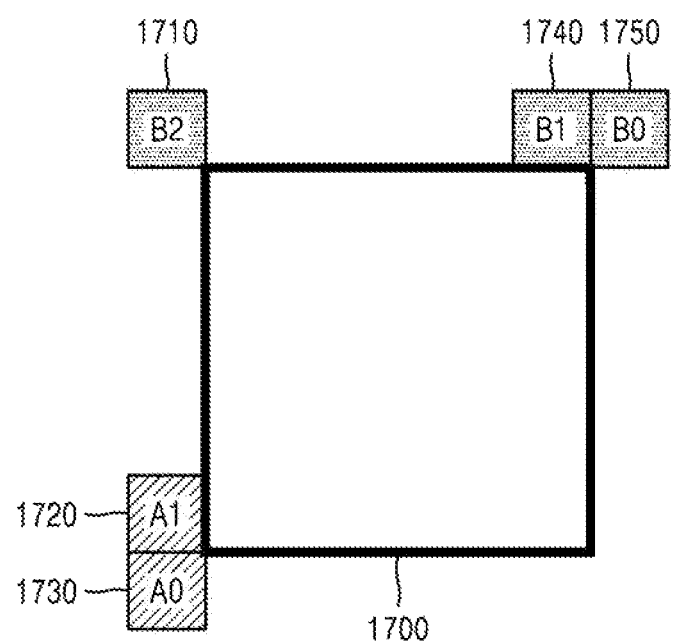
FIG. 17A is a diagram for describing a method of obtaining a parameter candidate of a model for determining a motion vector from a neighboring block, according to an embodiment of the disclosure.

FIG. 17A is a diagram for describing a method of obtaining a parameter candidate of a model for determining a motion vector from a neighboring block, according to an embodiment of the disclosure.

Referring to FIG. 17A, when a current block 1700 is in a prediction mode in which prediction is performed in units of sub-blocks, a parameter candidate of a model for determining a motion vector may be obtained from a neighboring block predicted in units of sub-blocks from among neighboring blocks, and the obtained parameter candidate may be used for sub-block unit prediction. In an embodiment of the disclosure, the model for determining the motion vector may be referred to as a motion vector model.

A "sub-block unit mode" may refer to a mode in which prediction is performed for each sub-block unit, and may include, for example, an affine mode. A size of a sub-block may be 4×4.

It may be determined whether a lower left neighboring block A0 1730 located on a lower left side of the current block 1700 is predicted in a sub-block unit mode, and when the lower left neighboring block A0 1730 is predicted in the sub-block unit mode, a parameter used in the lower left neighboring block A0 1730 may be determined as a parameter candidate of a model for determining a motion vector. When the lower left neighboring block A0 1730 is not predicted in the sub-block unit mode, it may be determined whether a left neighboring block A1 1720 located on a left side of the current block 1700 is predicted in the sub-block unknit mode, and when the left neighboring block A1 1720 is predicted in the sub-block unit mode, a parameter used in the left neighboring block A1 1720 may be used as a parameter candidate of a model for determining a motion vector.

Also, it may be determined whether an upper right neighboring block B0 1750 located on an upper right side of the current block 1700 is predicted in the sub-block unit mode, and when the upper right neighboring block B0 1750 is predicted in the sub-block unit mode, a parameter used in the upper right neighboring block B0 1750 may be determined as a parameter candidate of a model for determining a motion vector. When the upper right neighboring block B0 1750 is not predicted in the sub-block unit mode, it may be determined whether an upper neighboring block B1 1740 located above the current block 1700 is predicted in the sub-block unit mode, and when the upper neighboring block B1 1740 is predicted in the sub-block unit mode, a parameter used in the upper neighboring block B1 1740 may be determined as a parameter candidate of a model for determining a motion vector. When the upper neighboring block B1 1740 is not predicted in the sub-block unit mode, it may be determined whether an upper left neighboring block B2 1710 located on an upper left side of the current block 1700 is predicted in the sub-block unit mode, and when the upper left neighboring block B2 1710 is predicted in the sub-block unit mode, a parameter used in the upper left neighboring block B2 1710 may be used as a parameter candidate of a model for determining a motion vector.

That is, up to two parameter candidates may be determined from neighboring blocks located around the current block 1700.

An example of a model for determining a motion vector obtained from neighboring blocks is as shown in Equation 1 below:

$$\begin{bmatrix} mv_X \\ mv_Y \end{bmatrix} = \begin{bmatrix} a_{xx} & a_{xy} \\ a_{yx} & a_{yy} \end{bmatrix} \begin{bmatrix} x \\ y \end{bmatrix} + \begin{bmatrix} b_x \\ b_y \end{bmatrix} \qquad \text{[Equation 1]}$$

Here, $mv_x$ denotes an x component of a motion vector of a current sub-block on which prediction is to be performed from among sub-blocks included in the current block 1700, $mv_y$ denotes a y component of the motion vector of the current sub-block on which prediction is to be performed from among the sub-blocks included in the current block 1700, x denotes an x coordinate of the center of the current sub-block, y denotes a y coordinate of the center of the current sub-block, and $a_{xx}$, $a_{xy}$, $a_{yx}$, $a_{yy}$, $b_x$, and $b_y$ denote parameters obtained from neighboring blocks.

In Equation 1, because the number of parameters is six, the number of parameter models is six.

Also, in Equation 1, when $a_{xx}$ and $a_{yy}$ are the same and $a_{xy}$ and $a_{yx}$ are the same, because the number of parameters is four, the number of parameter models is four.

In addition to obtaining a parameter candidate from neighboring blocks, an example of a method of deriving a parameter candidate from neighboring blocks of a vertex of a current block is described with reference to FIG. 17B.

Figure 17B:
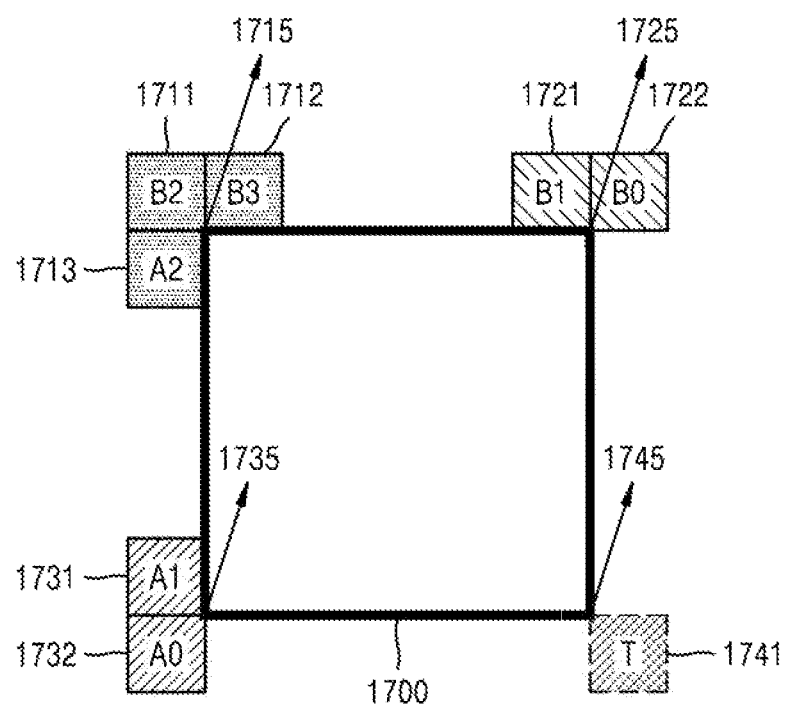
FIG. 17B is a diagram for describing a method of deriving a parameter of a model for determining a motion vector from a neighboring block, according to an embodiment of the disclosure.

FIG. 17B is a diagram for describing a method of deriving a parameter of a model for determining a motion vector from a neighboring block, according to an embodiment of the disclosure.

Referring to FIG. 17B, when the current block 1700 is in a prediction mode in which prediction is performed in units of sub-blocks, motion vectors of vertices of the current block 1700 may be obtained from neighboring blocks, a parameter candidate of a model for determining a motion vector may be obtained by using the obtained motion vectors, and the obtained parameter candidate may be used for sub-block unit prediction.

In a 4-parameter model, motion vectors of two vertices are used, and in a 6-parameter model, motion vectors of three vertices are used.

A first motion vector 1715 of an upper left vertex of the current block 1700 may be determined by identifying motion vectors in an order of an upper left neighboring block B2 1711 located on an upper left side of the current block 1700, a first upper neighboring block B3 1712 located on a right side of the upper left neighboring block B2 1711 and located above the current block 1700, and a left neighboring block A2 1713 located below the upper left neighboring block B2 1711 and located on a left side of the current block 1700.

A second motion vector 1725 of an upper right vertex of the current block 1700 may be determined by identifying motion vectors in an order of a second upper neighboring block B1 1721 located on a left side of an upper right neighboring block B0 1722 located on an upper right side of the current block 1700 and located above the current block 1700, and the upper right neighboring block B0 1722.

A third motion vector 1735 of a lower left vertex of the current block 1700 may be determined by identifying motion vectors in an order of a second left neighboring block A1 1731 located above a lower left neighboring block A0 1732 located on a lower left side of the current block 1700 and located on a left side of the current block 1700, and the lower left neighboring block A0 1732.

When a temporal motion vector 1741 for the current block 1700 is available, a fourth motion vector 1745 of a lower right vertex of the current block 1700 may be determined as the temporal motion vector 1741.

In a 4-parameter model, the first motion vector 1715 and the second motion vector 1725 may be used, or the first motion vector 1715 and the third motion vector 1735 may be used.

An example of a 4-parameter model using the first motion vector and the second motion vector 1725 is as shown in Equation 2 below:

$$\begin{cases} mv_x = \dfrac{mv_{1x} - mv_{0x}}{w}x + \dfrac{mv_{1y} - mv_{0y}}{w}y + mv_{0x} \\ mv_y = \dfrac{mv_{1y} - mv_{0y}}{w}x + \dfrac{mv_{1x} - mv_{0x}}{w}y + mv_{0y} \end{cases} \quad \text{[Equation 2]}$$

Here, $mv_x$ denotes an x component of a motion vector of a current sub-block on which prediction is to be performed from among sub-blocks included in the current block 1700, $mv_y$ denotes a y component of the motion vector of the current sub-block on which prediction is to be performed from among the sub-blocks included in the current block 1700, $mv_{0x}$ denotes an x component of the first motion vector 1715, $mv_{0y}$ denotes a y component of the first motion vector 1715, $mv_{1x}$ denotes an x component of the second motion vector 1725, $mv_{1y}$ denotes a y component of the second motion vector 1725, w denotes a width of the current block 1700, x denotes an x coordinate of the center of the current sub-block, and y denotes a y coordinate of the center of the current sub-block.

An example of a 4-parameter model using the first motion vector 1715 and the third motion vector 1735 is as shown in Equation 3 below:

$$\begin{cases} mv_x = \dfrac{mv_{2x} - mv_{0x}}{h}x + \dfrac{mv_{2y} - mv_{0y}}{h}y + mv_{0x} \\ mv_y = \dfrac{mv_{2y} - mv_{0y}}{h}x + \dfrac{mv_{2x} - mv_{0x}}{h}y + mv_{0y} \end{cases} \quad \text{[Equation 3]}$$

Here, $mv_x$ denotes an x component of a motion vector of a current sub-block on which prediction is to be performed from among sub-blocks included in the current block 1700, $mv_y$ denotes a y component of the motion vector of the current sub-block on which prediction is to be performed from among the sub-blocks included in the current block 1700, $mv_{0x}$ denotes an x component of the first motion vector 1715, $mv_{0y}$ denotes a y component of the first motion vector 1715, $mv_{2x}$ denotes an x component of the third motion vector 1735, $mv_{2y}$ denotes a y component of the third motion vector 1735, h denotes a height of the current block 1700, x denotes an x coordinate of the center of the current sub-block, and y denotes a y coordinate of the center of the current sub-block.

An example of a 6-parameter model using the first motion vector 1715, the second motion vector 1725, and the third motion vector 1735 is as shown in Equation 4 below:

$$\begin{cases} mv_x = \dfrac{mv_{1x} - mv_{0x}}{w}x + \dfrac{mv_{2x} - mv_{0x}}{h}y + mv_{0x} \\ mv_y = \dfrac{mv_{1y} - mv_{0y}}{w}x + \dfrac{mv_{2y} - mv_{0y}}{h}y + mv_{0y} \end{cases} \quad \text{[Equation 4]}$$

Here, $mv_x$ denotes an x component of a motion vector of a current sub-block on which prediction is to be performed from among sub-blocks included in the current block 1700, $mv_y$ denotes a y component of the motion vector of the current sub-block on which prediction is to be performed from among the sub-blocks included in the current block 1700, $mv_{0x}$ denotes an x component of the first motion vector 1715, $mv_{0y}$ denotes a y component of the first motion vector 1715, $mv_{1x}$ denotes an x component of the second motion vector 1725, $mv_{1y}$ denotes a y component of the second motion vector 1725, $mv_{2x}$ denotes an x component of the third motion vector 1735, $mv_{2y}$ denotes a y component of the third motion vector 1735, w denotes a width of the current block 1700, h denotes a height of the current block 1700, x denotes an x coordinate of the center of the current sub-block, and y denotes a y coordinate of the center of the current sub-block.

An example of a 6-parameter model using the first motion vector 1715, the second motion vector 1725, and the fourth motion vector 1745 is as shown in Equation 5 below:

$$\begin{cases} mv_x = \dfrac{mv_{0x} - mv_{1x}}{w}x + \dfrac{mv_{3x} - mv_{1x}}{h}y + mv_{1x} \\ mv_y = \dfrac{mv_{0y} - mv_{1y}}{w}x + \dfrac{mv_{3y} - mv_{1y}}{h}y + mv_{1y} \end{cases} \quad \text{[Equation 5]}$$

Here, $mv_x$ denotes an x component of a motion vector of a current sub-block on which prediction is to be performed from among sub-blocks included in the current block 1700, $mv_y$ denotes a y component of the motion vector of the current sub-block on which prediction is to be performed from among the sub-blocks included in the current block 1700, $mv_{0x}$ denotes an x component of the first motion vector 1715, $mv_{0y}$ denotes a y component of the first motion vector 1715, $mv_{1x}$ denotes an x component of the second motion vector 1725, $mv_{1y}$ denotes a y component of the second motion vector 1725, $mv_{3x}$ denotes an x component of the fourth motion vector 1745, $mv_{3y}$ denotes a y component of the fourth motion vector 1745, w denotes a width of the current block 1700, h denotes a height of the current block 1700, x denotes an x coordinate of the center of the current sub-block, and y denotes a y coordinate of the center of the current sub-block.

An example of a 6-parameter model using the first motion vector 1715, the third motion vector 1735, and the fourth motion vector 1745 is as shown in Equation 6.

$$\begin{cases} mv_x = \dfrac{mv_{3x} - mv_{2x}}{w}x + \dfrac{mv_{0x} - mv_{2x}}{h}y + mv_{2x} \\ mv_y = \dfrac{mv_{3y} - mv_{2y}}{w}x + \dfrac{mv_{0y} - mv_{2y}}{h}y + mv_{2y} \end{cases} \quad \text{[Equation 6]}$$

Here, $mv_x$ denotes an x component of a motion vector of a current sub-block on which prediction is to be performed from among sub-blocks included in the current block 1700, $mv_y$ denotes a y component of the motion vector of the current sub-block on which prediction is to be performed from among the sub-blocks included in the current block 1700, $mv_{0x}$ denotes an x component of the first motion vector 1715, $mv_{0y}$ denotes a y component of the first motion vector 1715, $mv_{2x}$ denotes an x component of the third motion vector 1735, $mv_{2y}$ denotes a y component of the third motion vector 1735, $mv_{3x}$ denotes an x component of the fourth motion vector 1745, $mv_{3y}$ denotes a y component of the fourth motion vector 1745, w denotes a width of the current block 1700, h denotes a height of the current block 1700, x denotes an x coordinate of the center of the current sub-block, and y denotes a y coordinate of the center of the current sub-block.

An example of a 6-parameter model using the second motion vector 1725, the third motion vector 1735, and the fourth motion vector 1745 is as shown in Equation 7.

$$\begin{cases} mv_x = \dfrac{mv_{2x} - mv_{3x}}{w}x + \dfrac{mv_{1x} - mv_{3x}}{h}y + mv_{3x} \\ mv_y = \dfrac{mv_{2y} - mv_{3y}}{w}x + \dfrac{mv_{1y} - mv_{3y}}{h}y + mv_{3y} \end{cases} \quad \text{[Equation 7]}$$

Here, $mv_x$ denotes an x component of a motion vector of a current sub-block on which prediction is to be performed from among sub-blocks included in the current block 1700, $mv_y$ denotes a y component of the motion vector of the current sub-block on which prediction is to be performed from among the sub-blocks included in the current block 1700, $mv_{1x}$ denotes an x component of the second motion vector 1725, $mv_{1y}$ denotes a y component of the second motion vector 1725, $mv_{2x}$ denotes an x component of the third motion vector 1735, $mv_{2y}$ denotes a y component of the third motion vector 1735, $mv_{3x}$ denotes an x component of the fourth motion vector 1745, $mv_{3y}$ denotes a y component of the fourth motion vector 1745, w denotes a width of the current block 1700, h denotes a height of the current block 1700, x denotes an x coordinate of the center of the current sub-block, and y denotes a y coordinate of the center of the current sub-block.

A parameter of a model for determining one motion vector may be selected and used from among candidates of a parameter of a model for determining a motion vector obtained or derived by using the method of FIGS. 17A and 17B.

As shown in FIG. 17A, when a parameter of a model for determining a motion vector obtained from a neighboring block is used, because a model used in the neighboring block is used, neighboring information of a current block is not reflected. Accordingly, the prediction accuracy of a sub-block unit mode may be lowered.

As shown in FIG. 17B, when a parameter of a model for determining a motion vector is determined by using motion vectors corresponding to two or three vertices, because only motion vectors of blocks located around the two or three vertices are considered, the prediction accuracy of a sub-block unit mode may be lowered.

An example of a method of deriving a parameter of a model for determining a motion vector by considering all neighboring sub-blocks is described with reference to FIG. 18.

Figure 18:
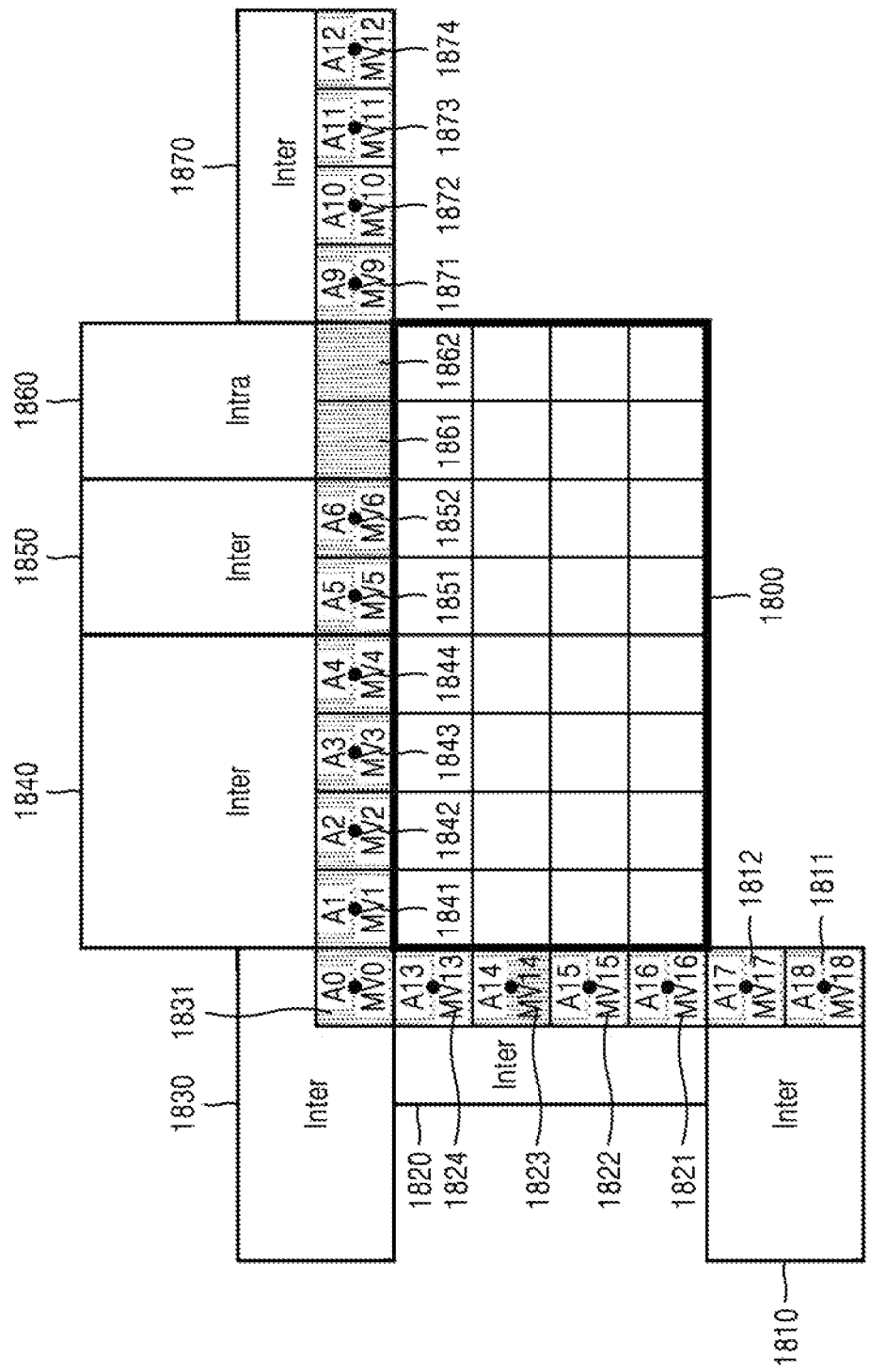
FIG. 18 is a diagram for describing a method of deriving a parameter of a model for determining a motion vector from a neighboring block by considering all neighboring sub-blocks, according to an embodiment of the disclosure.

FIG. 18 is a diagram for describing a method of deriving a parameter of a model for determining a motion vector from a neighboring block by considering all neighboring sub-blocks, according to an embodiment of the disclosure.

Referring to FIG. 18, a parameter of a model for determining a motion vector may be derived by using motion vectors and location information of neighboring sub-blocks of a current block 1800.

From among a first neighboring block 1810, a second neighboring block 1820, a third neighboring block 1830, a fourth neighboring block 1840, a fifth neighboring block 1850, a sixth neighboring block 1860, and a seven neighboring block 1870 located around the current block 1800, because the sixth neighboring block 1860 that is predicted in an intra mode has no motion vector, neighboring sub-blocks 1861 and 1862 included in the sixth neighboring block 1860 are not used to derive a parameter of a model for determining a motion vector.

From among neighboring blocks of the current block 1800, the first neighboring block 1810, the second neighboring block 1820, the third neighboring block 1830, the fourth neighboring block 1840, the fifth neighboring block 1850, and the seventh neighboring block 1870 that are predicted in an inter mode are used to derive a parameter of a model for determining a motion vector.

Regardless of whether prediction is performed in units of sub-blocks, the first neighboring block 1810, the second neighboring block 1820, the third neighboring block 1830, the fourth neighboring block 1840, the fifth neighboring block 1850, and the seventh neighboring block 1870 are divided into sub-blocks, and a motion vector and location information is obtained for each neighboring sub-block adjacent to the current block 1800 and used to derive a parameter of a model for determining a motion vector.

For example a motion vector mv18 of a first neighboring sub-block 1811 and location information of A18 indicating coordinates of the center of the first neighboring sub-block 1811 are obtained from the first neighboring sub-block 1811 included in the first neighboring block 1810, and a motion vector mv17 of a second neighboring sub-block 1812 and location information of A17 indicating coordinates of the center of the second neighboring sub-block 1812 are obtained from the second neighboring sub-block 1812 included in the first neighboring block 1810.

A motion vector mv16 of a third neighboring sub-block 1821 and location information of A16 indicating coordinates of the center of the third neighboring sub-block 1821 are obtained from the third neighboring sub-block 1821 included in the second neighboring block 1820, a motion vector mv15 of a fourth neighboring sub-block 1822 and location information of A15 indicating coordinates of the center of the fourth neighboring sub-block 1822 are obtained from the fourth neighboring sub-block 1822 included in the second neighboring block 1820, a motion vector mv14 of a fifth neighboring sub-block 1823 and location information of A14 indicating coordinates of the center of the fifth neighboring sub-block 1823 are obtained from the fifth neighboring sub-block 1823 included in the second neighboring block 1820, a motion vector mv13 of a sixth neighboring sub-block 1824 and location information of A13 indicating coordinates of the center of the sixth neighboring sub-block 1824 are obtained from the sixth neighboring sub-block 1824 included in the second neighboring block 1820.

A motion vector mv0 of a seventh neighboring sub-block 1831 and location information of A0 indicating coordinates of the center of the seventh neighboring sub-block 1831 are obtained from the seventh neighboring sub-block 1831 included in the third neighboring block 1830.

A motion vector mv1 of an eighth neighboring sub-block 1841 and location information of A1 indicating coordinates of the center of the eighth neighboring sub-block 1841 are obtained from the eighth neighboring sub-block 1841 included in the fourth neighboring block 1840, a motion vector mv2 of a ninth neighboring sub-block 1842 and location information of A2 indicating coordinates of the center of the ninth neighboring sub-blocks 1842 are obtained from the ninth neighboring sub-blocks 1842 included in the fourth neighboring block 1840, a motion vector mv3 of a tenth neighboring sub-block 1843 and location information of A3 indicating coordinates of the center of the tenth neighboring sub-block 1843 are obtained from the tenth neighboring sub-block 1843 included in the fourth neighboring block 1840, and a motion vector mv4 of an 11$^{th}$ neighboring sub-block 1844 and location information of A4 indicating coordinates of the center of the 11$^{th}$ neighboring sub-block 1844 are obtained from the 11$^{th}$ neighboring sub-block 1844 included in the fourth neighboring block 1840.

A motion vector mv5 of a 12$^{th}$ neighboring sub-block 1851 and location information of A5 indicating coordinates of the center of the 12$^{th}$ neighboring sub-block 1851 are obtained from the 12$^{th}$ neighboring sub-block 1851 included in the fifth neighboring block 1850, and a motion vector mv6 of a 13$^{th}$ neighboring sub-block 1852 and location information of A6 indicating coordinates of the center of the 13$^{th}$ neighboring sub-block 1852 are obtained from the 13$^{th}$ neighboring sub-block 1852 included in the fifth neighboring block 1850.

A motion vector mv9 of a 14$^{th}$ neighboring sub-block 1871 and location information of A9 indicating coordinates of the center of the 14$^{th}$ neighboring sub-block 1871 are obtained from the 14$^{th}$ neighboring sub-block 1871 included in the seventh neighboring block 1870, a motion vector mv10 of a 15$^{th}$ neighboring sub-block 1872 and location information of A10 indicating coordinates of the center of the 15$^{th}$ neighboring sub-block 1872 are obtained from the 15$^{th}$ neighboring sub-block 1872 included in the seventh neighboring block 1870, a motion vector mv11 of a 16$^{th}$ neighboring sub-block 1873 and location information of A11 indicating coordinates of the center of the 16$^{th}$ neighboring sub-block 1873 are obtained from the 16$^{th}$ neighboring sub-block 1873 included in the seventh neighboring block 1870, and a motion vector mv12 of a 17$^{th}$ neighboring sub-block 1874 and location information of A12 indicating coordinates of the center of the 17$^{th}$ neighboring sub-block 1874 are obtained from the 17$^{th}$ neighboring sub-block 1874 included in the seventh neighboring block 1870.

As such, a parameter of a model for determining a motion vector as shown in Equation 1 may be derived by using a linear regression analysis method using a motion vector and location information of each of neighboring sub-blocks obtained from the neighboring sub-blocks of the current block 1800.

A parameter of a model for determining a motion vector may be determined through linear regression analysis by using a motion vector and location information of each of neighboring sub-blocks without an initial value.

Also, a parameter may be determined by refining a parameter through linear regression based on a parameter of a model existing in a previously encoded or decoded block and a motion vector and location information of each of neighboring sub-blocks. The previously encoded or decoded block may be selected from among history-based parameter candidates in which parameters of blocks previously encoded or decoded in a sub-block unit mode are stored, may be a block that is encoded or decoded in a sub-block unit mode prior to a current block from among blocks not adjacent to the current block, or may be a block that is encoded or decoded in a sub-block unit mode prior to a current block from among neighboring blocks of the current block.

Because the method corresponding to FIG. 18 considers all neighboring sub-blocks but does not consider whether motion vectors are the same, a complexity may increase, redundant calculation may occur, and when neighboring sub-blocks having the same motion vector are redundantly calculated, the prediction accuracy of a sub-block unit mode may be lowered. For example in a coding unit or block that has a size of N and is not predicted in a sub-block unit mode, N/4 sub-blocks having the same motion vector but having different pieces of location information indicating coordinates of the center are used in a linear regression process of a model for determining a motion vector. This may lead to inaccurate fitting of the model for determining a motion vector because of a greater bias to a translational motion.

An example of a method of improving accuracy while considering all neighboring information by determining representative information of neighboring sub-blocks having the same motion vector and using the neighboring sub-blocks as one sub-block while considering all neighboring sub-blocks, instead of using information of all neighboring sub-blocks, is described with reference to FIGS. 19 to 32.

Figure 19:
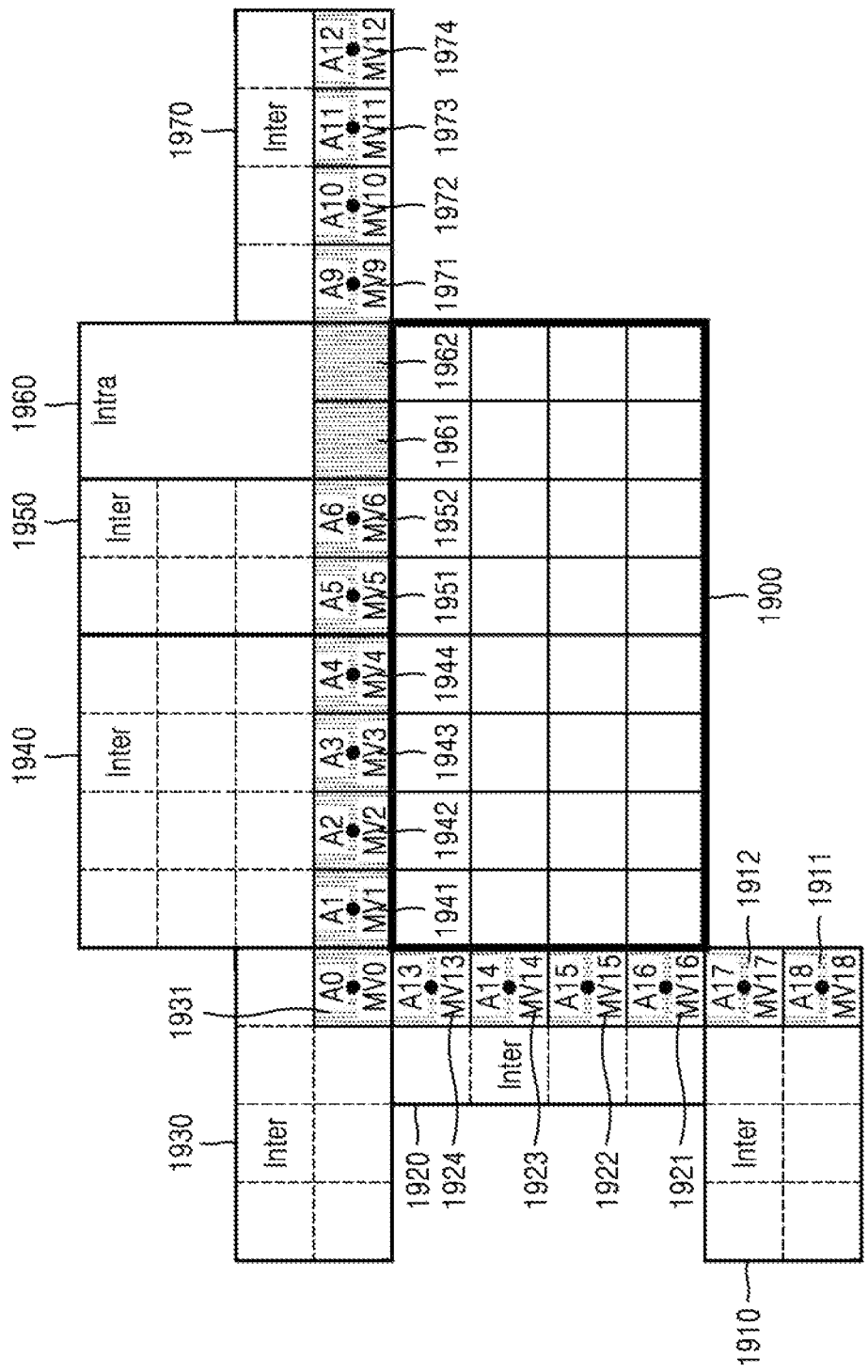
FIG. 19 is a diagram for describing a method of deriving a parameter of predicted neighboring blocks are all predicted in units of sub-blocks, according to an embodiment of the disclosure.

FIG. 19 is a diagram for describing a method of deriving a parameter of a model for determining a motion vector from a neighboring block, when inter-predicted neighboring blocks are all predicted in units of sub-blocks, according to an embodiment of the disclosure.

From among a first neighboring block 1910, a second neighboring block 1920, a third neighboring block 1930, a fourth neighboring block 1940, a fifth neighboring block 1950, a sixth neighboring block 1960, and a seventh neighboring block 1970 located around a current block 1900, because the sixth neighboring block 1960 that is predicted in an intra mode has no motion vector, neighboring sub-blocks 1961 and 1962 included in the sixth neighboring block 1960 are not used to derive a parameter of a model for determining a motion vector.

From among neighboring blocks of the current block 1900, the first neighboring block 1910, the second neighboring block 1920, the third neighboring block 1930, the fourth neighboring block 1940, the fifth neighboring block 1950, and the seventh neighboring block 1970 that are predicted in a sub-block unit mode are used to derive a parameter of a model for determining a motion vector.

Neighboring sub-blocks in each of the first neighboring block 1910, the second neighboring block 1920, the third neighboring block 1930, the fourth neighboring block 1940, the fifth neighboring block 1950, and the seventh neighboring block 1970 have non-uniform motion vectors. Non-uniform motion vectors may mean, for example, that all neighboring sub-blocks have different motion vectors or adjacent neighboring sub-blocks have different motion vectors.

For example a motion vector mv18 of a first neighboring sub-block 1911 and location information of A18 indicating coordinates of the center of the first neighboring sub-block 1911 are obtained from the first neighboring sub-block 1911 included in the first neighboring block 1910, and a motion vector mv17 of a second neighboring sub-block 1912 and location information of A17 indicating coordinates of the center of the second neighboring sub-block 1912 are obtained from the second neighboring sub-block 1912 included in the first neighboring block 1910.

A motion vector mv16 of a third neighboring sub-block 1921 and location information of A16 indicating coordinates of the center of the third neighboring sub-block 1921 are obtained from the third neighboring sub-block 1921 included in the second neighboring block 1920, a motion vector mv15 of a fourth neighboring sub-block 1922 and location information of A15 indicating coordinates of the center of the fourth neighboring sub-block 1922 are obtained from the fourth neighboring sub-block 1922 included in the second neighboring block 1920, a motion vector mv14 of a fifth neighboring sub-block 1923 and location information of A14 indicating coordinates of the center of the fifth neighboring sub-block 1923 are obtained from the fifth neighboring sub-block 1923 included in the second neighboring block 1920, and a motion vector mv13 of a sixth neighboring sub-block 1924 and location information of A13 indicating coordinates of the center of the sixth neighboring sub-block 1924 are obtained from the sixth neighboring sub-block 1924 included in the second neighboring block 1920.

A motion vector mv0 of a seventh neighboring sub-block 1931 and location information of A0 indicating coordinates of the center of the seventh neighboring sub-block 1931 are obtained from the seventh neighboring sub-block 1932 included in the third neighboring block 1930.

A motion vector mv1 of an eighth neighboring sub-block 1941 and location information of A1 indicating coordinates of the center of the eighth neighboring sub-block 1941 are obtained from the eighth neighboring sub-block 1941 included in the fourth neighboring block 1940, a motion vector mv2 of a ninth neighboring sub-block 1942 and location information of A2 indicating coordinates of the center of the ninth neighboring sub-block 1942 are obtained from the ninth neighboring sub-block 1942 included in the fourth neighboring block 1940, a motion vector mv3 of a tenth neighboring sub-block 1943 and location information of A3 indicating coordinates of the center of the tenth neighboring sub-block 1943 are obtained from the tenth neighboring sub-block 1943 included in the fourth neighboring block 1940, and a motion vector mv4 of an $11^{th}$ neighboring sub-block 1944 and location information of A4 indicating coordinates of the center of the $11^{th}$ neighboring sub-block 1944 are obtained from the $11^{th}$ neighboring sub-block 1944 included in the fourth neighboring block 1940.

A motion vector mv5 of a $12^{th}$ neighboring sub-block 1951 and location information of A5 indicating coordinates of the center of the $12^{th}$ neighboring sub-block 1951 are obtained from the $12^{th}$ neighboring sub-block 1951 included in the fifth neighboring block 1950, and a motion vector mv6 of a $13^{th}$ neighboring sub-block 1952 and location information of A6 indicating coordinates of the center of the $13^{th}$ neighboring sub-block 1952 are obtained from the $13^{th}$ neighboring sub-block 1952 included in the fifth neighboring block 1950.

A motion vector mv9 of a $14^{th}$ neighboring sub-block 1971 and location information of A9 indicating coordinates of the center of the $14^{th}$ neighboring sub-block 1971 are obtained from the $14^{th}$ neighboring sub-block 1971 included in the seventh neighboring block 1970, a motion vector mv10 of a $15^{th}$ neighboring sub-block 1972 and location information of A10 indicating coordinates of the center of the $15^{th}$ neighboring sub-block 1972 are obtained from the $15^{th}$ neighboring sub-block 1972 included in the seventh neighboring block 1970, a motion vector mv11 of a $16^{th}$ neighboring sub-block 1973 and location information of A11 indicating coordinates of the center of the $16^{th}$ neighboring sub-block 1973 are obtained from the $16^{th}$ neighboring sub-block 1973 included in the seventh neighboring block 1970, and a motion vector mv12 of a $17^{th}$ neighboring sub-block 1974 and location information of A12 indicating coordinates of the center of the $17^{th}$ neighboring sub-block 1974 are obtained from the $17^{th}$ neighboring sub-block 1974 included in the seventh neighboring block 1970.

As such, a parameter of a model for determining a motion vector as shown in Equation 1 may be derived by using a motion vector and location information of each of neighboring sub-blocks obtained from the neighboring sub-blocks of the current block 1900.

A parameter of a model for determining a motion vector may be determined through linear regression by using a motion vector and location information of each of neighboring sub-blocks without an initial value.

Also, a parameter may be determined by refining a parameter through linear regression based on a parameter of a model existing in a previously encoded or decoded block and a motion vector and location information of each of neighboring sub-blocks. The previously encoded or decoded block may be selected from among history-based parameter candidates in which parameters of blocks previously encoded or decoded in a sub-block unit mode are stored, may be a block that is encoded or decoded in a sub-block unit mode prior to a current block from among blocks not adjacent to the current block, or may be a block that is encoded or decoded in a sub-block unit mode prior to a current block from among neighboring blocks of the current block.

Figure 20:
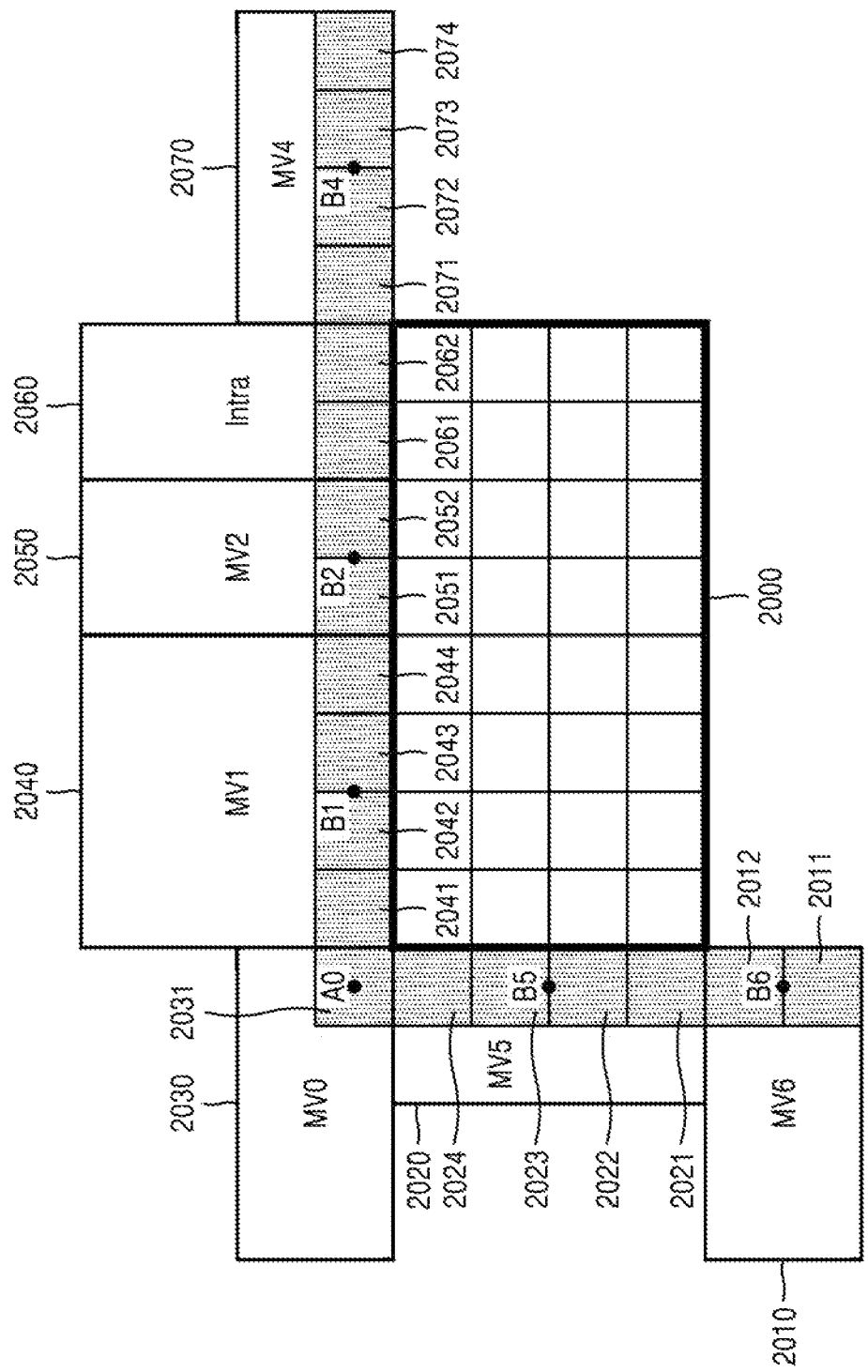
FIG. 20 is a diagram for describing a method of deriving a parameter of a model for determining a motion vector from a neighboring block, when all inter-predicted neighboring blocks are not predicted in units of sub-blocks, according to an embodiment of the disclosure.

FIG. 20 is a diagram for describing a method of deriving a parameter of a model for determining a motion vector from a neighboring block, when all inter-predicted neighboring blocks are not predicted in units of sub-blocks, according to an embodiment of the disclosure.

From among a first neighboring block 2010, a second neighboring block 2020, a third neighboring block 2030, a fourth neighboring block 2040, a fifth neighboring block 2050, a sixth neighboring block 2060, and a seventh neighboring block 2070 located around a current block 2000, because the sixth neighboring block 2060 that is predicted in an intra mode has no motion vector, neighboring sub-blocks 2061 and 2062 included in the sixth neighboring block 2060 are not used to derive a parameter of a model for determining a motion vector.

From among neighboring blocks of the current block 2000, the first neighboring block 2010, the second neighboring block 2020, the third neighboring block 2030, the fourth neighboring block 2040, the fifth neighboring block 2050, and the seventh neighboring block 2070 that are predicted in an inter mode and are not predicted in a sub-block unit mode are used to derive a parameter of a model for determining a motion vector.

Because the first neighboring block 2010, the second neighboring block 2020, the third neighboring block 2030, the fourth neighboring block 2040, the fifth neighboring block 2050, and the seventh neighboring block 2070 are all predicted in an inter mode and are not predicted in a sub-block unit mode, neighboring sub-blocks in each of the first neighboring block 2010, the second neighboring block 2020, the third neighboring block 2030, the fourth neighboring block 2040, the fifth neighboring block 2050, and the seventh neighboring block 2070 have the same motion vector, that is, uniform motion vectors.

For example a first neighboring sub-block 2011 and a second neighboring sub-block 2012 included in the first neighboring block 2010 have the same motion vector mv6. The same motion vector mv6 is determined as a representative motion vector. Because the first neighboring sub-block 2011 and the second neighboring sub-block 2012 have the same motion vector, location information also indicates the same coordinates. Coordinates B6 located at the center of an area including the first neighboring sub-block 2011 and the second neighboring sub-block 2012 are determined as representative location information.

A third neighboring sub-block 2021, a fourth neighboring sub-block 2022, a fifth neighboring sub-block 2023, and a sixth neighboring sub-block 2024 included in the second neighboring block 2020 have the same motion vector mv5. The same motion vector mv5 is determined as a representative motion vector. Coordinates B5 located at the center of an area including the third neighboring sub-block 2021, the fourth neighboring sub-block 2022, the fifth neighboring sub-block 2023, and the sixth neighboring sub-block 2024 are determined as representative location information.

The third neighboring block 2030 has a motion vector mv0. The same motion vector mv0 is determined as a representative motion vector. A0 indicating coordinates of the center of a seventh neighboring sub-block 2031 adjacent to the current block 2000 in the third neighboring block 2030 are determined as representative location information.

An eighth neighboring sub-block 2041, a ninth neighboring sub-block 2042, a tenth neighboring sub-block 2043, and an $11^{th}$ neighboring sub-block 2044 included in the fourth neighboring block 2040 have the same motion vector mv1. The same motion vector mv1 is determined as a representative motion vector. Coordinates B1 located at the center of an area including the eighth neighboring sub-block 2041, the ninth neighboring sub-block 2042, the tenth neighboring sub-block 2043, and the $11^{th}$ neighboring sub-block 2044 are determined as representative location information.

A $12^{th}$ neighboring sub-block 2051 and a $13^{th}$ neighboring sub-block 2052 included in the fifth neighboring block 2050 have the same motion vector mv2. The same motion vector mv2 is determined as a representative motion vector. Coordinates B2 located at the center of an area including the $12^{th}$ neighboring sub-block 2051 and the $13^{th}$ neighboring sub-block 2052 are determined as representative location information.

A $14^{th}$ neighboring sub-block 2071, a $15^{th}$ neighboring sub-block 2072, a $16^{th}$ neighboring sub-block 2073, and a $17^{th}$ neighboring sub-block 2074 included in the seventh neighboring block 2070 have the same motion vector mv4. The same motion vector mv4 is determined as a representative motion vector. Coordinates B4 located at the center of an area including the $14^{th}$ neighboring sub-block 2071, the $15^{th}$ neighboring sub-block 2072, the $16^{th}$ neighboring sub-block 2073, and the $17^{th}$ neighboring sub-block 2074 are determined as representative location information.

As such, a parameter of a model for determining a motion vector as shown in Equation 1 may be derived by using a motion vector of a neighboring block that is predicted in an inter mode and is not predicted in a sub-block unit mode of the current block 2000, and representative location information indicating coordinates of the center of an area including neighboring sub-blocks in the neighboring block.

A parameter of a model for determining a motion vector may be determined through linear regression by using a motion vector and representative location information of a neighboring block without an initial value.

Also, a parameter may be determined by refining a parameter through linear regression based on a parameter of a model existing in a previously encoded or decoded block and a motion vector and representative location information of a neighboring block. The previously encoded or decoded block may be selected from among history-based parameter candidates in which parameters of blocks previously encoded or decoded in a sub-block unit mode are stored, may be a block that is encoded or decoded in a sub-block unit mode prior to a current block from among blocks not adjacent to the current block, or may be a block that is encoded or decoded in a sub-block unit mode prior to a current block from among neighboring blocks of the current block.

Figure 21:
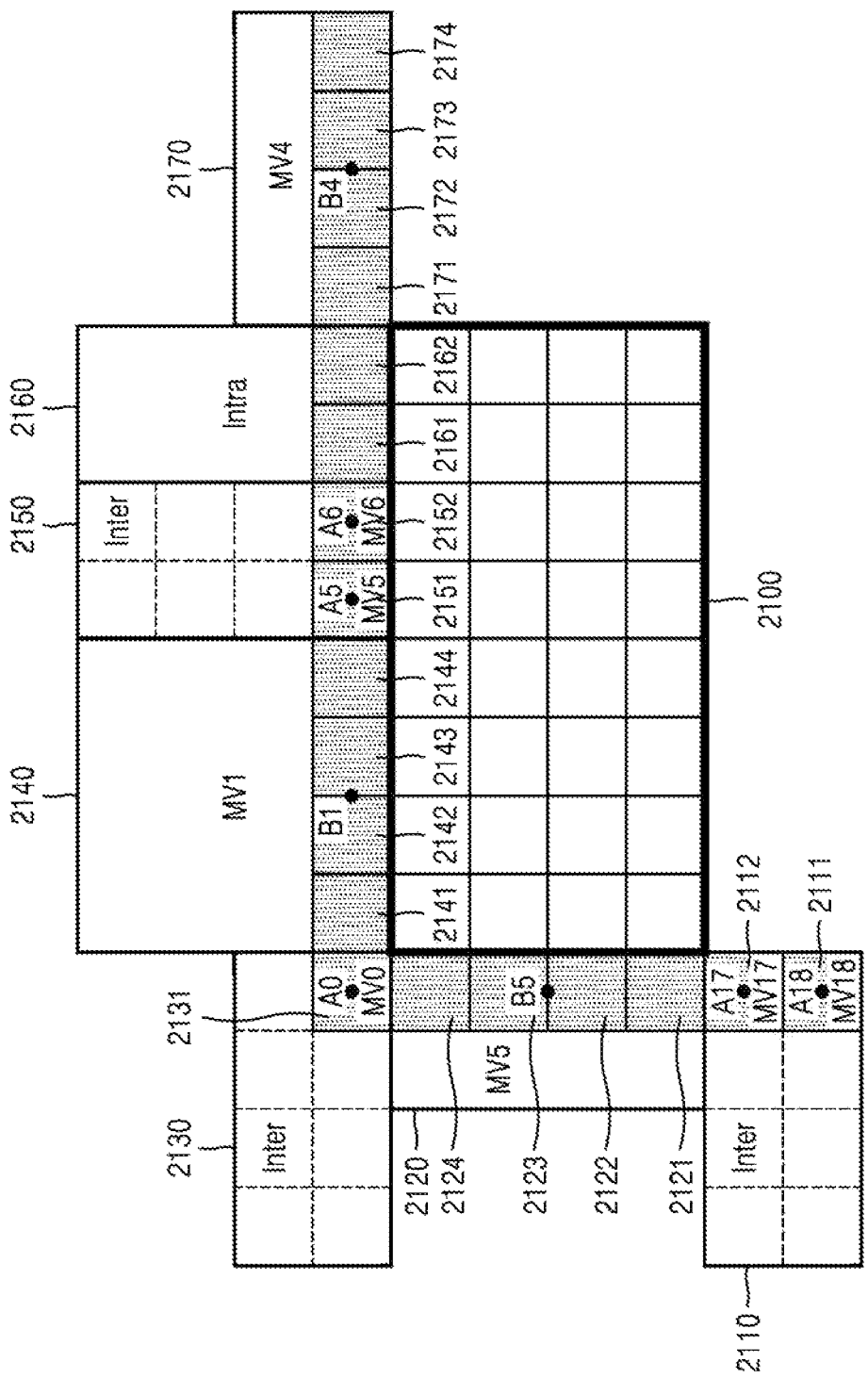
FIG. 21 is a diagram for describing a method of deriving a parameter of a model for determining a motion vector from a neighboring block, when inter-predicted neighboring blocks include both a neighboring block that is predicted in units of sub-blocks and a neighboring block that is not predicted in units of sub-blocks, according to an embodiment of the disclosure.

FIG. 21 is a diagram for describing a method of deriving a parameter of a model for determining a motion vector from a neighboring block, when inter-predicted neighboring blocks include both a neighboring block that is predicted in units of sub-blocks and a neighboring block that is not predicted in units of sub-blocks, according to an embodiment of the disclosure.

From among a first neighboring block 2110, a second neighboring block 2120, a third neighboring block 2130, a fourth neighboring block 2140, a fifth neighboring block 2150, a sixth neighboring block 2160, and a seventh neighboring block 2170 located around a current block 2100, because the sixth neighboring block that is predicted in an intra mode has no motion vector, neighboring sub-blocks 2161 and 2162 included in the sixth neighboring block 2160 are not used to derive a parameter of a model for determining a motion vector.

From among neighboring blocks of the current block 2100, the first neighboring block 2110, the second neighboring block 2120, the third neighboring block 2130, the fourth neighboring block 2140, the fifth neighboring block 2150, and the seventh neighboring block 2170 that are predicted in an inter mode are used to derive a parameter of a model for determining a motion vector.

The first neighboring block 2110, the third neighboring block 2130, and the fifth neighboring block 2150 are predicted in a sub-block unit mode, and neighboring sub-blocks in each of the first neighboring block 2110, the third neighboring block 2130, and the fifth neighboring block 2150 have non-uniform motion vectors. Non-uniform motion vectors may mean, for example, that all neighboring sub-blocks have different motion vectors or adjacent neighboring sub-blocks have different motion vectors.

Because the second neighboring block 2120, the fourth neighboring block 2140, and the seventh neighboring block 2170 are all predicted in an inter mode and are not predicted in a sub-block unit mode, neighboring sub-blocks in each of the second neighboring block 2120, the fourth neighboring block 2140, and the seventh neighboring block 2170 have the same motion vector, that is, uniform motion vectors.

For example a motion vector mv18 of a first neighboring sub-block 2111 and location information of A18 indicating coordinates of the center of the first neighboring sub-block 2111 are obtained from the first neighboring sub-block 2111 included in the first neighboring block 2110, and a motion vector mv17 of a second neighboring sub-block 2112 and location information of A17 indicating coordinates of the center of the second neighboring sub-block 2112 are obtained from the second neighboring sub-block 2112 included in the first neighboring block 2110.

A third neighboring sub-block 2121, a fourth neighboring sub-block 2122, a fifth neighboring sub-block 2123, and a sixth neighboring sub-block 2124 included in the second neighboring block 2120 have the same motion vector mv5. The same motion vector mv5 is determined as a representative motion vector. Coordinates B5 located at the center of an area including the third neighboring sub-block 2121, the fourth neighboring sub-block 2122, the fifth neighboring sub-block 2123, and the sixth neighboring sub-block 2124 are determined as representative location information.

A motion vector mv0 of a seventh neighboring sub-block 2131 and location information of A0 indicating coordinates of the center of the seventh neighboring sub-block 2131 are obtained from the seventh neighboring sub-block 2131 included in the third neighboring block 2130.

An eighth neighboring sub-block 2141, a ninth neighboring sub-block 2142, a tenth neighboring sub-block 2143, and an $11^{th}$ neighboring sub-block 2144 included in the fourth neighboring block 2140 have the same motion vector mv1. The same motion vector mv1 is determined as a representative motion vector. Coordinates B1 located at the center of an area including the eighth neighboring sub-block 2141, the ninth neighboring sub-block 2142, the tenth neighboring sub-block 2143, and the $11^{th}$ neighboring sub-block 2144 are determined as representative location information.

A motion vector mv5 of a $12^{th}$ neighboring sub-block 2151 and location information of A5 indicating coordinates of the center of the $12^{th}$ neighboring sub-block 2151 are obtained from the $12^{th}$ neighboring sub-block 2151 included in the fifth neighboring block 2150, and a motion vector mv6 of a $13^{th}$ neighboring sub-block 2152 and location information of A6 indicating coordinates of the center of the $13^{th}$ neighboring sub-block 2152 are obtained from the $13^{th}$ neighboring sub-block 2152 included in the fifth neighboring block 2150.

A $14^{th}$ neighboring sub-block 2171, a $15^{th}$ neighboring sub-block 2172, a $16^{th}$ neighboring sub-block 2173, and a $17^{th}$ neighboring sub-block 2174 included in the seventh neighboring block 2170 have the same motion vector mv4. The same motion vector mv4 is determined as a representative motion vector. Coordinates B4 located at the center of an area including the $14^{th}$ neighboring sub-block 2171, the $15^{th}$ neighboring sub-block 2172, the $16^{th}$ neighboring sub-block 2173, and the $17^{th}$ neighboring sub-block 2174 are determined as representative location information.

As such, a parameter of a model for determining a motion vector as shown in Equation 1 may be derived by using a motion vector and location information of each of neighboring sub-blocks obtained from neighboring sub-blocks predicted in a sub-block unit mode of the current block 2100, and a motion vector of a neighboring block that is predicted in an inter mode and is not predicted in a sub-block unit mode, and representative location information indicating coordinates of the center of an area including neighboring sub-blocks in the neighboring block of the current block 2100.

A parameter of a model for determining a motion vector may be determined through linear regression by using a motion vector and location information of each of neighboring sub-blocks and a motion vector and representative location information of a neighboring block without an initial value.

Also, a parameter may be determined by refining a parameter through linear regression based on a parameter of a model existing in a previously encoded or decoded block and a motion vector and location information of each of neighboring sub-blocks, and a motion vector and representative location information of a neighboring block. The previously encoded or decoded block may be selected from among history-based parameter candidates in which parameters of blocks previously encoded or decoded in a sub-block unit mode are stored, may be a block that is encoded or decoded in a sub-block unit mode prior to a current block from among blocks not adjacent to the current block, or may be a block that is encoded or decoded in a sub-block unit mode prior to a current block from among neighboring blocks of the current block.

Figure 22:
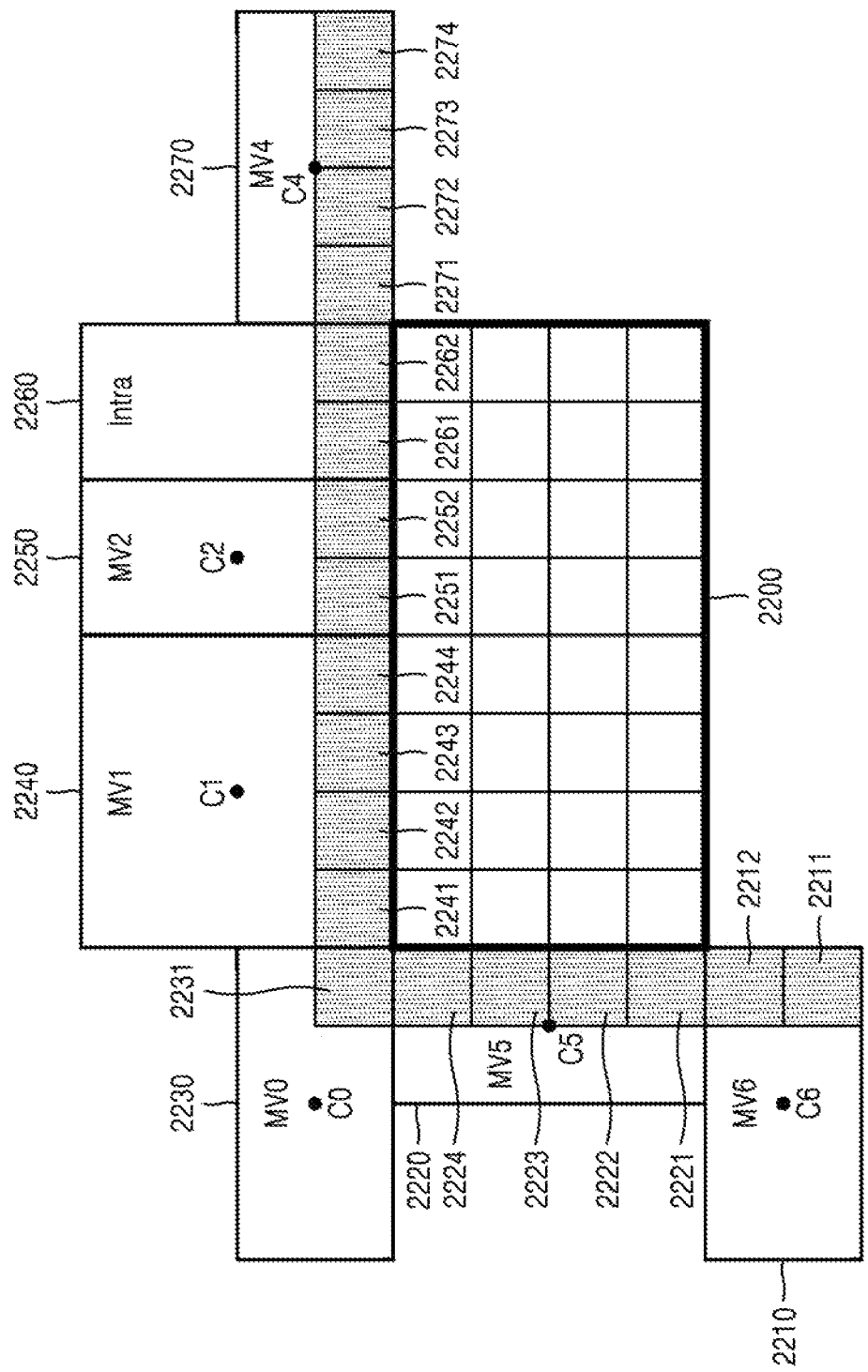
FIG. 22 is a diagram for describing a method of deriving a parameter of a model for determining a motion vector from a neighboring block, when all inter-predicted neighboring blocks are not predicted in units of sub-blocks, according to an embodiment of the disclosure.

FIG. 22 is a diagram for describing a method of deriving a parameter of a model for determining a motion vector from a neighboring block, when all inter-predicted neighboring blocks are not predicted in units of sub-blocks, according to an embodiment of the disclosure.

From among a first neighboring block 2210, a second neighboring block 2220, a third neighboring block 2230, a fourth neighboring block 2240, a fifth neighboring block 2250, a sixth neighboring block 2260, and a seventh neighboring block 2270 located around a current block 2200, because the sixth neighboring block 2260 that is predicted in an intra mode has no motion vector, neighboring sub-blocks 2261 and 2262 included in the sixth neighboring block 2260 are not used to derive a parameter of a model for determining a motion vector.

From among neighboring blocks of the current block 2200, the first neighboring block 2210, the second neighboring block 2220, the third neighboring block 2230, the fourth neighboring block 2240, the fifth neighboring block 2250, and the seventh neighboring block 2270 that are all predicted in an inter mode and are not predicted in a sub-block unit mode are used to derive a parameter of a model for determining a motion vector.

Because the first neighboring block 2210, the second neighboring block 2220, the third neighboring block 2230, the fourth neighboring block 2240, the fifth neighboring block 2250, and the seventh neighboring block 2270 are all predicted in an inter mode and are not predicted in a sub-block unit mode, neighboring sub-blocks in each of the first neighboring block 2210, the second neighboring block 2220, the third neighboring block 2230, the fourth neighboring block 2240, the fifth neighboring block 2250, and the seventh neighboring block 2270 have the same motion vector, that is, uniform motion vectors.

For example a first neighboring sub-block 2211 and a second neighboring sub-block 2212 included in the first neighboring block 2210 have the same motion vector mv6. The same motion vector mv6 is determined as a representative motion vector. Because the first neighboring sub-block 2211 and the second neighboring sub-block 2212 have the same motion vector, location information also indicates the same coordinates. Coordinates C6 located at the center of the first neighboring block 2210 are determined as representative location information.

A third neighboring sub-block 2221, a fourth neighboring sub-block 2222, a fifth neighboring sub-block 2223, and a sixth neighboring sub-block 2224 included in the second neighboring block 2220 have the same motion vector mv5. The same motion vector mv5 is determined as a representative motion vector. Coordinates C5 located at the center of the second neighboring block 2220 are determined as representative location information.

The third neighboring block 2230 has a motion vector mv0. The motion vector mv0 is determined as a representative motion vector. C0 indicating coordinates the center of the third neighboring block 2230 are determined as representative location information.

An eighth neighboring sub-block 2241, a ninth neighboring sub-block 2242, a tenth neighboring sub-block 2243, and an $11^{th}$ neighboring sub-block 2244 included in the fourth neighboring block 2240 have the same motion vector mv1. The same motion vector mv1 is determined as a representative motion vector. Coordinates C1 located at the center of the fourth neighboring block 2240 are determined as representative location information.

A $12^{th}$ neighboring sub-block 2251 and a $13^{th}$ neighboring sub-block 2252 included in the fifth neighboring block 2250 have the same motion vector mv2. The same motion vector mv2 is determined as a representative motion vector. Coordinates C2 located at the center of the fifth neighboring block 2250 are determined as representative location information.

A 14$^{th}$ neighboring sub-block 2271, a 15$^{th}$ neighboring sub-block 2272, a 16$^{th}$ neighboring sub-block 2273, and a 17$^{th}$ neighboring sub-block 2274 included in the seventh neighboring block 2270 have the same motion vector mv4. The motion vector mv4 is determined as a representative motion vector. Coordinates C4 located at the center of the seventh neighboring block 2270 are determined as representative location information.

As such, a parameter of a model for determining a motion vector as shown in Equation 1 may be derived by using a motion vector of a neighboring block that is predicted in an inter mode and is not predicted in a sub-block unit mode, and representative location information indicating coordinates of the center of the neighboring block.

A parameter of a model for determining a motion vector may be determined through linear regression by using a motion vector and representative location information of a neighboring block without an initial value.

Also, a parameter may be determined by refining a parameter through linear regression based on a parameter of a model existing in a previously encoded or decoded block and a motion vector and representative location information of a neighboring block. The previously encoded or decoded block may be selected from among history-based parameter candidates in which parameters of blocks previously encoded or decoded in a sub-block unit mode are stored, may be a block that is encoded or decoded in a sub-block unit mode prior to a current block from among blocks not adjacent to the current block, or may be a block that is encoded or decoded in a sub-block unit mode prior to a current block from among neighboring blocks of the current block.

Figure 23:
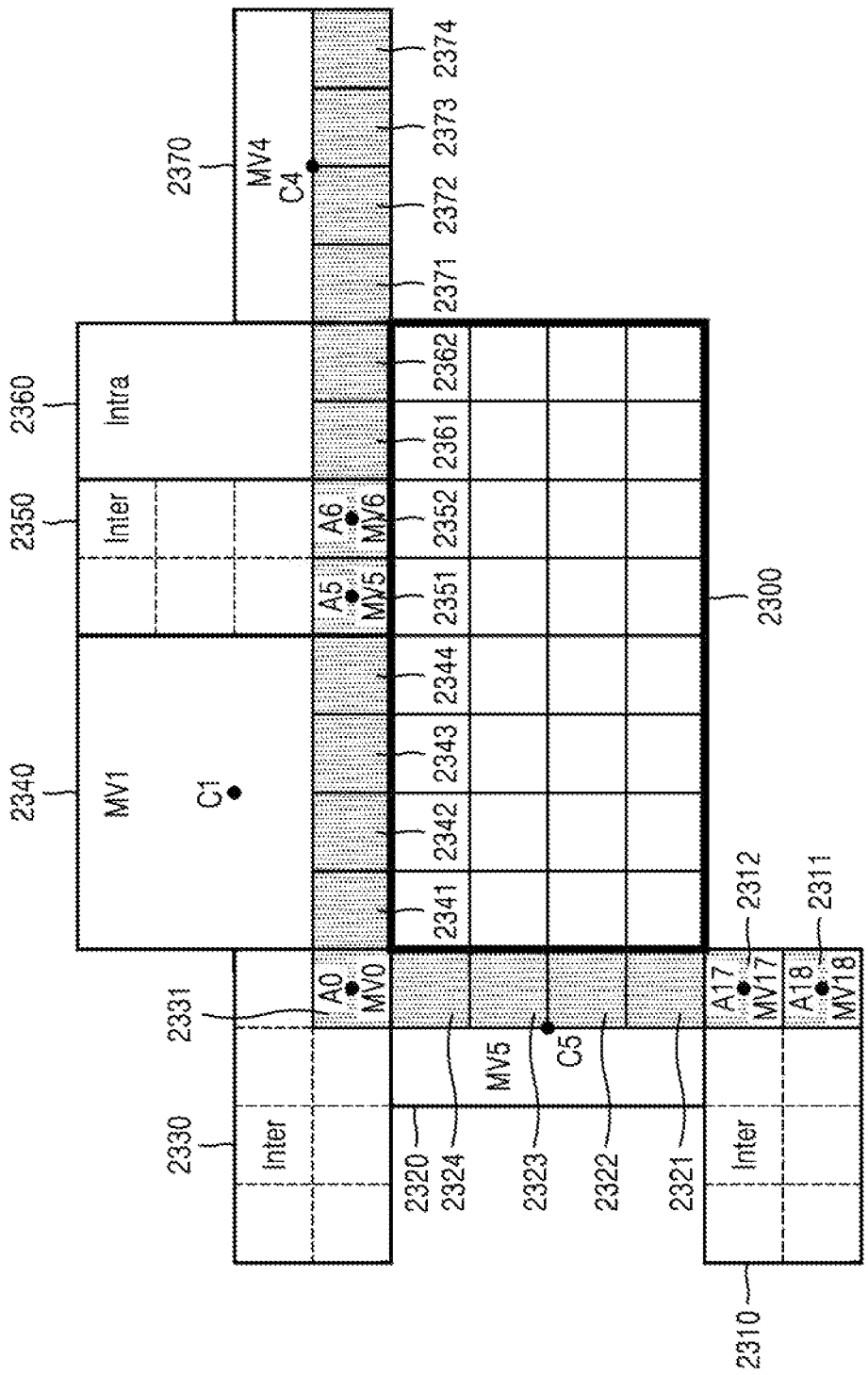
FIG. 23 is a diagram for describing a method of deriving a parameter of a model for determining a motion vector from a neighboring block, when inter-predicted neighboring blocks include both a neighboring block that is predicted in units of sub-blocks and a neighboring block that is not predicted in units of sub-blocks, according to an embodiment of the disclosure.

FIG. 23 is a diagram for describing a method of deriving a parameter of a model for determining a motion vector from a neighboring block, when inter-predicted neighboring blocks include both a neighboring block that is predicted in units of sub-blocks and a neighboring block that is not predicted in units of sub-blocks, according to an embodiment of the disclosure.

From among a first neighboring block 2310, a second neighboring block 2320, a third neighboring block 2330, a fourth neighboring block 2340, a fifth neighboring block 2350, a sixth neighboring block 2360, and a seventh neighboring block 2370 located around a current block 2300, because the sixth neighboring block 2360 that is predicted in an intra mode has no motion vector, neighboring sub-blocks 2361 and 2362 included in the sixth neighboring block 2360 are not used to derive a parameter of a model for determining a motion vector.

From among neighboring blocks of the current block 2300, the first neighboring block 2310, the second neighboring block 2320, the third neighboring block 2330, the fourth neighboring block 2340, the fifth neighboring block 2350, and the seventh neighboring block 237 that are predicted in an inter mode are used to derive a parameter of a model for determining a motion vector.

Because the first neighboring block 2310, the third neighboring block 2330, and the fifth neighboring block 2350 are predicted in a sub-block unit mode, neighboring sub-blocks in each of the first neighboring block 2310, the third neighboring block 2330, and the fifth neighboring block 2350 have non-uniform motion vectors. Non-uniform motion vectors may mean, for example, that all neighboring sub-blocks have different motion vectors or adjacent neighboring sub-blocks have different motion vectors.

Because the second neighboring block 2320, the fourth neighboring block 2340, and the seventh neighboring block 2370 are all predicted in an inter mode and are not predicted in a sub-block unit mode, neighboring sub-blocks in each of the second neighboring block 2320, the fourth neighboring block 2340, and the seventh neighboring block 2370 have the same motion vector, that is, uniform motion vectors.

For example a motion vector mv18 of a first neighboring sub-block 2311 and location information of A18 indicating coordinates of the center of the first neighboring sub-block 2311 are obtained from the first neighboring sub-block 2311 included in the first neighboring block 2310, and a motion vector mv17 of a second neighboring sub-block 2312 and location information of A17 indicating coordinates of the center of the second neighboring sub-block 2312 are obtained from the second neighboring sub-block 2312 included in the first neighboring block 2310.

A third neighboring sub-block 2321, a fourth neighboring sub-block 2322, a fifth neighboring block 2323, and a sixth neighboring sub-block 2324 included in the second neighboring block 2320 have the same motion vector mv5. The same motion vector mv5 is determined as a representative motion vector. Coordinates C5 located at the center of the second neighboring block 2320 are determined as representative location information.

A motion vector mv0 of a seventh neighboring sub-block 2331 and location information of A0 indicating coordinates of the center of the seventh neighboring sub-block 2331 are obtained from the seventh neighboring sub-block 2331 included in the third neighboring block 2330.

An eighth neighboring sub-block 2341, a ninth neighboring sub-block 2342, a tenth neighboring sub-block 2343, and an 11$^{th}$ neighboring sub-block 2344 included in the fourth neighboring block 2340 have the same motion vector mv1. The same motion vector mv1 is determined as a representative motion vector. Coordinates C1 located at the center of the fourth neighboring block 2340 are determined as representative location information.

A motion vector mv5 of a 12$^{th}$ neighboring sub-block 2351 and location information of A5 indicating coordinates of the center of the 12$^{th}$ neighboring sub-block 2351 are obtained from the 12$^{th}$ neighboring sub-block 2351 included in the fifth neighboring block 2350, and a motion vector mv6 of a 13$^{th}$ neighboring sub-block 2352 and location information of A6 indicating coordinates of the center of the 13$^{th}$ neighboring sub-block 2352 are obtained from the 13$^{th}$ neighboring sub-block 2352 included in the fifth neighboring block 2350.

A 14$^{th}$ neighboring sub-block 2371, a 15$^{th}$ neighboring sub-block 2372, a 16$^{th}$ neighboring sub-block 2373, and a 17$^{th}$ neighboring sub-block 2374 included in the seventh neighboring block 2370 have the same motion vector mv4. The same motion vector mv4 is determined as a representative motion vector. Coordinates C4 located at the center of the seventh neighboring block 2370 are determined as representative location information.

As such, a parameter of a model for determining a motion vector as shown in Equation 1 may be derived by using a motion vector and location information of each of neighboring sub-blocks obtained from the neighboring sub-blocks predicted in a sub-block unit mode of the current block 2300, and a motion vector of a neighboring block that is predicted in an inter mode and is not predicted in a sub-block unit mode, and representative location information indicating coordinates of the center of the neighboring block of the current block 2300.

A parameter of a model for determining a motion vector may be determined through linear regression by using a motion vector and location information of each of neighboring sub-blocks and a motion vector and representative location information of a neighboring block without an initial value.

Also, a parameter may be determined by refining a parameter through linear egression based on a parameter of a model existing in a previously encoded or decoded block, a motion vector and location information of each of neighboring sub-blocks, and a motion vector and representative location information of a neighboring block. The previously encoded or decoded block may be selected from among history-based parameter candidates in which parameters of blocks previously encoded or decoded in a sub-block unit mode are stored, may be a block that is encoded or decoded in a sub-block unit mode prior to a current block from among blocks not adjacent to the current block, or may be a block that is encoded or decoded in a sub-block unit mode prior to a current block from among neighboring blocks of the current block.

In FIGS. 19 to 23, whether a neighboring block is predicted in a sub-block unit mode or is not predicted in a sub-block unit mode may be determined by identifying at least two neighboring sub-blocks which have the same motion vector and which are adjacent to each other from among neighboring sub-blocks which are adjacent to a current block, or may be determined by identifying whether neighboring blocks adjacent to the current block are blocks which are not coded in units of sub-blocks or blocks which are coded in units of sub-blocks.

Figure 24:
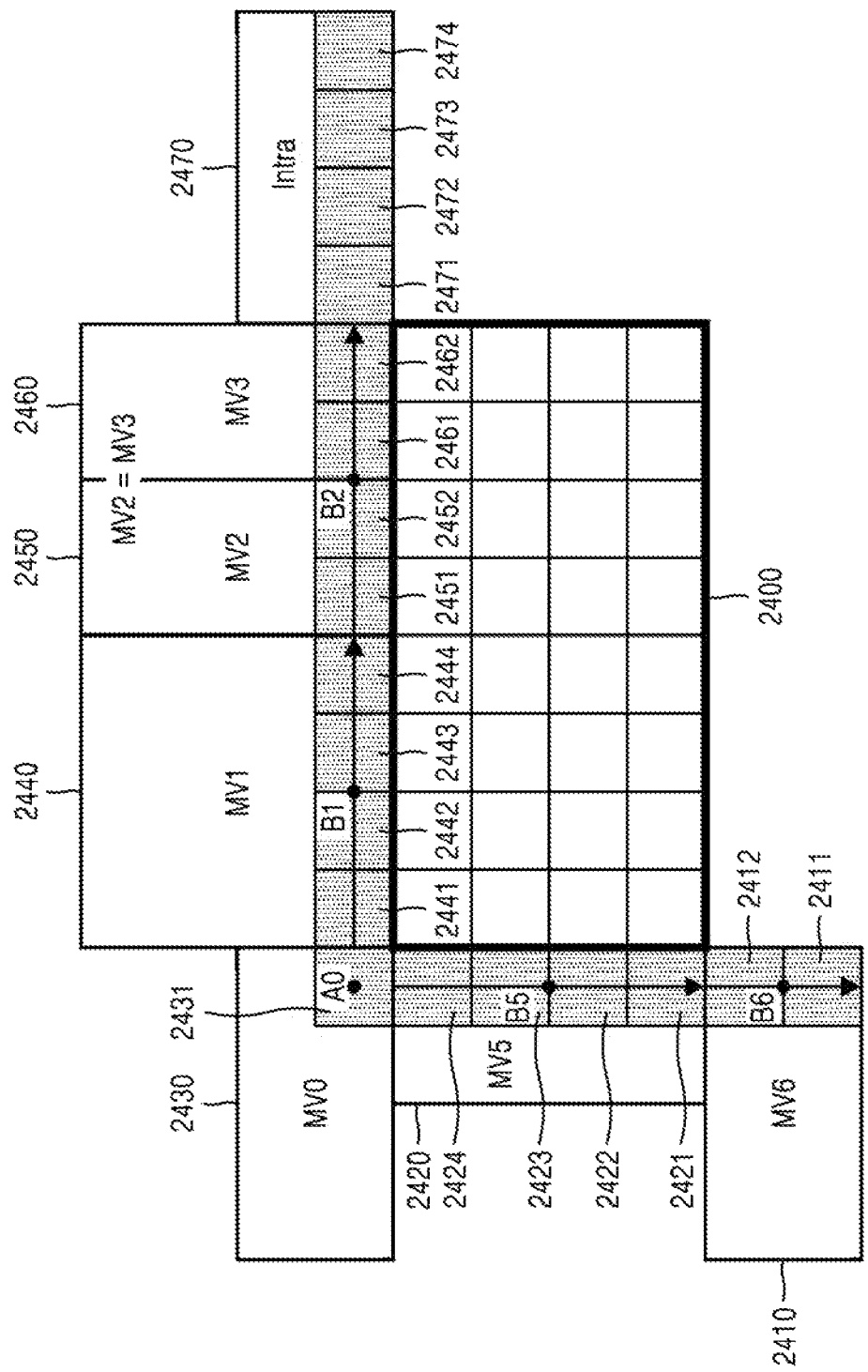
FIG. 24 is a diagram for describing a method of deriving a parameter of a model for determining a motion vector, by scanning inter-predicted neighboring blocks in units of sub-blocks, according to an embodiment of the disclosure.

FIG. 24 is a diagram for describing a method of deriving a parameter of a model for determining a motion vector, by scanning inter-predicted neighboring blocks in units of sub-blocks, according to an embodiment of the disclosure.

Referring to FIG. 24, a parameter of a model for determining a motion vector may be derived by dividing neighboring blocks 2410, 2420, 2430, 2440, 2450, 2460, and 2470 adjacent to a current block 2400 into pre-determined sub-block units and comparing motion vectors by scanning neighboring sub-blocks adjacent to the current block 2400.

That is, a parameter of a model for determining a motion vector may be derived by comparing motion vectors of adjacent neighboring sub-blocks regardless of whether a neighboring block that is predicted in an inter mode is predicted in a sub-block unit mode.

For example starting from a first neighboring sub-block 2431 located on an upper left side of the current block 2400, motion vectors of neighboring sub-blocks that are adjacent in a rightward direction or a downward direction are compared.

Because a motion vector mv0 of the first neighboring sub-block 2431 and a motion vector mv1 of a second neighboring sub-block 2441 adjacent to the first neighboring sub-block 2431 in the rightward direction are different from each other, the motion vector mv0 of the first neighboring sub-block 2431 is determined as a motion vector and coordinates A0 of the center of the first neighboring sub-block 2431 are determined as location information.

According to an embodiment of the disclosure, because a $14^{th}$ neighboring sub-block 2424 is adjacent to the first neighboring sub-block 2431 in the downward direction, the first neighboring sub-block 2431 and the $14^{th}$ neighboring sub-block 2424 may be additionally compared with each other. Even in this case, because the motion vector mv0 of the first neighboring sub-block 2431 and a motion vector mv5 of the $14^{th}$ neighboring sub-block 2424 are different from each other, the motion vector mv0 of the first neighboring sub-block 2431 is determined as a motion vector and the coordinates A0 of the center of the first neighboring sub-block 2431 are determined as location information.

Because a motion vector mv1 of the second neighboring sub-block 2441 and a motion vector mv1 of a third neighboring sub-block 2442 that is adjacent to the second neighboring sub-block 2441 in the rightward direction are the same, comparison is continuously performed. Because the motion vector mv1 of the third neighboring sub-block 2442 and a motion vector mv1 of a fourth neighboring sub-block 2443 that is adjacent to the third neighboring sub-block 2442 in the rightward direction are the same, comparison is continuously performed. Because the motion vector mv1 of the fourth neighboring sub-block 2443 and a motion vector mv1 of a fifth neighboring sub-block 2444 that is adjacent to the fourth neighboring sub-block 2443 in the rightward direction are the same, comparison is continuously performed. Because the motion vector mv1 of the fifth neighboring sub-block 2444 and a motion vector mv2 of a sixth neighboring sub-block 2451 that is adjacent to the fifth neighboring sub-block 2444 in the rightward direction are different from each other, a representative motion vector of the second neighboring sub-block 2441, the third neighboring sub-block 2442, the fourth neighboring sub-block 2443, and the fifth neighboring sub-block 2444 is determined to be mv1, and representative location information of the second neighboring sub-block 2441, the third neighboring sub-block 2442, the fourth neighboring sub-block 2443, and the fifth neighboring sub-block 2444 is determined to be coordinates B1 of the center of an area including the second neighboring sub-block 2441, the third neighboring sub-block 2442, the fourth neighboring sub-block 2443, and the fifth neighboring sub-block 2444.

Because the motion vector mv2 of the sixth neighboring sub-block 2451 and a motion vector mv2 of a seventh neighboring sub-block 2452 that is adjacent to the sixth neighboring sub-block 2451 in the rightward direction are the same, comparison is continuously performed. Because the motion vector mv2 of the seventh neighboring sub-block 2452 and a motion vector mv3 of an eighth neighboring sub-block 2461 that is adjacent to the seventh neighboring sub-block 2452 in the rightward direction are the same, comparison is continuously performed. Because the motion vector mv3 of the eighth neighboring sub-block 2461 and a motion vector mv3 of a ninth neighboring sub-block 2462 that is adjacent to the eighth neighboring sub-block 2461 in the rightward direction are the same, comparison is continuously performed. Because a tenth neighboring sub-block 2471 that is adjacent to the ninth neighboring sub-block 2462 in the rightward direction has no motion vector and the motion vector mv3 of the ninth neighboring sub-block 2462 and a motion vector of the tenth neighboring sub-block 2471 are different from each other, a representative motion vector of the sixth neighboring sub-block 2451, the seventh neighboring sub-block 2452, the eighth neighboring sub-block 2461, and the ninth neighboring sub-block 2462 is determined to be mv2, and representative location information of the sixth neighboring sub-block 2451, the seventh neighboring sub-block 2452, the eighth neighboring sub-block 2461, and the ninth neighboring sub-block 2462 is determined to be coordinates B2 of the center of an area including the sixth neighboring sub-block 2451, the seventh neighboring sub-block 2452, the eighth neighboring sub-block 2461, and the ninth neighboring sub-block 2462. Because the sixth neighboring sub-block 2451 and the seventh neighboring sub-block 2452, and the eighth neighboring sub-block 2461 and the ninth neighboring sub-block 2462 are included in different neighboring blocks but mv2 and mv3 are the same, representative location information is determined to be coordinates of the center of adjacent neighboring sub-blocks having the same motion vector.

Because the motion vector mv5 of the $14^{th}$ neighboring sub-block 2424 and a motion vector mv5 of a $15^{th}$ neighboring sub-block 2423 that is adjacent to the $14^{th}$ neighboring sub-block 2424 in the downward direction are the same, comparison is continuously performed. Because the motion vector mv5 of the $15^{th}$ neighboring sub-block 2423 and a motion vector mv5 of a $16^{th}$ neighboring sub-block 2422 that is adjacent to the $15^{th}$ neighboring sub-block 2423 in the downward direction are the same, comparison is continuously performed. Because the motion vector mv5 of the $16^{th}$ neighboring sub-block 2422 and a motion vector mv5 of a $17^{th}$ neighboring sub-block 2421 that is adjacent to the $16^{th}$ neighboring sub-block 2422 in the downward direction are the same, comparison is continuously performed. Because the motion vector mv5 of the $17^{th}$ neighboring sub-block 2421 and a motion vector mv6 of an $18^{th}$ neighboring sub-block 2412 that is adjacent to the $17^{th}$ neighboring sub-block 2421 in the rightward direction are different from each other, a representative motion vector of the $14^{th}$ neighboring sub-block 2424, the $15^{th}$ neighboring sub-block 2423, the $16^{th}$ neighboring sub-block 2422, and the $17^{th}$ neighboring sub-block 2421 is determined to be mv5, and representative location information of the $14^{th}$ neighboring sub-block 2424, the $15^{th}$ neighboring sub-block 2423, the $16^{th}$ neighboring sub-block 2422, and the $17^{th}$ neighboring sub-block 2421 is determined to be coordinates B5 of the center of an area including the $14^{th}$ neighboring sub-block 2424, the $15^{th}$ neighboring sub-block 2423, the $16^{th}$ neighboring sub-block 2422, and the $17^{th}$ neighboring sub-block 2421.

Because the motion vector mv6 of the $18^{th}$ neighboring sub-block 2412 and a motion vector mv6 of an $19^{th}$ neighboring sub-block 2411 that is adjacent to the $18^{th}$ neighboring sub-block 2412 in the downward direction are the same, comparison is continuously performed. Because an area below the $19^{th}$ neighboring sub-block 2411 is an area in which scanning is not allowed because there is no available neighboring block, comparison is terminated, and a representative motion vector of the $18^{th}$ neighboring sub-block 2412 and the $19^{th}$ neighboring sub-block 2411 is determined to be mv6, and representative location information of the $18^{th}$ neighboring sub-block 2412 and the $19^{th}$ neighboring sub-block 2411 is determined to be coordinates B6 of the center of an area including the $18^{th}$ neighboring sub-block 2412 and the $19^{th}$ neighboring sub-block 2411.

According to an embodiment of the disclosure, it may be additionally determined whether reference frames of adjacent neighboring sub-blocks are the same in addition to whether motion vectors are the same. That is, when motion vectors are the same and reference frames are the same, scanning may be continuously performed, and when motion vectors or reference frames are different, scanning may be stopped.

A start time and a comparison direction for comparing motion vectors are examples, and an embodiment of the disclosure is not limited thereto.

The method corresponding to FIG. 24 has one motion vector and one location information when there is no neighboring block predicted in a sub-block unit mode and adjacent neighboring blocks have the same motion vector, whereas the method corresponding to FIG. 18 has two motion vectors and two pieces of location information when there is no neighboring block predicted in a sub-block unit mode and adjacent neighboring blocks have the same motion vector.

Figure 25:
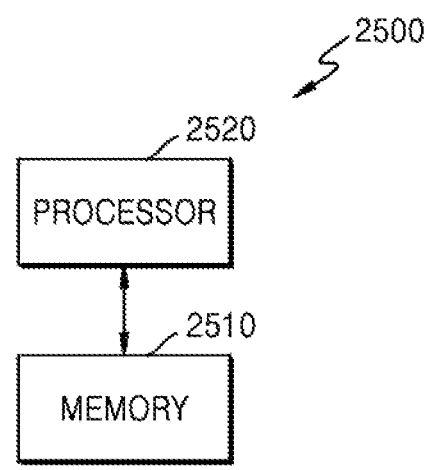
FIG. 25 is a block diagram illustrating an image decoding apparatus, according to an embodiment of the disclosure.

FIG. 25 is a block diagram illustrating an image decoding apparatus, according to an embodiment of the disclosure.

An image decoding apparatus 2500 according to an embodiment of the disclosure may include a memory 2510 and at least one processor 2520 connected to the memory 2510. Operations of the image decoding apparatus 2500 according to an embodiment of the disclosure may be performed by individual processors, or may be performed under the control of a central processor. Also, the memory 2510 of the image decoding apparatus 2500 may store data received from the outside, and data generated by a processor, for example, information about a parameter for determining a motion vector of a block that is decoded in a sub-block unit mode prior to a current block.

The processor 2520 of the image decoding apparatus 2500 may identify at least two neighboring sub-blocks which have the same motion vector and which are adjacent to each other from among neighboring sub-blocks which are adjacent to a current block, may determine a representative motion vector and representative location information of the identified at least two neighboring sub-blocks, may determine a parameter of a model for determining a motion vector by using the representative motion vector and the representative location information, may determine a motion vector of a current sub-block based on location information of the current sub-block included in the current block and the determined parameter, and may predict the current block by using the motion vector of the current sub-block.

Also, the processor 2520 of the image decoding apparatus 2500 may identify a first neighboring block that is not coded in units of sub-blocks and a second neighboring block that is coded in units of sub-blocks from among neighboring blocks adjacent to a current block, may identify a first motion vector and first location information corresponding to the first neighboring block, may determine a parameter of a model for determining a motion vector based on the first motion vector and the first location information, may determine a motion vector of a current sub-block based on location information of the current sub-block included in the current block and the determined parameter, and may predict the current block by using the motion vector of the current sub-block.

Also, the processor 2520 of the image decoding apparatus 2500 may compare motion vectors of a first neighboring block and a second neighboring block adjacent to each other from among neighboring blocks adjacent to a current block, may identify representative location information of the first neighboring block and the second neighboring block based on a result of the comparing indicating that a first motion vector of the first neighboring block and a second motion vector of the second neighboring block are the same, may determine a parameter of a model for determining a motion vector by using one of the first motion vector and the second motion vector and the representative location information, may determine the parameter by using the first motion vector, the second motion vector, first location information of the first neighboring block, and second location information of the second neighboring block based on a result of the comparing indicating that the first motion vector and the second motion vector are different from each other, may determine a motion vector of a current sub-block based on location information of the current sub-block included in the current block and the determined parameter, and may predict the current block by using the motion vector of the current sub-block.

The image decoding apparatus 2500 of FIG. 25 may perform operations according to an image decoding method of FIGS. 26 to 28 described below.

Figure 26:
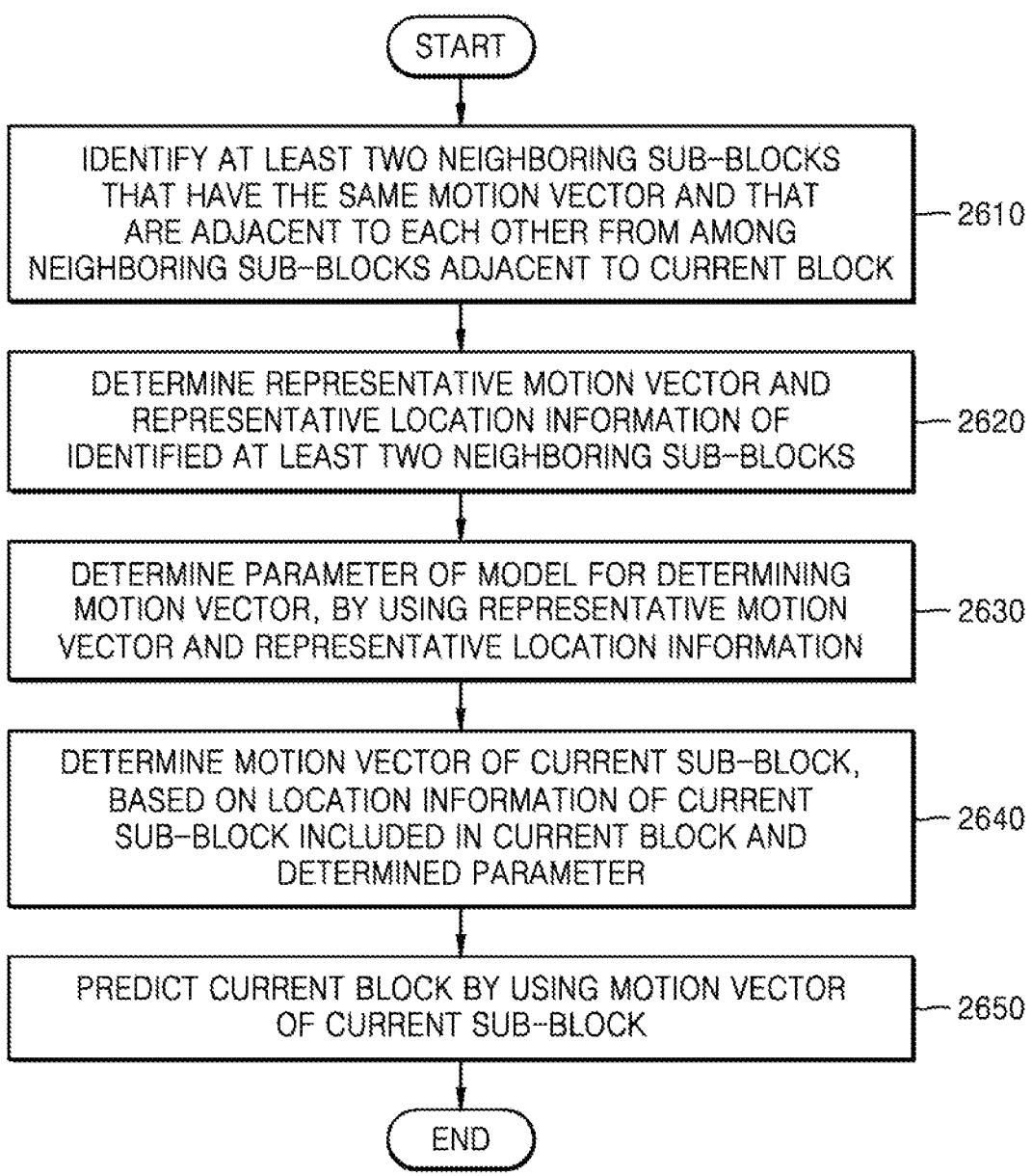
FIG. 26 is a flowchart illustrating an image decoding method, according to an embodiment of the disclosure.

FIG. 26 is a flowchart illustrating an image decoding method, according to an embodiment of the disclosure.

Referring to FIG. 26, in operation 2610, the image decoding apparatus 2500 may identify at least two neighboring sub-blocks that have the same motion vector and that are adjacent to each other from among neighboring sub-blocks adjacent to a current block.

According to an embodiment of the disclosure, the image decoding apparatus 2500 may receive information indicating whether a prediction mode of the current block is a sub-block unit mode. The information indicating whether a prediction mode of the current block is a sub-block unit mode may be determined and signaled in an encoding process. When the current block is in a sub-block unit mode, the image decoding apparatus 2500 may identify at least two neighboring sub-blocks that have the same motion vector and that are adjacent to each other from among neighboring sub-blocks that are adjacent to the current block.

In operation 2620, the image decoding apparatus 2500 may determine a representative motion vector and representative location information corresponding to the identified at least two neighboring sub-blocks. The representative motion vector may be determined based on the same motion vector, and the representative location information may indicate coordinates determined based on the identified at least two neighboring sub-blocks.

According to an embodiment of the disclosure, the representative location information may include coordinates corresponding to the center of the identified at least two neighboring sub-blocks or coordinates of the center of a neighboring block including the identified at least two neighboring sub-blocks.

In operation 2630, the image decoding apparatus 2500 may determine a parameter of a model for determining a motion vector by using the representative motion vector and the representative location information.

According to an embodiment of the disclosure, the image decoding apparatus 2500 may obtain an initial parameter of a model for determining a motion vector from a block reconstructed in a sub-block unit mode prior to the current block, and may refine a parameter by using the initial parameter, the representative motion vector, and the representative location information.

According to an embodiment of the disclosure, the image decoding apparatus 2500 may determine individual motion vectors and pieces of individual location information of neighboring sub-blocks that have different motion vectors or that are not adjacent to each other from among neighboring sub-blocks adjacent to the current block, and may determine a parameter by further using the individual motion vectors and the pieces of individual location information.

According to an embodiment of the disclosure, the image decoding apparatus 2500 may obtain an initial parameter of a model for determining a motion vector from a block reconstructed in a sub-block unit mode prior to the current block, and may refine a parameter by using the initial parameter, the representative motion vector, the representative location information, the individual motion vectors, and the pieces of individual location information.

In operation 2640, the image decoding apparatus 2500 may determine a motion vector of a current sub-block, based on location information of the current sub-block included in the current block and the determined parameter.

In operation 2650, the image decoding apparatus 2500 may predict the current block by using the motion vector of the current sub-block.

Figure 27:
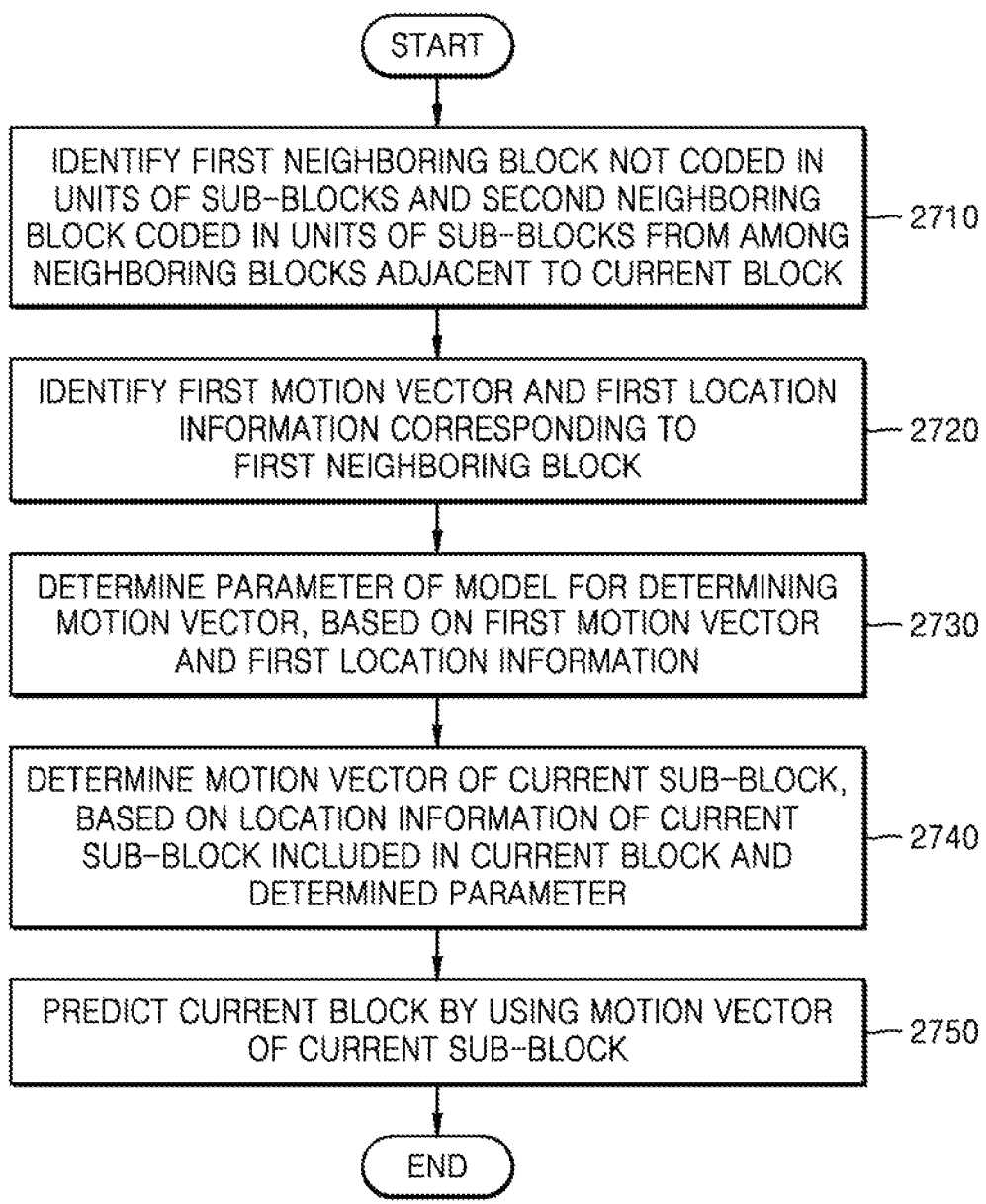
FIG. 27 is a flowchart illustrating an image decoding method, according to an embodiment of the disclosure.

FIG. 27 is a flowchart illustrating an image decoding method, according to an embodiment of the disclosure.

Referring to FIG. 27, in operation 2710, the image decoding apparatus 2500 may identify a first neighboring block that is not coded in units of sub-blocks and a second neighboring block that is coded in units of sub-blocks from among neighboring blocks that are adjacent to a current block.

According to an embodiment of the disclosure, the image decoding apparatus 2500 may receive information indicating whether a prediction mode of the current block is a sub-block unit mode. The information indicating whether a prediction mode of the current block is a sub-block unit mode may be determined and signaled in an encoding process. The image decoding apparatus 2500 may identify the first neighboring block that is not coded in units of sub-blocks and the second neighboring block that is coded in units of sub-blocks from among neighboring blocks that are adjacent to the current block when the current block is in a sub-block unit mode.

In operation 2720, the image decoding apparatus 2500 may determine a first motion vector and first location information corresponding to the first neighboring block. The first location information may indicate coordinates determined based on the first neighboring block.

According to an embodiment of the disclosure, the first location information may include coordinates corresponding to the center of the first neighboring block.

According to an embodiment of the disclosure, the first location information may include coordinates corresponding to the center of an area including first neighboring sub-blocks adjacent to the current block from among first neighboring sub-blocks included in the first neighboring block, and the first neighboring sub-blocks may be obtained by dividing the first neighboring block into pre-determined sub-block units.

In operation 2730, the image decoding apparatus 2500 may determine a parameter of a model for determining a motion vector, based on the first motion vector and the first location information.

According to an embodiment of the disclosure, the image decoding apparatus 2500 may obtain an initial parameter of a model for determining a motion vector from a block reconstructed in a sub-block unit mode prior to the current block, and may refine a parameter by using the initial parameter, the first motion vector, and the first location information.

According to an embodiment of the disclosure, the image decoding apparatus 2500 may determine second motion vectors and pieces of second location information corresponding to second neighboring sub-blocks included in the second neighboring block, and may determine a parameter by further using the second motion vectors and the pieces of second location information.

According to an embodiment of the disclosure, the image decoding apparatus 2500 may obtain an initial parameter of a model for determining a motion vector from a block reconstructed in a sub-block unit mode prior to the current block, and may refine a parameter by using the initial parameter, the first motion vector, the first location information, the second motion vector, and the second location information.

According to an embodiment of the disclosure, based on at least two third neighboring sub-blocks having the same motion vector and being adjacent to each other from among the second neighboring sub-blocks that are included in the second neighboring block, the image decoding apparatus 2500 may determine third location information corresponding to the center of the third neighboring sub-blocks, and may determine a parameter by using the same motion vector and third location information of the third neighboring sub-blocks.

In operation 2740, the image decoding apparatus 2500 may determine a motion vector of a current sub-block, based on location information of the current sub-block included in the current block and the determined parameter.

In operation 2750, the image decoding apparatus 2500 may predict the current block by using the motion vector of the current sub-block.

Figure 28:
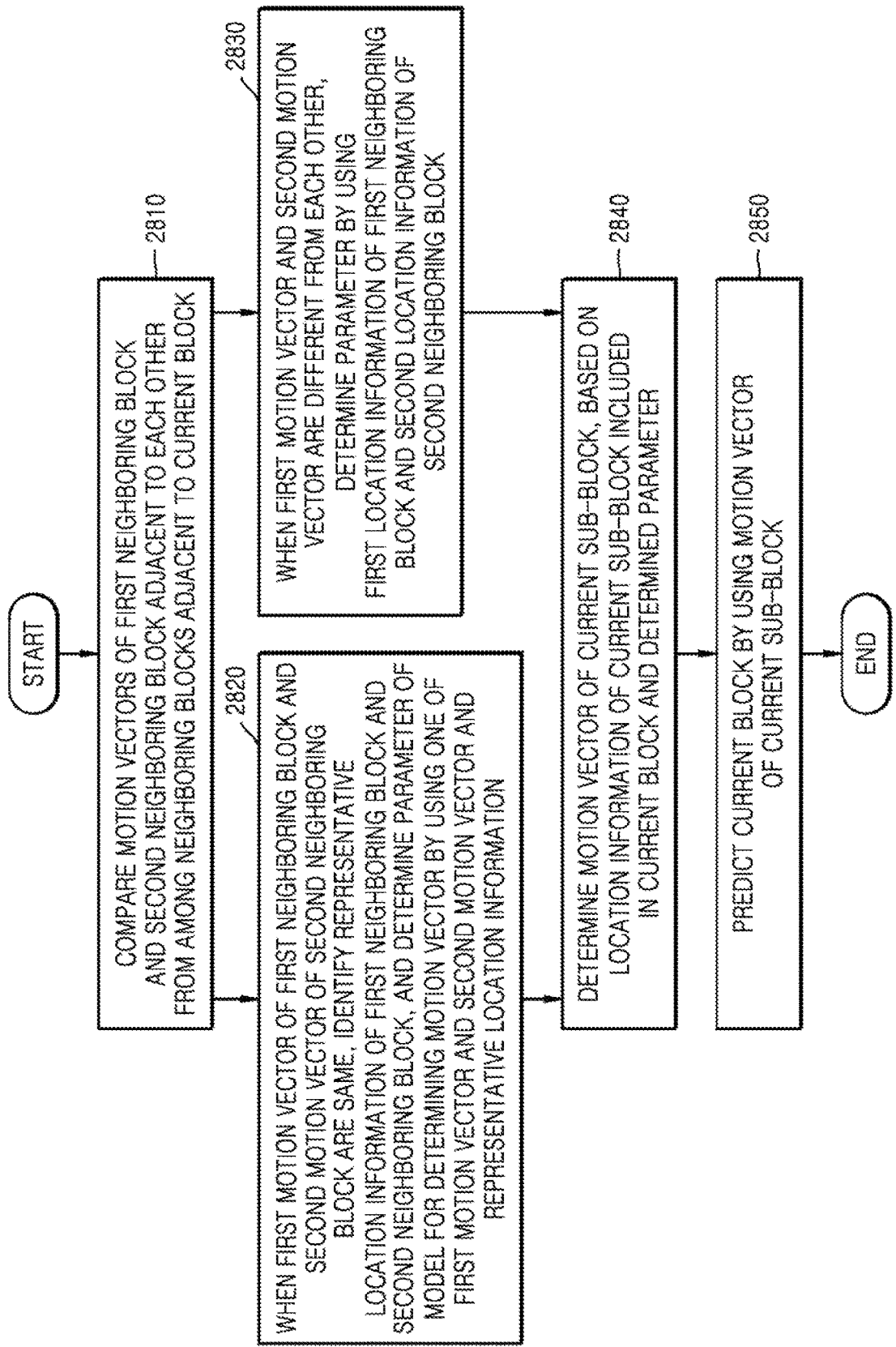
FIG. 28 is a flowchart illustrating an image decoding method, according to an embodiment of the disclosure.

FIG. 28 is a flowchart illustrating an image decoding method, according to an embodiment of the disclosure.

Referring to FIG. 28, in operation 2810, the image decoding apparatus 2500 may compare motion vectors of a first neighboring block and a second neighboring block adjacent to each other from among neighboring blocks adjacent to a current block.

According to an embodiment of the disclosure, the image decoding apparatus 2500 may receive information indicating whether a prediction mode of the current block is a sub-block unit mode. The information indicating whether a prediction mode of the current block is a sub-block unit mode may be determined and signaled in an encoding process. The image decoding apparatus 2500 may compare motion vectors of the first neighboring block and the second neighboring block adjacent to each other from among neighboring blocks adjacent to the current block, when the current block is in a sub-block unit mode.

In operation 2820, based on a result of the comparison indicating that a first motion vector of the first neighboring block and a second motion vector of the second neighboring block are the same, the image decoding apparatus 2500 may determine representative location information of the first neighboring block and the second neighboring block, and may determine a parameter of a model for determining a motion vector by using one of the first motion vector and the second motion vector and the representative location information.

According to an embodiment of the disclosure, the representative location information may indicate coordinates corresponding to the center of the first neighboring block and the second neighboring block.

In operation 2830, based on a result of the comparison indicating that the first motion vector and the second motion vector are different from each other, the image decoding apparatus 2500 may determine a parameter by using the first motion vector, the second motion vector, first location information of the first neighboring block, and second location information of the second neighboring block.

According to an embodiment of the disclosure, the first location information may indicate coordinates corresponding to the center of the first neighboring block, and the second location information may indicate coordinates corresponding to the center of the second neighboring block.

According to an embodiment of the disclosure, at least one of the first neighboring block and the second neighboring block may be a coding unit or a sub-block unit included in the coding unit.

According to an embodiment of the disclosure, the image decoding apparatus 2500 may obtain an initial parameter of a model for determining a motion vector from a block reconstructed in a sub-block unit mode prior to the current block, may refine a parameter by using the initial parameter, one motion vector, and the representative location information based on the first motion vector and the second motion vector being the same motion vector, and may refine a parameter by using the initial parameter, the first motion vector, the second motion vector, the first location information, and the second location information based on the first motion vector and the second motion vector being different from each other.

In operation 2840, the image decoding apparatus 2500 may determine a motion vector of a current sub-block, based on location information of the current sub-block included in the current block and the determined parameter.

In operation 2850, the image decoding apparatus 2500 may predict the current block by using the motion vector of the current sub-block.

Figure 29:
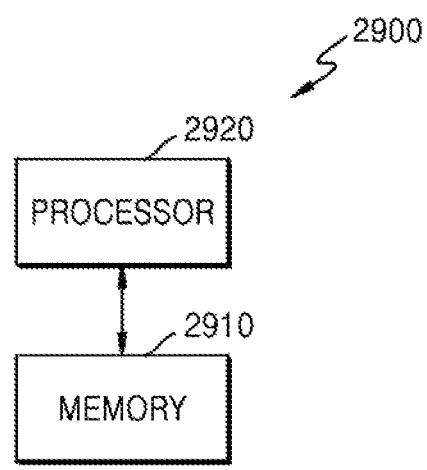
FIG. 29 is a block diagram illustrating an image encoding apparatus, according to an embodiment of the disclosure.

FIG. 29 is a block diagram illustrating an image encoding apparatus, according to an embodiment of the disclosure.

An image encoding apparatus 2900 according to an embodiment of the disclosure may include a memory 2910 and at least one processor 2920 connected to the memory 2910. Operations of the image encoding apparatus 2900 according to an embodiment of the disclosure may be performed by individual processors, or may be performed under the control of a central processor. Also, the memory 2910 of the image encoding apparatus 2900 may store data received from the outside, and data generated by a processor, for example, information about a parameter for determining a motion vector of a block encoded in a sub-block unit mode prior to a current block.

The processor 2920 of the image encoding apparatus 2900 may identify at least two neighboring sub-blocks that have the same motion vector and that are adjacent to each other from among neighboring sub-blocks that are adjacent to a current block, may determine a representative motion vector and representative location information of the identified at least two neighboring sub-blocks, may determine a parameter of a model for determining a motion vector by using the representative motion vector and the representative location information, may determine a motion vector of a current sub-block based on location information of the current sub-block included in the current block and the determined parameter, and may predict the current block by using the motion vector of the current sub-block.

Also, the processor 2920 of the image encoding apparatus 2900 may identify a first neighboring block that is not coded in units of sub-blocks and a second neighboring block that is coded in units of sub-blocks from among neighboring blocks adjacent to a current block, may determine a first motion vector and first location information corresponding to the first neighboring block, may determine a parameter of a model for determining a motion vector based on the first motion vector and the first location information, may determine a motion vector of a current sub-block based on location information of the current sub-block included in the current block and the determined parameter, and may predict the current block by using the motion vector of the current sub-block.

Also, the processor 2920 of the image encoding apparatus 2900 may compare motion vectors of a first neighboring block and a second neighboring block adjacent to each other from among neighboring blocks adjacent to a current block, may determine representative location information of the first neighboring block and the second neighboring block based on a result of the comparing indicating that a first motion vector of the first neighboring block and a second motion vector of the second neighboring block are the same, may determine a parameter of a model for determining a motion vector by using one of the first motion vector and the second motion vector and the representative location information, may determine the parameter by using the first motion vector, the second motion vector, first location information of the first neighboring block, and second location of the second neighboring block based on a result of the comparing indicating that the first motion vector and the second motion vector are different from each other, may determine a motion vector of a current sub-block based on location information of the current sub-block included in the current block and the determined parameter, and may predict the current block by using the motion vector of the current sub-block.

The image encoding apparatus 2900 of FIG. 29 may perform operations according to an image encoding method of FIGS. 30 to 32 described below.

Figure 30:
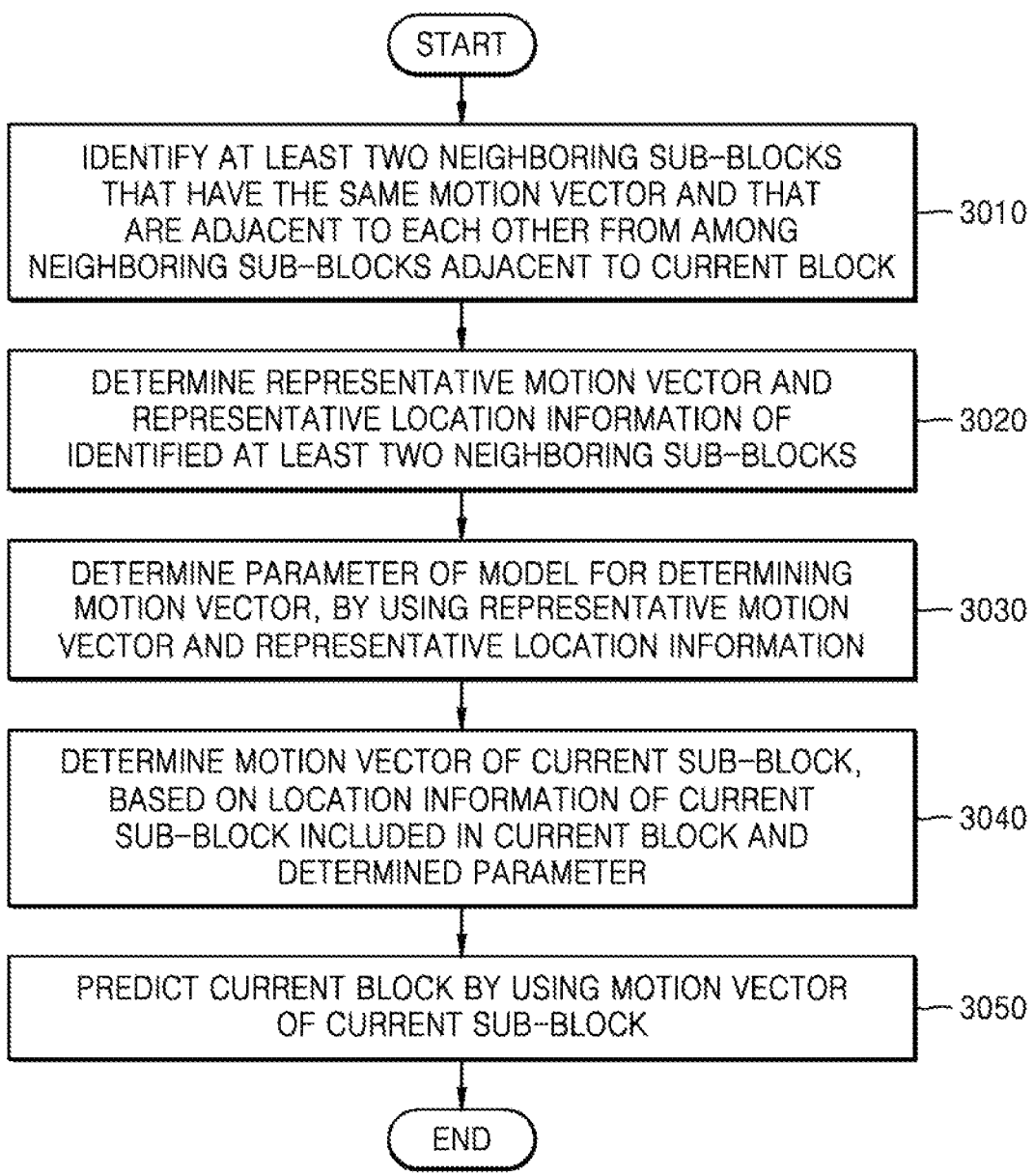
FIG. 30 is a flowchart illustrating an image encoding method, according to an embodiment of the disclosure.

FIG. 30 is a flowchart illustrating an image encoding method, according to an embodiment of the disclosure.

Referring to FIG. 30, in operation 3010, the image encoding apparatus 2900 may identify at least two neighboring sub-blocks that have the same motion vector and that are adjacent to each other from among neighboring sub-blocks adjacent to a current block.

According to an embodiment of the disclosure, the image encoding apparatus 2900 may determine whether a prediction mode of the current block is a sub-block unit mode. Whether a prediction mode of the current block is a sub-block unit mode may be determined through sum of transform differences (ATD) or rate-distortion optimization (RDO) calculation, and information about whether a prediction mode of the current block is a sub-block unit mode may be encoded and signaled. When a prediction mode of the current block is a sub-block unit mode, the image encoding apparatus 2900 may identify at least two neighboring sub-blocks that have the same motion vector and that are adjacent to each other from among neighboring sub-blocks that are adjacent to the current block.

In operation 3020, the image encoding apparatus 2900 may determine a representative motion vector and representative location information of the identified at least two neighboring sub-blocks. The representative motion vector may be determined based on the same motion vector, and the representative location information may indicate coordinates determined based on the identified at least two neighboring sub-blocks.

According to an embodiment of the disclosure, the representative location information may include coordinates corresponding to the center of the identified at least two neighboring sub-blocks or coordinates of the center of a neighboring block including the identified at least two neighboring sub-blocks.

In operation 3030, the image encoding apparatus 2900 may determine a parameter of a model for determining a motion vector by using the representative motion vector and the representative location information.

According to an embodiment of the disclosure, the image encoding apparatus 2900 may obtain an initial parameter of a model for determining a motion vector from a block encoded in a sub-block unit mode prior to the current block, and may refine a parameter by using the initial parameter, the representative motion vector, and the representative location information.

According to an embodiment of the disclosure, the image encoding apparatus 2900 may determine individual motion vectors and pieces of individual location information of neighboring sub-blocks that have different motion vectors or that are not adjacent to each other from among neighboring sub-blocks adjacent to the current block, and may determine a parameter by further using the individual motion vectors and the pieces of individual location information.

According to an embodiment of the disclosure, the image encoding apparatus 2900 may obtain an initial parameter of a model for determining a motion vector from a block encoded in a sub-block unit mode prior to the current block, and may refine a parameter by using the initial parameter, the representative motion vector, the representative location information, the individual motion vectors, and the pieces of individual location information.

In operation 3040, the image encoding apparatus 2900 may determine a motion vector of a current sub-block, based on location information of the current sub-block included in the current block and the determined parameter.

In operation 3050, the image encoding apparatus 2900 may predict the current block by using the motion vector of the current sub-block.

Figure 31:
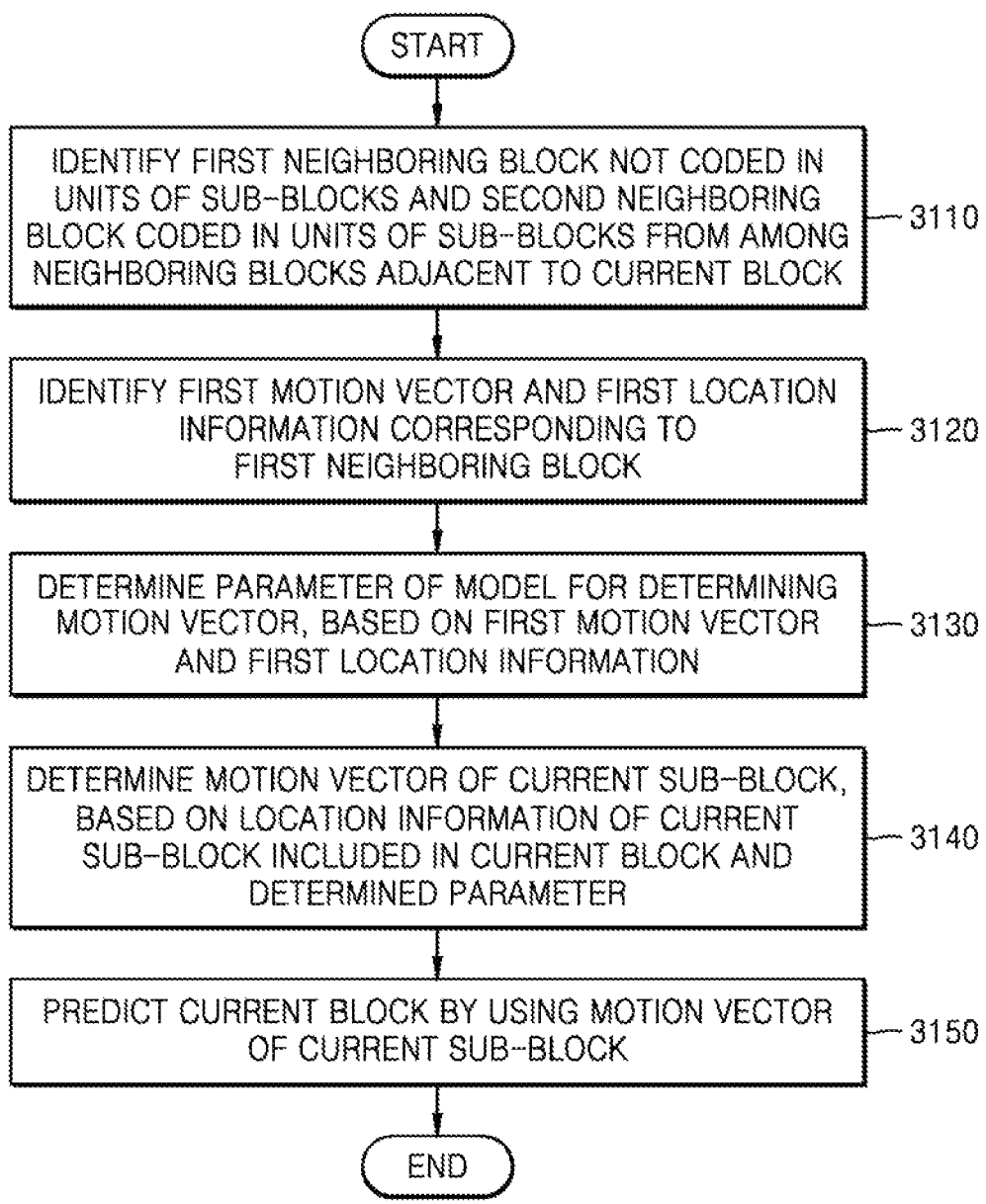
FIG. 31 is a flowchart illustrating an image encoding method, according to an embodiment of the disclosure.

FIG. 31 is a flowchart illustrating an image encoding method, according to an embodiment of the disclosure.

Referring to FIG. 31, in operation 3110, the image encoding apparatus 2900 may identify a first neighboring block that is not coded in units of sub-blocks and a second neighboring block that is coded in units of sub-blocks from among neighboring blocks that are adjacent to a current block.

According to an embodiment of the disclosure, the image encoding apparatus 2900 may determine whether a prediction mode of the current block is a sub-block unit mode. Whether a prediction mode of the current block is a sub-block unit mode may be determined through ATD or RDO calculation, and information about whether a prediction mode of the current block is a sub-block unit mode may be encoded and signaled. The image encoding apparatus 2900 may identify the first neighboring block that is not coded in units of sub-blocks and the second neighboring block that is coded in units of sub-blocks from among neighboring blocks that are adjacent to the current block when a prediction mode of the current block is a sub-block unit mode.

In operation 3120, the image encoding apparatus 2900 may determine a first motion vector and first location information corresponding to the first neighboring block. The first location information may indicate coordinates determined based on the first neighboring block.

According to an embodiment of the disclosure, the first location information may include coordinates corresponding to the center of the first neighboring block.

According to an embodiment of the disclosure, the first location information may include coordinates corresponding to the center of an area including first neighboring sub-blocks adjacent to the current block from among first neighboring sub-blocks included in the first neighboring block, and the first neighboring sub-blocks may be obtained by dividing the first neighboring block into pre-determined sub-block units.

In operation 3130, the image encoding apparatus 2900 may determine a parameter of a model for determining a motion vector based on the first motion vector and the first location information.

According to an embodiment of the disclosure, the image encoding apparatus 2900 may obtain an initial parameter of a model for determining a motion vector from a block encoded in a sub-block unit mode prior to the current block, and may refine a parameter by using the initial parameter, the first motion vector, and the first location information.

According to an embodiment of the disclosure, the image encoding apparatus 2900 may determine second motion vectors and pieces of second location information corresponding to second neighboring sub-blocks included in the second neighboring block, and may determine a parameter by further using the second motion vectors and the pieces of second location information.

According to an embodiment of the disclosure, the image encoding apparatus 2900 may obtain an initial parameter of a model for determining a motion vector from a block encoded in a sub-block unit mode prior to the current block, and may refine a parameter by using the initial parameter, the first motion vector, the first location information, the second motion vector, and the second location information.

According to an embodiment of the disclosure, based on at least two third neighboring sub-blocks having the same motion vector and being adjacent to each other from among the second neighboring sub-blocks included in the second neighboring block, the image encoding apparatus 2900 may determine third location information corresponding to the center of the third neighboring sub-blocks, and may determine a parameter by using the same motion vector and the third location information of the third neighboring sub-blocks.

In operation 3140, the image encoding apparatus 2900 may determine a motion vector of a current sub-block, based on location information of the current sub-block included in the current block and the determined parameter.

In operation 3150, the image encoding apparatus 2900 may predict the current block by using the motion vector of the current sub-block.

Figure 32:
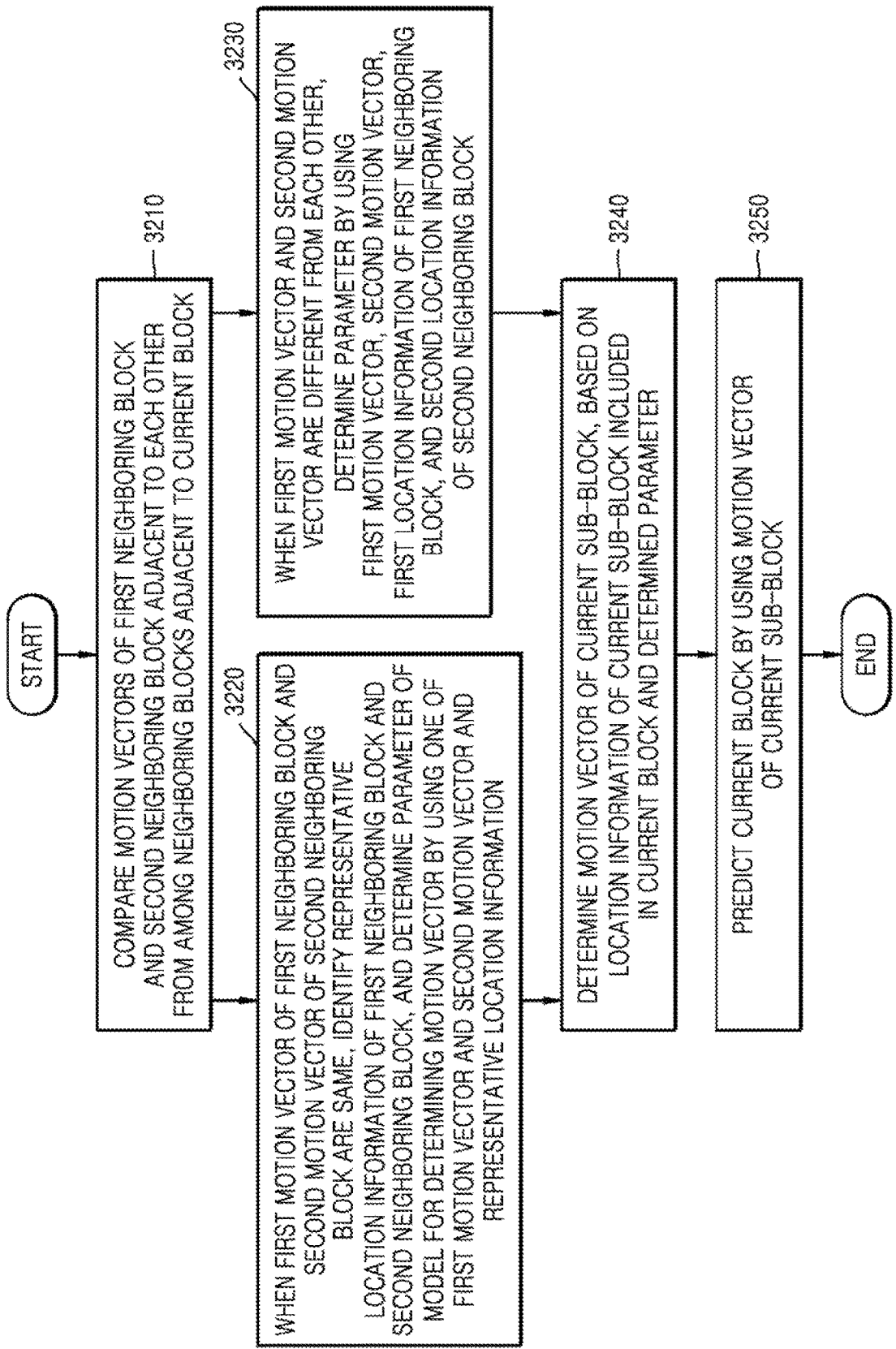
FIG. 32 is a flowchart illustrating an image encoding method, according to an embodiment of the disclosure.

FIG. 32 is a flowchart illustrating an image encoding method, according to an embodiment of the disclosure.

Referring to FIG. 32, in operation 3210, the image encoding apparatus 2900 may compare motion vectors of a first neighboring block and a second neighboring block adjacent to each other from among neighboring blocks adjacent to a current block.

According to an embodiment of the disclosure, the image encoding apparatus 2900 may determine whether a prediction mode of the current block is a sub-block unit mode. Whether a prediction mode of the current block is a sub-block unit mode may be determined through ATD or RDO calculation, and information about whether a prediction mode of the current block is a sub-block unit mode may be encoded and signaled. The image encoding apparatus 2900 may compare motion vectors of the first neighboring block and the second neighboring block adjacent to each other from among neighboring blocks adjacent to the current block, when a prediction mode of the current block is a sub-block unit mode.

In operation 3220, based on a result of the comparison indicating that a first motion vector of the first neighboring block and a second motion vector of the second neighboring block are the same, the image encoding apparatus 2900 may determine representative location information of the first neighboring block and the second neighboring block, and may determine a parameter of a model for determining a motion vector by using one of the first motion vector and the second motion vector and the representative location information.

According to an embodiment of the disclosure, the representative location information may indicate coordinates corresponding to the center of the first neighboring block and the second neighboring block.

In operation 3230, based on a result of the comparison indicating that the first motion vector and the second motion vector are different from each other, the image encoding apparatus 2900 may determine a parameter by using the first motion vector, the second motion vector, first location information of the first neighboring block, and second location information of the second neighboring block.

According to an embodiment of the disclosure, the first location information may indicate coordinates corresponding to the center of the first neighboring block, and the second location information may indicate coordinates corresponding to the center of the second neighboring block.

According to an embodiment of the disclosure, at least one of the first neighboring block and the second neighboring block may be a coding unit or a sub-block unit included in the coding unit.

According to an embodiment of the disclosure, the image encoding apparatus 2900 may obtain an initial parameter of a model for determining a motion vector from a block encoded in a sub-block unit mode prior to the current block, may refine a parameter by using the initial parameter, one motion vector, and the representative location information based on the first motion vector and the second motion vector being the same motion vector, and may refine a parameter by using the initial parameter, the first motion vector, the second motion vector, the first location information, and the second location information based on the first motion vector and the second motion vector being different from each other.

In operation 3240, the image encoding apparatus 2900 may determine a motion vector of a current sub-block, based on location information of the current sub-block included in the current block and the determined parameter.

In operation 3250, the image encoding apparatus 2900 may predict the current block by using the motion vector of the current sub-block.

An image decoding method according to an embodiment of the disclosure includes identifying at least two neighboring sub-blocks that have the same motion vector and that are adjacent to each other from among neighboring sub-blocks that are adjacent to a current block, determining a representative motion vector and representative location information of the identified at least two neighboring sub-blocks, determining a parameter of a model for determining a motion vector, by using the representative motion vector and the representative location information, determining a motion vector of a current sub-block, based on location information of the current sub-block included in the current block and the determined parameter, and predicting the current block by using the motion vector of the current sub-block, wherein the representative motion vector is determined based on the same motion vector, and the representative location information indicates coordinates determined based on the identified at least two neighboring sub-blocks.

According to the image decoding method according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the representative location information may include coordinates corresponding to the center of the identified at least two neighboring sub-blocks or coordinates of the center of a neighboring block including the identified at least two neighboring sub-blocks.

According to the image decoding method according to an embodiment of the disclosure, when coordinates corresponding to the center of identified at least two neighboring sub-blocks are representative location information, locations of neighboring sub-blocks adjacent to a current block may be reflected, and thus, the accuracy of sub-block unit prediction may be improved, and when coordinates of the center of a neighboring block including identified at least two neighboring sub-blocks are representative location information, neighboring sub-blocks having the same motion vector may belong to one neighboring block, and thus, a location of the neighboring block may be reflected and the accuracy of sub-block unit prediction may be improved.

According to an embodiment of the disclosure, the determining of the parameter may further include obtaining an initial parameter of a model for determining a motion vector from a block reconstructed in a sub-block unit mode prior to the current block, and refining the parameter by using the initial parameter, the representative motion vector, and the representative location information.

According to an embodiment of the disclosure, the image decoding method may further include determining individual motion vectors and pieces of individual location information of neighboring sub-blocks that have different motion vectors or that are not adjacent to each other from among neighboring sub-blocks adjacent to the current block, wherein the determining of the parameter further includes determining the parameter, by further using the individual motion vectors and the pieces of individual location information.

According to an embodiment of the disclosure, the determining of the parameter may further include obtaining an initial parameter of a model for determining a motion vector from a block reconstructed in a sub-block unit mode prior to the current block, and refining the parameter by using the initial parameter, the representative motion vector, the representative location information, the individual motion vectors, and the pieces of individual location information.

An image decoding method according to an embodiment of the disclosure includes identifying a first neighboring block that is not coded in units of sub-blocks and a second neighboring block that is coded in units of sub-blocks from among neighboring blocks that are adjacent to a current block, determining a first motion vector and first location information corresponding to the first neighboring block, determining a parameter of a model for determining a motion vector, based on the first motion vector and the first location information, determining a motion vector of a current sub-block based on location information of the current sub-block included in the current block and the determined parameter, and predicting the current block by using the motion vector of the current sub-block, wherein the first location information indicates coordinates determined based on the first neighboring block.

According to the image decoding method according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the image decoding method may further include determining second motion vectors and pieces of second location information corresponding to second neighboring sub-blocks included in the second neighboring block, wherein the determining of the parameter includes determining the parameter, by further using the second motion vectors and the pieces of second location information.

According to an embodiment of the disclosure, based on at least two third neighboring sub-blocks having the same motion vector and being adjacent to each other from among the second neighboring sub-blocks included in the second neighboring block, the determining of the second motion vectors and the pieces of second location information may further include determining third location information corresponding to the center of the third neighboring sub-blocks, wherein the determining of the parameter further includes determining the parameter by using the same motion vector and the third location information of the third neighboring sub-blocks.

According to an embodiment of the disclosure, the first location information may include coordinates corresponding to the center of the first neighboring block.

According to the image decoding method according to an embodiment of the disclosure because locations of neighboring blocks adjacent to a current block are reflected, the accuracy of sub-block unit prediction may be improved.

According to an embodiment of the disclosure, the first location information may include coordinates corresponding to the center of an area including first neighboring sub-blocks adjacent to the current block from among first neighboring sub-blocks included in the first neighboring block, wherein the first neighboring sub-blocks are obtained by dividing the first neighboring block into pre-determined sub-block units.

According to the image decoding method according to an embodiment of the disclosure, because locations of neighboring sub-blocks belonging to a neighboring block are reflected, the accuracy of sub-block unit prediction may be improved.

An image decoding method according to an embodiment of the disclosure includes comparing motion vectors of a first neighboring block and a second neighboring block adjacent to each other from among neighboring blocks adjacent to a current block, based on a result of the comparing indicating that a first motion vector of the first neighboring block and a second motion vector of the second neighboring block are the, determining representative location information of the first neighboring block and the second neighboring block, and determining a parameter of a model for determining a motion vector by using one of the first motion vector and the second motion vector and the representative location information, based on a result of the comparing indicating that the first motion vector and the second motion vector are different from each other, determining the parameter by using the first motion vector, the second motion vector, first location information of the first neighboring block, and second location information of the second neighboring block, determining a motion vector of a current sub-block, based on location information of the current sub-block included in the current block and the determined parameter, and predicting the current block by using the motion vector of the current sub-block.

According to the image decoding method according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the representative location information may indicate coordinates corresponding to the center of the first neighboring block and the second neighboring block.

According to the image decoding method according to an embodiment of the disclosure because locations of neighboring sub-blocks adjacent to a current block are reflected, the accuracy of sub-block unit prediction may be improved.

According to an embodiment of the disclosure, the first location information may indicate coordinates corresponding to the center of the first neighboring block, and the second location information may indicate coordinates corresponding to the center of the second neighboring block.

According to an embodiment of the disclosure, at least one of the first neighboring block and the second neighboring block may be a coding unit or a sub-block unit included in the coding unit.

According to an embodiment of the disclosure, the determining of the parameter may further include obtaining an initial parameter of a model for determining a motion vector from a block reconstructed in a sub-block mode prior to the current block, based on the first motion vector and the second motion vector being the same motion vector, refining the parameter by using the initial parameter, the one motion vector, and the representative location information, and based on the first motion vector and the second motion vector being different from each other, refining the parameter by using the initial parameter, the first motion vector, the second motion vector, the first location information, and the second location information.

An image decoding apparatus according to an embodiment of the disclosure includes a memory in which one or more instructions are stored, and at least one processor operating according to the one or more instructions, to identify at least two neighboring sub-blocks that have the same motion vector and that are adjacent to each other from among neighboring sub-blocks that are adjacent to a current block, determine a representative motion vector and representative location information of the identified at least two neighboring sub-blocks, determine a parameter of a model for determining a motion vector by using the representative motion vector and the representative location information, determine a motion vector of a current sub-block based on location information of the current sub-block included in the current block and the determined parameter, and predict the current block by using the motion vector of the current sub-block, wherein the representative motion vector is determined based on the same motion vector, and the representative location information indicates coordinates determined based on the identified at least two neighboring sub-blocks.

According to the image decoding apparatus according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the representative location information may include coordinates corresponding to the center of the identified at least two neighboring sub-blocks or coordinates of the center of a neighboring block including the identified at least two neighboring sub-blocks.

According to the image decoding apparatus according to an embodiment of the disclosure, when coordinates corresponding to the center of identified at least two neighboring sub-blocks are representative location information, locations of neighboring sub-blocks adjacent to a current block may be reflected, and thus, the accuracy of sub-block unit prediction may be improved, and when coordinates of the center of a neighboring block including identified at least two neighboring sub-blocks are representative location information, neighboring sub-blocks having the same motion vector may belong to one neighboring block, and thus, a location of the neighboring block may be reflected and the accuracy of sub-block unit prediction may be improved.

According to an embodiment of the disclosure, the at least one processor may be further configured to obtain an initial parameter of a model for determining a motion vector from a block reconstructed in a sub-block unit mode prior to the current block and refine the parameter by using the initial parameter, the representative motion vector, and the representative location information.

According to an embodiment of the disclosure, the at least one processor may be further configured to determine individual motion vectors and pieces of individual location information of neighboring sub-blocks that have different motion vectors or that are not adjacent to each other from among neighboring sub-blocks adjacent to the current block, and determine the parameter by further using the individual motion vectors and the pieces of individual location information.

According to an embodiment of the disclosure, the at least one processor may be further configured to obtain an initial parameter of a model for determining a motion vector from a block reconstructed in a sub-block unit mode prior to the current block, and refine the parameter by using the initial parameter, the representative motion vector, the representative location information, the individual motion vectors, and the pieces of individual location information.

An image decoding apparatus according to an embodiment of the disclosure includes a memory in which one or more instructions are stored, and at least one processor operating according to the one or more instructions, to identify a first neighboring block that is not coded in units of sub-blocks and a second neighboring block that is coded in units of sub-blocks from among neighboring blocks adjacent to a current block, determine a first motion vector and first location information corresponding to the first neighboring block, determine a parameter of a model for determining a motion vector based on the first motion vector and the first location information, determine a motion vector of a current sub-block based on location information of the current sub-block included in the current block and the determined parameter, and predict the current block by using the motion vector of the current sub-block, wherein the first location information indicates coordinates determined based on the first neighboring block.

According to the image decoding apparatus according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the at least one processor may be further configured to determine second motion vectors and pieces of second location information corresponding to second neighboring sub-blocks included in the second neighboring block, and determine the parameter by further using the second motion vectors and the pieces of second location information.

According to an embodiment of the disclosure, based on at least two third neighboring sub-blocks having the same motion vector and being adjacent to each other from among the second neighboring sub-blocks included in the second neighboring block, the at least one processor may be further configured to determine third location information corresponding to the center of the third neighboring sub-blocks, and determine the parameter by using the same motion vector and the third location information of the third neighboring sub-blocks.

According to an embodiment of the disclosure, the first location information may include coordinates corresponding to the center of the first neighboring block.

According to the image decoding apparatus according to an embodiment of the disclosure because locations of neighboring blocks adjacent to a current block are reflected, the accuracy of sub-block unit prediction may be improved.

According to an embodiment of the disclosure, the first location information may include coordinates corresponding to the center of first neighboring sub-blocks adjacent to the current block from among first neighboring sub-blocks included in the first neighboring block, and the first neighboring sub-blocks may be obtained by dividing the first neighboring block into pre-determined sub-block units.

According to the image decoding apparatus according to an embodiment of the disclosure, because locations of neighboring sub-blocks belonging to a neighboring block are reflected, the accuracy of sub-block unit prediction may be improved.

An image decoding apparatus according to an embodiment of the disclosure includes a memory in which one or more instructions are stored, and at least one processor operating according to the one or more instructions, to compare motion vectors of a first neighboring block and a second neighboring block adjacent to each other from among neighboring blocks adjacent to a current block, determine representative location information of the first neighboring block and the second neighboring block, and determine a parameter of a model for determining a motion vector by using one of the first motion vector and the second motion vector and the representative location information based on a result of the comparing indicating that a first motion vector of the first neighboring block and a second motion vector of the second neighboring block are the same, determine the parameter by using the first motion vector, the second motion vector, first location information of the first neighboring block and second location information of the second neighboring block based on a result of the comparing indicating that the first motion vector and the second motion vector are different from each other, determine a motion vector of a current sub-block based on location information of the current sub-block included in the current block and the determined parameter, and predict the current block by using the motion vector of the current sub-block.

According to the image decoding apparatus according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the representative location information may indicate coordinates corresponding to the center of the first neighboring block and the second neighboring block.

According to the image decoding apparatus according to an embodiment of the disclosure, because locations of neighboring sub-blocks having the same motion vector are reflected, the accuracy of sub-block unit prediction may be improved.

According to an embodiment of the disclosure, the first location information may indicate coordinates corresponding to the center of the first neighboring block, and the second location information may indicate coordinates corresponding to the center of the second neighboring block.

According to an embodiment of the disclosure, at least one of the first neighboring block and the second neighboring block may be a coding unit or a sub-block unit included in the coding unit.

According to an embodiment of the disclosure, the at least one processor may be further configured to obtain an initial parameter of a model for determining a motion vector from a block reconstructed in a sub-block unit mode prior to the current block, refine the parameter by using the initial parameter, the one motion vector, and the representative location information based on the first motion vector and the second motion vector are being same, and refine the parameter by using the initial parameter, the first motion vector, the second motion vector, the first location information, and the second location information based on the first motion vector and the second motion vector being different from each other.

An image encoding method according to an embodiment of the disclosure includes identifying at least two neighboring sub-blocks that have the same motion vector and that are adjacent to each other from among neighboring sub-blocks that are adjacent to a current block, determining a representative motion vector and representative location information of the identified at least two neighboring sub-blocks, determining a parameter of a model for determining a motion vector by using the representative motion vector and the representative location information, determining a motion vector of a current sub-block based on location information of the current sub-block included in the current block and the determined parameter, and predicting the current block by using the motion vector of the current sub-block, wherein the representative motion vector is determined based on the same motion vector, and the representative location information indicates coordinates determined based on the identified at least two neighboring sub-blocks.

According to the image encoding method according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the representative location information may include coordinates corresponding to the center of the identified at least two neighboring sub-blocks or coordinates of the center of a neighboring block including the identified at least two neighboring sub-blocks.

According to the image encoding method according to an embodiment of the disclosure, when coordinates corresponding to the center of identified at least two neighboring sub-blocks are representative location information, locations of neighboring sub-blocks adjacent to a current block may be reflected, and thus, the accuracy of sub-block unit prediction may be improved, and when coordinates of the center of a neighboring block including identified at least two neighboring sub-blocks are representative location information, neighboring sub-blocks having the same motion vector may belong to one neighboring block, and thus, a location of the neighboring block may be reflected and the accuracy of sub-block unit prediction may be improved.

According to an embodiment of the disclosure, the determining of the parameter may further include obtaining an initial parameter of a model for determining a motion vector from a block encoded in a sub-block unit mode prior to the current block, and refining the parameter by using the initial parameter, the representative motion vector, and the representative location information.

According to an embodiment of the disclosure, the image encoding method may further include determining individual motion vectors and pieces of individual location information of neighboring sub-blocks that have different motion vectors or that are not adjacent to each other from among neighboring sub-blocks adjacent to the current block, wherein the determining of the parameter further includes determining the parameter by further using the individual motion vectors and the pieces of individual location information.

According to an embodiment of the disclosure, the determining of the parameter may further include obtaining an initial parameter of a model for determining a motion vector from a block encoded in a sub-block unit mode prior to the current block, and refining the parameter by using the initial parameter, the representative motion vector, the representative location information, the individual motion vectors, and the pieces of individual location information.

An image encoding method according to an embodiment of the disclosure includes identifying a first neighboring block that is not coded in units of sub-blocks and a second neighboring block coded in units of sub-blocks from among neighboring blocks adjacent to a current block, determining a first motion vector and first location information corresponding to the first neighboring block, determining a parameter of a model for determining a motion vector based on the first motion vector and the first location information, determining a motion vector of a current sub-block based on location information of the current sub-block included in the current block and the determined parameter, and predicting the current block by using the motion vector of the current sub-block, wherein the first location information indicates coordinates determined based on the first neighboring block.

According to the image encoding method according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the image encoding method may further include determining second motion vectors and pieces of second location information corresponding to second neighboring sub-blocks included in the second neighboring block, wherein the determining of the parameter includes determining the parameter by further using the second motion vectors and the pieces of second location information.

According to an embodiment of the disclosure, based on at least two third neighboring sub-blocks having the same motion vector and being adjacent to each other from among the second neighboring sub-blocks included in the second neighboring block, the determining of the second motion vectors and the pieces of second location information may further include determining third location information corresponding to the center of the third neighboring sub-blocks, wherein the determining of the parameter further includes determining the parameter by using the same motion vector and the third location information of the third neighboring sub-blocks.

According to an embodiment of the disclosure, the first location information may include coordinates corresponding to the center of the first neighboring block.

According to the image encoding method according to an embodiment of the disclosure, because locations of neighboring blocks adjacent to a current block are reflected, the accuracy of sub-block unit prediction may be improved.

According to an embedment of the disclosure, the first location information may include coordinates corresponding to the center of first neighboring sub-blocks adjacent to the current block from among first neighboring sub-blocks included in the first neighboring block, wherein the first neighboring sub-blocks are obtained by dividing the first neighboring block into pre-determined sub-block units.

According to the image encoding method according to an embodiment of the disclosure, because locations of neighboring sub-blocks belonging to a neighboring block are reflected, the accuracy of sub-block unit prediction may be improved.

An image encoding method according to an embodiment includes comparing motion vectors of a first neighboring block and a second neighboring block adjacent to each other from among neighboring blocks adjacent to a current block, determining representative location information of the first neighboring block and the second neighboring block based on a result of the comparing indicating that a first motion vector of the first neighboring block and a second motion vector of the second neighboring block are the same, determining a parameter of a model for determining a motion vector by using one of the first motion vector and the second motion vector and the representative location information, determining the parameter by using the first motion vector, the second motion vector, first location information of the first neighboring block, and second location information of the second neighboring block based on a result of the comparing indicating that the first motion vector and the second motion vector are different from each other, determining a motion vector of a current sub-block, based on location information of the current sub-block included in the current block and the determined parameter, and predicting the current block by using the motion vector of the current sub-block.

According to the image encoding method according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved.

According to an embodiment of the disclosure, the representative location information may indicate coordinates corresponding to the center of the first neighboring block and the second neighboring block.

According to the image encoding method according to an embodiment of the disclosure, because locations of neighboring sub-blocks having the same motion vector are reflected, the accuracy of sub-block unit prediction may be improved.

According to an embodiment of the disclosure, the first location information may indicate coordinates corresponding to the center of the first neighboring block, and the second location information may indicate coordinates corresponding to the center of the second neighboring block.

According to an embodiment of the disclosure, at least one of the first neighboring block and the second neighboring block may be a coding unit or a sub-block unit included in the coding unit.

According to an embodiment of the disclosure, the determining of the parameter may further include obtaining an initial parameter of a model for determining a motion vector from a block encoded in a sub-block unit mode prior to the current block, refining the parameter by using the initial parameter, the one motion vector, and the representative location information based on the first motion vector and the second motion vector being the same motion vector, and refining the parameter by using the initial parameter, the first motion vector, the second motion vector, the first location information, and the second location information based on the first motion vector and the second motion vector being different from each other.

An image encoding apparatus according to an embodiment of the disclosure includes a memory in which one or more instructions are stored, and at least one processor operating according to the one or more instructions, to identify at least two neighboring sub-blocks that have the same motion vector and that are adjacent to each other from among neighboring sub-blocks that are adjacent to a current block, determine a representative motion vector and representative location information of the identified at least two neighboring sub-blocks, determine a parameter of a model for determining a motion vector by using the representative motion vector and the representative location information, determine a motion vector of a current sub-block based on location information of the current sub-block included in the current block and the determined parameter, and predict the current block by using the motion vector of the current sub-block, wherein the presentative motion vector is determined based on the same motion vector, and the representative location information indicates coordinates determined based on the identified at least two neighboring sub-blocks.

According to the image encoding apparatus according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the representative location information may include coordinates corresponding to the center of the identified at least two neighboring sub-blocks or coordinates of the center of a neighboring block including the identified at least two neighboring sub-blocks.

According to the image encoding apparatus according to an embodiment of the disclosure, when coordinates corresponding to the center of identified at least two neighboring sub-blocks are representative location information, locations of neighboring sub-blocks adjacent to a current block may be reflected, and thus, the accuracy of sub-block unit prediction may be improved, and when coordinates of the center of a neighboring block including identified at least two neighboring sub-blocks are representative location information, neighboring sub-blocks having the same motion vector may belong to one neighboring block, and thus, a location of the neighboring block may be reflected and the accuracy of sub-block unit prediction may be improved.

According to an embodiment of the disclosure, the at least one processor may be further configured to obtain an initial parameter of a model for determining a motion vector from a block encoded in a sub-block unit mode prior to the current block, and refine the parameter by using the initial parameter, the representative motion vector, and the representative location information.

According to an embodiment of the disclosure, the at least one processor may be further configured to determine individual motion vectors and pieces of individual location information of neighboring sub-blocks having different motion vectors or not adjacent to each other from among neighboring sub-blocks adjacent to the current block, and determine the parameter by further using the individual motion vectors and the pieces of individual location information.

According to an embodiment of the disclosure, the at least one processor may be further configured to obtain an initial parameter of a model for determining a motion vector from a block encoded in a sub-block unit mode prior to the current block, and refine the parameter by using the initial parameter, the representative motion vector, the representative location information, the individual motion vectors, and the pieces of individual location information.

An image encoding apparatus according to an embodiment of the disclosure includes a memory in which one or more instructions are stored, and at least one processor operating according to the one or more instructions, to identify a first neighboring block that is not coded in units of sub-blocks and a second neighboring block coded in units of sub-blocks from among neighboring blocks adjacent to a current block, determine a first motion vector and first location information corresponding to the first neighboring block, determine a parameter of a model for determining a motion vector based on the first motion vector and the first location information, determine a motion vector of a current sub-block based on location information of the current sub-block included in the current block and the determined parameter, and predict the current block by using the motion vector of the current sub-block, wherein the first location information indicates coordinates determined based on the first neighboring block.

According to the image encoding apparatus according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the at least one processor may be further configured to determine second motion vectors and pieces of second location information corresponding to second neighboring sub-blocks included in the second neighboring block, and determine the parameter by further using the second motion vectors and the pieces of second location information.

According to an embodiment of the disclosure, based on at least two third neighboring sub-blocks having the same motion vector from among the second neighboring sub-blocks included in the second neighboring block, the at least one processor may be further configured to determine third location information corresponding to the center of the third neighboring sub-blocks, and determine the parameter by using the same motion vector and the third location information of the third neighboring sub-blocks.

According to an embodiment of the disclosure, the first location information may include coordinates corresponding to the center of the first neighboring block.

According to the image encoding apparatus according to an embodiment of the disclosure, because locations of neighboring blocks adjacent to a current block are reflected, the accuracy of sub-block unit prediction may be improved.

According to an embodiment of the disclosure, the first location information may include coordinates corresponding to the center of first neighboring sub-blocks adjacent to the current block from among first neighboring sub-blocks included in the first neighboring block, wherein the first neighboring sub-blocks are obtained by dividing the first neighboring block into pre-determined sub-block units.

According to the image encoding apparatus according to an embodiment of the disclosure, because locations of neighboring sub-blocks belonging to a neighboring block are reflected, the accuracy of sub-block unit prediction may be improved.

An image encoding apparatus according to an embodiment of the disclosure includes a memory in which one or more instructions are stored, and at least one processor operating according to the one or more instructions, to compare motion vectors of a first neighboring block and a second neighboring block adjacent to each other from among neighboring blocks adjacent to a current block, determine representative location information of the first neighboring block and the second neighboring block, and determine a parameter of a model for determining a motion vector by using one of the first motion vector and the second motion vector and the representative location information based on a result of the comparing indicating that a first motion vector of the first neighboring block and a second motion vector of the second neighboring block are the same, determine the parameter by using the first motion vector, the second motion vector, first location information of the first neighboring block, and second location information of the second neighboring block based on a result of the comparing indicating that the first motion vector and the second motion vector are different from each other, determine a motion vector of a current sub-block based on location information of the current sub-block included in the current block and the determined parameter, and predict the current block by using the motion vector of the current sub-block.

According to the image encoding apparatus according to an embodiment of the disclosure, because representative information of neighboring sub-blocks having the same motion vector is determined and the neighboring sub-blocks are used as one sub-block while considering all neighboring sub-blocks, the accuracy of sub-block unit prediction may be improved while considering all neighboring information.

According to an embodiment of the disclosure, the representative location information may indicate coordinates corresponding to the center of the first neighboring block and the second neighboring block.

According to the image encoding apparatus according to an embodiment of the disclosure, because locations of neighboring sub-blocks having the same motion vector are reflected, the accuracy of sub-block unit prediction may be improved.

According to an embodiment of the disclosure, the first location information may indicate coordinates corresponding to the center of the first neighboring block, and the second location information may indicate coordinates corresponding to the center of the second neighboring block.

According to an embodiment of the disclosure, at least one of the first neighboring block and the second neighboring block may be a coding unit or a sub-block unit included in the coding unit.

According to an embodiment of the disclosure, the at least one processor may be further configured to obtain an initial parameter of a model for determining a motion vector from a block encoded in a sub-block unit mode prior to the current block, refine the parameter by using the initial parameter, the one motion vector, and the representative location information based on the first motion vector and the second motion vector being the same motion vector, and refine the parameter by using the initial parameter, the first motion vector, the second motion vector, the first location information, and the second location information based on the first motion vector and the second motion vector being different from each other.

A machine-readable storage medium may be provided as a non-transitory storage medium. Here, 'non-transitory' means that the storage medium does not include a signal (e.g., an electromagnetic wave) and is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product may be a product purchasable between a seller and a purchaser. The computer program product may be distributed in the form of a machine-readable storage medium (e.g., a compact disc read-only memory (CD-ROM)), or distributed (e.g., downloaded or uploaded) online via an application store or between two user devices (e.g., smartphones) directly. When distributed online, at least part of the computer program product (e.g., a downloadable application) may be temporarily generated or at least temporarily stored in a machine-readable storage medium, such as a memory of a server of a manufacturer, a server of an application store, or a relay server.

The invention claimed is:

1. An image decoding method comprising:
identifying at least two neighboring sub-blocks that have a same motion vector and are adjacent to each other from among a plurality of neighboring sub-blocks that are adjacent to a current block;
determining a representative motion vector and representative location information corresponding to the at least two neighboring sub-blocks;
obtaining an initial parameter of a model for determining a motion vector from a block reconstructed in a sub-block unit mode prior to the current block;
refining a parameter of the model based on the initial parameter, the representative motion vector and the representative location information;
determining a motion vector of a current sub-block included in the current block based on location information of the current sub-block and the parameter; and
predicting the current block based on the motion vector of the current sub-block,
wherein the representative motion vector is determined based on the same motion vector, and
wherein the representative location information indicates coordinates that are determined based on the at least two neighboring sub-blocks.

2. The image decoding method of claim 1, wherein the coordinates correspond to at least one from among a center of the at least two neighboring sub-blocks or a center of a neighboring block comprising the at least two neighboring sub-blocks.

3. An image decoding method comprising:
identifying at least two neighboring sub-blocks that have a same motion vector and are adjacent to each other from among a plurality of neighboring sub-blocks that are adjacent to a current block;
determining a representative motion vector and representative location information corresponding to the at least two neighboring sub-blocks;
determining individual motion vectors and pieces of individual location information corresponding to neighboring sub-blocks that have different motion vectors or are not adjacent to each other from among the plurality of neighboring sub-blocks;
obtaining an initial parameter of a model for determining a motion vector from a block reconstructed in a sub-block unit mode prior to the current block;
refining a parameter of the model based on the initial parameter, the representative motion vector, the representative location information, the individual motion vectors, and the pieces of individual location information;
determining a motion vector of a current sub-block included in the current block based on location information of the current sub-block and the parameter; and
predicting the current block based on the motion vector of the current sub-block.

4. An image decoding method comprising:
comparing motion vectors of a first neighboring block and a second neighboring block that are adjacent to each other from among neighboring blocks that are adjacent to a current block;
obtaining an initial parameter of a model for determining a motion vector from a block that is reconstructed in a sub-block mode prior to the current block;
based on a result of the comparing indicating that a first motion vector of the first neighboring block and a second motion vector of the second neighboring block are a same motion vector, determining representative location information corresponding to the first neighboring block and the second neighboring block, and refining a parameter of the model based on the initial parameter, the representative location information and one of the first motion vector and the second motion vector;
based on the result of the comparing indicating that the first motion vector and the second motion vector are different from each other, refining the parameter based on the initial parameter, the first motion vector, the second motion vector, first location information about the first neighboring block, and second location information about the second neighboring block;
determining a motion vector of a current sub-block included in the current block, based on location information about the current sub-block and the parameter; and
predicting the current block based on the motion vector of the current sub-block.

5. The image decoding method of claim 4, wherein the representative location information indicates coordinates corresponding to a center of the first neighboring block and the second neighboring block.

6. The image decoding method of claim 4, wherein the first location information indicates coordinates corresponding to a center of the first neighboring block, and
wherein the second location information indicates coordinates corresponding to a center of the second neighboring block.

7. The image decoding method of claim 4, wherein at least one of the first neighboring block or the second neighboring block is a coding unit or a sub-block unit included in the coding unit.

* * * * *